United States Patent
Maekawa et al.

(10) Patent No.: US 10,900,460 B2
(45) Date of Patent: Jan. 26, 2021

(54) CONTROL SYSTEM FOR COMPRESSION-IGNITION ENGINE AND METHOD OF DETERMINING IN-CYLINDER TEMPERATURE

(71) Applicant: Mazda Motor Corporation, Hiroshima (JP)

(72) Inventors: Kota Maekawa, Hiroshima (JP); Kyotaro Nishimoto, Hiroshima (JP); Yuichiro Tsumura, Aki-gun (JP); Kenko Ujihara, Higashihiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 16/450,792

(22) Filed: Jun. 24, 2019

(65) Prior Publication Data

US 2020/0032761 A1     Jan. 30, 2020

(30) Foreign Application Priority Data

Jul. 26, 2018   (JP) .................. 2018-140691

(51) Int. Cl.
*F02P 5/04*     (2006.01)
*F02D 41/00*    (2006.01)
(Continued)

(52) U.S. Cl.
CPC .......... *F02P 5/045* (2013.01); *F02D 41/0065* (2013.01); *F02D 41/1401* (2013.01);
(Continued)

(58) Field of Classification Search
CPC ......... F02P 5/045; F02P 5/15; F02D 41/0065; F02D 41/1401; F02D 41/3017;
(Continued)

(56) References Cited

U.S. PATENT DOCUMENTS 6,340,016 B1 * 1/2002 Ueda ............... F02D 19/061
                                              123/305
6,354,264 B1 * 3/2002 Iwakiri ............ F02D 35/023
                                              123/305
(Continued)

FOREIGN PATENT DOCUMENTS

EP    1164277 A2   12/2001
EP    3392490 A1   10/2018
(Continued)

OTHER PUBLICATIONS

European Patent Office, Extended European Search Report Issued in Application No. 19186905.6, dated Dec. 4, 2019, Germany, 84 pages.

*Primary Examiner* — Joseph J Dallo
(74) *Attorney, Agent, or Firm* — Alleman Hall Creasman & Tuttle LLP

(57) ABSTRACT

A control system for a compression-ignition engine includes a combustion chamber, an injector, an ignition plug, a sensor device, and a controller having a circuitry. The ignition plug forcibly ignites mixture gas to start combustion accompanied by flame propagation of a part of the mixture gas, and again ignites remaining unburnt mixture gas at a timing at which the unburnt mixture gas combusts by self-ignition. The controller is configured to execute an ignition controlling module to output an ignition signal to the ignition plug before a target timing so that the unburnt mixture gas self-ignites at the target timing, an ignition timing estimating module to estimate an actual CI timing indicative of a timing at which the unburnt mixture gas actually self-ignited based on an in-cylinder pressure parameter, and an in-cylinder temperature determining module to determine the in-cylinder temperature at a given crank angle based on the estimated result.

17 Claims, 24 Drawing Sheets

(51) Int. Cl.
*F02D 41/14* (2006.01)
*F02D 41/30* (2006.01)
*F02P 5/15* (2006.01)
*F02B 31/06* (2006.01)

(52) U.S. Cl.
CPC ............ *F02D 41/3017* (2013.01); *F02P 5/15* (2013.01); *F02B 31/06* (2013.01); *F02D 2041/1432* (2013.01); *F02D 2200/021* (2013.01)

(58) Field of Classification Search
CPC ....... F02D 2041/1432; F02D 2200/021; F02D 41/0057; F02D 41/006; F02D 41/005; F02D 37/02; F02D 35/028; F02D 35/026; F02D 41/3041; F02D 41/0002; F02D 41/0007; F02D 41/3809; F02D 41/3064; F02D 2041/0015; F02D 2041/389; F02D 2200/04; F02D 2200/0414; F02D 2200/0602; F02D 2200/08; F02D 2200/602; F02B 31/06
See application file for complete search history.

(56) References Cited

U.S. PATENT DOCUMENTS

| | | | | |
|---|---|---|---|---|
| 2002/0046741 A1* | 4/2002 | Kakuho | ................ | F02D 35/026 123/568.14 |
| 2004/0154582 A1* | 8/2004 | Shimazaki | .......... | F02D 41/3035 123/299 |
| 2005/0188954 A1* | 9/2005 | Yoshino | .............. | F02D 41/1448 123/406.29 |
| 2005/0197762 A1* | 9/2005 | Yoshino | ................ | F02P 5/1522 701/111 |
| 2007/0137199 A1* | 6/2007 | Magner | ................... | F02B 37/16 60/602 |
| 2007/0227503 A1* | 10/2007 | Hitomi | .................. | F02D 41/402 123/406.45 |
| 2007/0261671 A1* | 11/2007 | Nakagawa | .......... | F02D 41/1454 123/435 |
| 2008/0167786 A1* | 7/2008 | Sasaki | ................... | F02D 35/023 701/102 |
| 2008/0243358 A1* | 10/2008 | Kojima | ................ | F02D 35/025 701/102 |
| 2009/0012698 A1* | 1/2009 | Shinagawa | ......... | F02D 13/0215 701/103 |
| 2009/0259387 A1* | 10/2009 | Kakuya | ................ | F02D 41/307 701/103 |
| 2009/0320788 A1* | 12/2009 | Ohtsubo | ................... | F02B 1/14 123/295 |
| 2010/0037860 A1* | 2/2010 | Morita | ................ | F02D 41/1459 123/406.53 |
| 2010/0162805 A1* | 7/2010 | Yoeda | ................... | F02D 35/028 73/114.63 |
| 2010/0312454 A1* | 12/2010 | Nada | ..................... | F02D 41/403 701/103 |
| 2011/0088657 A1* | 4/2011 | Tanno | ................... | F02D 19/081 123/305 |
| 2011/0180038 A1* | 7/2011 | Yamakawa | ........... | F02D 41/006 123/435 |
| 2011/0180047 A1* | 7/2011 | Yamakawa | ............. | F02D 15/00 123/564 |
| 2011/0192380 A1* | 8/2011 | Tomimatsu | ......... | F02D 41/1497 123/493 |
| 2014/0032082 A1* | 1/2014 | Gehrke | ............... | F02D 41/0057 701/104 |
| 2015/0047606 A1* | 2/2015 | Demura | .................. | F02D 41/22 123/406.13 |
| 2015/0096531 A1* | 4/2015 | Zhou | ..................... | F02D 41/064 123/295 |
| 2015/0252745 A1* | 9/2015 | Naruse | ................ | F02D 41/3005 123/294 |
| 2015/0316019 A1* | 11/2015 | Kimura | .................. | F02P 9/002 123/406.19 |
| 2016/0123247 A1* | 5/2016 | Mizoguchi | .......... | F02D 41/2416 123/406.55 |
| 2017/0009698 A1* | 1/2017 | Tsugawa | ............... | F02D 41/401 |
| 2017/0058807 A1* | 3/2017 | Yanagawa | ............ | F02D 35/028 |
| 2017/0226981 A1* | 8/2017 | Furuishi | ................ | F02P 5/153 |
| 2017/0292462 A1* | 10/2017 | Tsuda | ................ | F02D 13/0273 |
| 2017/0314499 A1* | 11/2017 | Urano | ................ | F02D 41/402 |
| 2018/0112622 A1* | 4/2018 | Atterberry | .......... | F02D 41/26 |
| 2018/0135539 A1* | 5/2018 | Tsuda | ...................... | F02D 41/22 |
| 2018/0179968 A1* | 6/2018 | Shimizu | ................ | F02D 35/028 |
| 2018/0195457 A1* | 7/2018 | Negami | ............... | F02D 41/3041 |
| 2018/0266365 A1* | 9/2018 | Aoyagi | ............... | F02M 26/07 |
| 2018/0306131 A1* | 10/2018 | Tsuda | ..................... | F02D 41/40 |
| 2019/0107040 A1* | 4/2019 | Tsumura | ................... | F02B 3/02 |

FOREIGN PATENT DOCUMENTS

| | | |
|---|---|---|
| JP | 3873580 B2 | 1/2007 |
| JP | 2018084184 A | 5/2018 |
| JP | 2019039384 A | 3/2019 |
| WO | 2018097104 A1 | 5/2018 |

\* cited by examiner

CONTROL SYSTEM FOR COMPRESSION-IGNITION ENGINE AND METHOD OF DETERMINING IN-CYLINDER TEMPERATURE

TECHNICAL FIELD

The technology disclosed herein relates to a control system for a compression-ignition engine, and a method of determining an in-cylinder temperature.

BACKGROUND OF THE DISCLOSURE

A combustion period of the combustion by self-ignition in which a mixture gas combusts at once without intervening flame propagation is the minimum. When the mixture gas combusts by self-ignition at a suitable timing, fuel efficiency of the engine can be maximized.

For example, JP3873580B2 discloses a control device for an engine, which calculates a timing at which a combustion mass ratio becomes 50% based on an output signal of an in-cylinder pressure sensor, in order to adjust a timing of the combustion by self-ignition.

Unlike the technology disclosed in JP3873580B2, the present applicant instead proposes SPCCI (SPark Controlled Compression-Ignition) combustion which is a combination of SI (Spark Ignition) combustion and CI (Compression Ignition) combustion. SI combustion is combustion accompanied by the flame propagation initiated by forcibly igniting the mixture gas inside the combustion chamber. CI combustion is combustion initiated by compression ignition of the mixture gas inside the combustion chamber. SPCCI combustion is combustion in which, when the mixture gas inside the combustion chamber is forcibly ignited to start the combustion by flame propagation, unburnt mixture gas inside the combustion chamber combusts by the CI combustion because of a pressure buildup due to the heat generation and the flame propagation of the SI combustion. Since SPCCI combustion includes CI combustion, it is one form of "combustion by compression-ignition."

CI combustion takes place when the in-cylinder temperature reaches an ignition temperature defined by the composition of the mixture gas. Fuel efficiency can be maximized, if the in-cylinder temperature reaches the ignition temperature near a compression top dead center and CI combustion takes place.

The in-cylinder temperature increases according to the increase in the in-cylinder pressure. The in-cylinder pressure in SPCCI combustion is a result of two pressure buildups of a pressure buildup by compression work of a piston in a compression stroke, and a pressure buildup caused by the heat generation of the SI combustion.

On the other hand, in SPCCI combustion, if CI combustion takes place near a compression top dead center, the in-cylinder pressure may rise excessively, and thereby combustion noise may become excessive. In such a case, since CI combustion will take place when the piston descends considerably during expansion stroke if the ignition timing is retarded, combustion noise can be reduced. However, fuel efficiency of the engine drops.

In order to achieve both the reduction of combustion noise and the improvement of fuel efficiency in the engine which performs SPCCI combustion, SPCCI combustion must be controlled so that a combustion waveform which changes according to the advancing of a crank angle becomes a suitable combustion waveform.

In SPCCI combustion, the timing at which the mixture gas self-ignites is influenced by an in-cylinder temperature. If the in-cylinder temperature can be determined accurately, this becomes advantageous to accurately control the timing of self-ignition during SPCCI combustion. The term "in-cylinder temperature" as used herein refers to not an average in-cylinder temperature of one cycle but a temperature inside the cylinder at a given crank angle.

As the method of determining the in-cylinder temperature, a method using an intake temperature and an exhaust temperature, and a method using an engine water temperature are known; however, these methods can only estimate the average in-cylinder temperature of one cycle. If the in-cylinder temperature at the given crank angle is to be determined with sufficient accuracy, a new technique is needed, for example, in consideration of a flow of the mixture gas, a variation in an in-cylinder environment which is influenced by unevenness of fuel concentration, etc.

SUMMARY OF THE DISCLOSURE

The technology disclosed herein is made in view of the above situations, and one purpose of the present disclosure is to provide an engine which performs SPCCI combustion, capable of determining an in-cylinder temperature with sufficient accuracy.

In order to control SPCCI combustion, for example, a CI combustion start timing θci can be used as a parameter indicative of a characteristic of SPCCI combustion. The CI combustion start timing θci is a timing at which unburnt mixture gas self-ignites. Below, the CI combustion start timing may be referred to as a "CI timing," an estimated value of the CI timing may be referred to as an "actual CI timing" or an "actual θci," and a target value of the CI timing may be referred to as a "target CI timing" or a "target θci."

A controller of the engine defines, for example, the target θci corresponding to an operating state of the engine, and adjusts a temperature inside a combustion chamber and an ignition timing so that the actual θci becomes the target θci. The temperature inside the combustion chamber is adjusted by adjusting a temperature and/or amount of exhaust gas introduced into the combustion chamber. Below, the temperature inside the combustion chamber may be referred to as an "in-cylinder temperature" or "Tin," the estimated value of the in-cylinder temperature may be referred to as an "actual in-cylinder temperature" or an "actual Tin," and the target value of the in-cylinder temperature may be referred to as a "target in-cylinder temperature" or a "target Tin."

Since CI combustion occurs at a timing near a compression top dead center if the actual θci is advanced exceeding the target θci, combustion noise increases. Then, in order to reduce combustion noise, the controller must recognize the actual θci. If the actual θci can be estimated, the controller can bring the actual θci close to the target θci by adjusting the ignition timing according to a deviation of the actual θci from the target θci. For example, while the actual θci is advanced exceeding the target θci, the controller can retard the ignition timing, and, as a result of the actual θci being retarded, combustion noise can be reduced.

The present inventors have previously completed and proposed a technique for estimating the CI combustion start timing θci with sufficient accuracy, based on a measurement signal of the in-cylinder pressure sensor which measures a pressure inside a combustion chamber.

The CI combustion start timing θci estimated by this estimation technique is exactly the "actual θci" described earlier. This actual CI timing is a parameter reflecting the in-cylinder environment for every combustion cycle, such as an intensity of a pressure wave, a flow of the mixture gas, and a concentration consistency of the fuel.

As described above, CI combustion takes place when the in-cylinder temperature reaches an ignition temperature. Since the in-cylinder temperature reaches the ignition temperature at an earlier timing if the in-cylinder temperature is high, it is thought that the actual CI timing also becomes an earlier timing. Thus, the actual CI timing is retarded or advanced according to the in-cylinder temperature.

The present inventors have focused on a close correlation between the in-cylinder temperature and the actual CI timing, and finally found the new determination technique of the in-cylinder temperature.

The technology disclosed herein can accurately determine the in-cylinder temperature with the engine which performs SPCCI combustion.

Specifically, the technology disclosed herein relates to a control system for a compression-ignition engine. This engine includes a combustion chamber of the engine defined by a cylinder, a piston configured to reciprocate in the cylinder, and a cylinder head closing one end of the cylinder, an injector attached to the cylinder head and configured to inject fuel to be supplied into the combustion chamber, an ignition plug disposed so as to be oriented in the combustion chamber and configured to ignite a mixture gas inside the combustion chamber, a sensor device configured to measure a parameter related to operation of the engine, and a controller having circuitry connected with the ignition plug, the injector, and the sensor device, and configured to perform a calculation in response to a measurement signal from the sensor device and output a signal to the ignition plug and the injector. The ignition plug forcibly ignites the mixture gas to start combustion accompanied by flame propagation of a portion of the mixture gas, and again ignites a remaining portion of unburnt mixture gas at a timing at which the unburnt mixture gas combusts by self-ignition.

The controller is configured to execute an ignition controlling module to output an ignition signal to the ignition plug before a target timing so that the unburnt mixture gas self-ignites at the target timing, an ignition timing estimating module to estimate an actual CI timing indicative of a timing at which the unburnt mixture gas actually self-ignited based on an in-cylinder pressure parameter related to a pressure inside the combustion chamber measured by the sensor device, and an in-cylinder temperature determining module to determine the in-cylinder temperature at a given crank angle based on the estimated result by the ignition timing estimating module.

According to this configuration, by the ignition controlling module outputting the ignition signal to the ignition plug, the ignition plug ignites the mixture gas. As a result of the ignition of the ignition plug, the combustion accompanied by flame propagation occurs. After the SI combustion starts, the remaining unburnt mixture gas combusts by self-ignition. In this manner, the compression-ignition engine performs SPCCI combustion. The ignition controlling module adjusts the timing of the forced ignition by the ignition plug so that the unburnt mixture gas self-ignites at the target timing.

The sensor device measures the in-cylinder pressure parameter related to the pressure inside the combustion chamber during the mixture gas combusting. The ignition timing estimating module estimates the timing at which the unburnt mixture gas actually self-ignites (the actual CI timing) based on the in-cylinder pressure parameter.

As described above, when the in-cylinder temperature is high, the actual CI timing also becomes earlier compared to when it is low. The present inventors focused on the technique of Bayes estimation for the fact that the value of the actual CI timing varies depending on the in-cylinder temperature, as a result of diligent experimentation, and have conceived of following the causal relationship between the in-cylinder temperature and the actual CI timing conversely. Then, the present inventors found that the in-cylinder temperature can be determined based on the value of the actual CI timing.

This configuration is based on such knowledge. According to this configuration, the controller determines the in-cylinder temperature based on the actual CI timing. Since the actual CI timing is reflecting various influences, such as an intensity of a pressure wave, a flow of the mixture gas, and a concentration consistency of the fuel, the in-cylinder temperature can be determined accurately using the actual CI timing. Thus, the determination accuracy of the in-cylinder temperature can be improved. Because of this improvement in the determination accuracy of the in-cylinder temperature, the controller can control SPCCI combustion suitably. This can improve fuel efficiency of the engine while reducing combustion noise in SPCCI combustion.

The control system may further include an exhaust gas recirculation (EGR) system connected with the controller and configured to adjust the in-cylinder temperature in response to a signal from the controller. The controller may output the signal to the EGR system so as to reduce the in-cylinder temperature when the in-cylinder temperature determining module determines that the in-cylinder temperature is high, and raise the in-cylinder temperature when the in-cylinder temperature determining module determines that the in-cylinder temperature is low.

According to this configuration, the controller adjusts the in-cylinder temperature based on the determination result by the in-cylinder temperature determining module. The determination accuracy of the in-cylinder temperature improves and the in-cylinder temperature is adjusted more accurately than with the conventional system, and moreover, it is advantageous in controlling SPCCI combustion suitably.

The controller may calculate a target value of a property corresponding to the operating state of the engine, and determine a target in-cylinder temperature corresponding to the target value. The in-cylinder temperature determining module may estimate the in-cylinder temperature based on the actual CI timing, and determine that the in-cylinder temperature is high when the estimated result is higher than the target in-cylinder temperature, and determine that the in-cylinder temperature is low when the estimated result is lower than the target in-cylinder temperature.

According to this configuration, the controller refers to, as an index for determining the in-cylinder temperature, the in-cylinder temperature corresponding to the target value of various parameters (target in-cylinder temperature) such as a target value of CI timing or a SI ratio which will be described later. Thus, it becomes possible to compare the in-cylinder temperature at which the in-cylinder temperature is estimated to have actually reached (estimated value of the in-cylinder temperature) with a desired in-cylinder temperature required in response to the operating state of the engine (target in-cylinder temperature). Thus, the in-cylinder temperature is adjusted more accurately, and moreover, it is advantageous in controlling SPCCI combustion suitably.

The controller may control the signal outputted to the EGR system based on a difference between the estimated value of the in-cylinder temperature and the target in-cylinder temperature.

According to this configuration, for example, when the difference between the estimated value of the in-cylinder temperature and the target in-cylinder temperature is large, the controller increases and reduces the in-cylinder temperature greatly compared to when the difference is small. Thus, the in-cylinder temperature is adjusted more accurately, and moreover, it is advantageous in controlling SPCCI combustion suitably.

The in-cylinder temperature determining module may estimate the in-cylinder temperature higher as the actual CI timing becomes earlier.

As described above, when the in-cylinder temperature is high, the actual CI timing also becomes earlier compared to when the in-cylinder temperature is low. This tendency can be stated differently that when the actual CI timing is earlier, the in-cylinder temperature is higher compared to when the actual CI timing is later.

According to this configuration, the determination accuracy of the in-cylinder temperature can be improved. Thus, the in-cylinder temperature is adjusted more accurately, and moreover, it is advantageous in controlling SPCCI combustion suitably.

The controller may determine a target value of a heat amount ratio as an index related to a ratio of an amount of heat generated when the mixture gas combusts by flame propagation to the entire amount of heat generated when the mixture gas inside the combustion chamber combusts, and determine a target value of the timing at which the unburnt mixture gas self-ignites. The controller may determine the target in-cylinder temperature based on the target value. The controller may output the signal to the ignition plug so that the target in-cylinder temperature is achieved.

In order to control SPCCI combustion, the present applicant proposed the SI ratio (heat amount ratio) as a parameter indicative of a characteristic of SPCCI combustion. The present applicant defines the SI ratio as an index related to the ratio of the amount of heat generated by SI combustion to the entire amount of heat generated by SPCCI combustion. When the SI ratio is high, the ratio of SI combustion is high in SPCCI combustion, and on the other hand, when the SI ratio is low, the ratio of CI combustion is high in SPCCI combustion. If the ratio of SI combustion in SPCCI combustion is high, it becomes advantageous for the reduction of combustion noise. On the other hand, if the ratio of CI combustion in SPCCI combustion is high, it becomes advantageous for the improvement of fuel efficiency of the engine. When the SI ratio changes, $\theta ci$ also changes.

Similar to the relationship between the actual CI timing and the in-cylinder temperature, the target CI timing correlates to the target in-cylinder temperature. Further, since $\theta ci$ changes when the SI ratio changes as described above, the target heat amount ratio (target value of the SI ratio) correlates to the target in-cylinder temperature with the target CI timing.

By taking such a correlation into consideration, the controller can determine the target in-cylinder temperature accurately. Thus, the in-cylinder temperature is adjusted more accurately, and moreover, it is advantageous in controlling SPCCI combustion suitably.

The EGR system is provided to the engine and configured to change an amount of EGR gas included in the mixture gas inside the combustion chamber. The EGR system may be comprised at least one of an internal EGR system configured to adjust a length of an overlap period where both an intake valve and an exhaust valve open, and an external EGR system configured to adjust a flow rate of exhaust gas through an EGR passage connected between an air intake passage and an exhaust passage.

According to this configuration, by changing EGR gas amount through the internal EGR system and the external EGR system, the in-cylinder temperature can be adjusted. It is advantageous in controlling SPCCI combustion suitably.

The controller may calculate a crank angle at which a combustion mass ratio becomes a given value based on the parameter measured by the sensor device. The in-cylinder temperature determining module may determine the in-cylinder temperature based on the actual CI timing and the crank angle.

As one example, a crank angle at which the combustion mass ratio becomes 10% is referred to $\theta mfb10$. When this $\theta mfb10$ is a late timing, SPCCI combustion, especially the flame propagation of SI combustion, is considered to progress slowly. Here, when the flame propagation progresses slowly, $\theta ci$ tends to be at a later timing compared to when progressing fast.

When $\theta ci$ is at an early timing regardless of the late timing $\theta mfb10$, it can be considered that the in-cylinder temperature was higher as the $\theta ci$ becomes earlier, compared to when $\theta ci$ is at a later timing.

As described above, $\theta mfb10$ relates to the in-cylinder temperature, and so as $\theta ci$. Such a relationship can be established not only for $\theta mfb10$ but also for the crank angle at which the combustion mass ratio becomes the given value at the early stage of SPCCI combustion.

According to this configuration, the determination accuracy of the in-cylinder temperature can be improved. Thus, the in-cylinder temperature is adjusted more accurately, and moreover, it is advantageous in controlling SPCCI combustion suitably.

The ignition timing estimating module may estimate a timing at which the in-cylinder pressure parameter measured by the sensor device exceeds a threshold after the forced ignition by the ignition plug, as the actual CI timing.

The sensor device may include an in-cylinder pressure sensor disposed so as to be oriented in the combustion chamber and configured to measure the pressure inside the combustion chamber. The ignition timing estimating module may use a measurement signal of the in-cylinder pressure sensor as the signal indicative of the in-cylinder pressure parameter.

The technique of estimating the CI timing proposed by the present inventors is based on the fact that the intensity of pressure wave (spectrum) greatly differs, in a frequency band which is higher than a first frequency and lower than a second frequency, between a case where the entire mixture gas inside the combustion chamber is combusted by flame propagation accompanied by the forced ignition and a case where the entire mixture gas inside the combustion chamber is compressed and combusted. The combustion by flame propagation has a characteristic such that a heat release rate $(dQ/d\theta)$ at the combustion start timing is lower than a heat release rate at the compression ignition combustion. Thus, it is considered that the intensity of the pressure wave is different between SI combustion and CI combustion in a particular frequency band.

In more detail, the present inventors determined that a timing at which a measurement signal component of the measurement signal of the in-cylinder pressure sensor, which passed a band-pass filter of which a pass band is at a frequency higher than the first frequency and lower than the second frequency, becomes the minimum, was approximately in agreement with the CI timing θci. Thus, in the proposal described above, the controller estimates a timing at which the minimum of the measurement signal component which passed the band-pass filter exceeds the given threshold, as the timing at which the unburnt mixture gas self-ignites (that is, the CI timing).

According to this configuration, the controller can estimate CI timing based on the measurements by the in-cylinder pressure sensor.

The controller may have a first band-pass filter configured to pass a signal component of the measurement signal of the in-cylinder pressure sensor, at a frequency higher than a first frequency and lower than a second frequency. The ignition timing estimating module may estimate a timing at which the measurement signal which passed the first band-pass filter exceeds a first threshold, as the actual CI timing, and the first frequency and the second frequency may be set within a range of 0.5 kHz to 4.0 kHz.

According to the experimentation of the present inventors, the CI timing θci can accurately be estimated based on the measurement signal component (corresponding to the in-cylinder pressure parameter) which passed through the band-pass filter of which the pass band is higher than the first frequency and lower than the second frequency, these frequencies being set within the range of 0.5 kHz to 4.0 kHz.

The controller may have a second band-pass filter configured to pass a signal component of the measurement signal of the in-cylinder pressure sensor, at a frequency higher than a third frequency and lower than a fourth frequency. The controller may have a second ignition timing estimating module configured to estimate a timing at which the measurement signal which passed the second band-pass filter exceeds a second threshold, as the actual CI timing, and the third frequency and the fourth frequency may be set within a range of 5.5 kHz to 8.0 kHz.

The pass bands are different between the first band-pass filter and the second band-pass filter. Estimating a crank angle timing at which the unburnt mixture gas self-ignites by the ignition timing estimating module using the first band-pass filter and estimating a crank angle timing at which the unburnt mixture gas self-ignites by the second ignition timing estimating module using the second band-pass filter correspond to that the CI timing θci is estimated by techniques different from each other. By estimating the CI timing θci by the different two techniques, the determination accuracy of the CI timing θci improves.

For example, when a timing can be estimated only by either one of the techniques, the controller can estimate this timing, as the CI timing θci.

Further, when timings can be estimated by the respective techniques, the controller may estimate the timing on the relatively advance side, as the CI timing θci.

The controller may be further configured to execute a CI existence determining module to determine whether the unburnt mixture gas actually self-ignited based on the in-cylinder pressure parameter related to the pressure inside the combustion chamber measured by the sensor device, and a CI probability calculating module to calculate a CI probability indicative of a probability that the self-ignition actually occurred when operating the engine, based on the determination result by the CI existence determining module. The in-cylinder temperature determining module may determine the in-cylinder temperature based on the CI probability when the actual CI timing is not able to be estimated.

As described above, the controller of the engine controls SPCCI combustion using two new parameters of the SI ratio and θci; however, in the actual engine, CI combustion does not always start after SI combustion. That is, SPCCI combustion may not be achieved in all combustion cycles. When CI combustion does not start, the actual CI timing cannot be estimated.

Then, the present inventors define the CI probability as a new parameter indicative of the characteristic of SPCCI combustion. This CI probability can be defined as an index related to a ratio of the number of times CI combustion occurs after SI combustion to the number of times SI combustion occurs. When the CI probability is high, the frequency of CI combustion of the unburnt mixture gas after SI combustion becomes higher, and on the other hand, when the CI probability is low, the frequency of CI combustion of the unburnt mixture gas after SI combustion becomes lower. When the frequency of CI combustion increases, the ratio of CI combustion in SPCCI combustion increases on average, which is advantageous in improving fuel efficiency of the engine.

Further, similar to the actual CI timing, the CI probability is a parameter reflecting the in-cylinder environment for every combustion cycle, such as an intensity of a pressure wave, a flow of the mixture gas, and a concentration consistency of the fuel.

As described above, CI combustion occurs when the in-cylinder temperature reaches the ignition temperature. Thus, when the in-cylinder temperature is high, it becomes easy to reach the ignition temperature and the CI probability is considered to be higher compared to when the in-cylinder temperature is low. In this manner, depending on the in-cylinder temperature, the CI probability changes.

The present inventors have focused on a close correlation between the in-cylinder temperature and the CI probability, and finally developed the additional determination technique of the in-cylinder temperature. In more detail, for the fact that the CI probability changes depending on the in-cylinder temperature, the present inventors have focused on, as a result of diligent examinations, following the causal relationship between the in-cylinder temperature and the CI probability conversely. Then, the present inventors found that the in-cylinder temperature can be determined based on the value of the CI probability.

This configuration is based on such knowledge. According to this configuration, in a case where the actual CI timing cannot be estimated, the controller determines the in-cylinder temperature based on the CI probability. Since the CI probability reflects the influences, such as the intensity of the pressure wave, the flow of the mixture gas, and the concentration consistency of the fuel, the in-cylinder temperature can be determined accurately using the CI probability, similar to when using the actual CI timing. Thus, the determination accuracy of the in-cylinder temperature can still be improved even when the CI timing cannot be estimated.

According to another aspect of the present disclosure, a method of determining an in-cylinder temperature of a compression-ignition engine is provided. The engine includes a combustion chamber of the engine defined by a cylinder, a piston configured to reciprocate in the cylinder, and a cylinder head closing one end of the cylinder, an injector attached to the cylinder head and configured to inject fuel to be supplied into the combustion chamber, an ignition plug disposed so as to be oriented in the combustion chamber and configured to ignite a mixture gas inside the combustion chamber, a sensor device configured to measure a parameter related to operation of the engine, and a controller having circuitry connected with the ignition plug, the injector, and the sensor device, and configured to perform a calculation in response to a measurement signal from the sensor device and output a signal to the ignition plug and the injector. The ignition plug forcibly ignites the mixture gas to start combustion accompanied by flame propagation of a portion of the mixture gas, and again ignites a remaining portion of unburnt mixture gas at a timing at which the unburnt mixture gas combusts by self-ignition.

The method includes outputting an ignition signal to the ignition plug before a target timing so that the unburnt mixture gas self-ignites at the target timing, estimating an actual CI timing indicative of a timing at which the unburnt mixture gas actually self-ignited based on an in-cylinder pressure parameter related to a pressure inside the combustion chamber measured by the sensor device, and determining the in-cylinder temperature at a given crank angle based on the estimated result.

According to still another aspect of the present disclosure, a control system for a compression-ignition engine is provided. The engine includes a combustion chamber of the engine defined by a cylinder, a piston configured to reciprocate in the cylinder, and a cylinder head closing one end of the cylinder, an injector attached to the cylinder head and configured to inject fuel to be supplied into the combustion chamber, an ignition plug disposed so as to be oriented in the combustion chamber and configured to ignite a mixture gas inside the combustion chamber, an exhaust gas recirculation (EGR) system provided to the engine and configured to adjust an in-cylinder temperature of the cylinder by changing an EGR rate that is a rate of an amount of EGR gas included in the mixture gas inside the combustion chamber, a sensor device disposed so as to be oriented in the combustion chamber, including at least an in-cylinder pressure sensor configured to measure a pressure inside the combustion chamber, and configured to measure a parameter related to operation of the engine, and a controller having circuitry connected with the ignition plug, the injector, the EGR system, and the sensor device, configured to perform a calculation in response to a measurement signal from the sensor device, and output a signal to the ignition plug, the injector, and the EGR system. The ignition plug forcibly ignites the mixture gas to start combustion accompanied by flame propagation of a portion of the mixture gas, and again ignites a remaining portion of unburnt mixture gas at a timing at which the unburnt mixture gas combusts by self-ignition.

The controller includes a target timing memory configured to store a target timing at which the unburnt mixture gas self-ignites, and is configured to execute an ignition controlling module to output an ignition signal to the ignition plug before the target timing so that the unburnt mixture gas self-ignites at the target timing, based on the target timing stored in the target timing memory. The controller includes a band-pass filter configured to pass a signal component of a measurement signal of the in-cylinder pressure sensor, in a particular frequency band, and a threshold memory configured to store a threshold, and is configured to execute an ignition timing estimating module to estimate a timing at which a value of a measurement signal which passed the band-pass filter exceeds the threshold, as an actual CI timing indicative of a timing at which the unburnt mixture gas actually self-ignited. The controller includes a CI timing memory configured to store the actual CI timing estimated by the ignition timing estimating module, and is configured to execute an in-cylinder temperature determining module to estimate the in-cylinder temperature based on the actual CI timing stored in the CI timing memory, and determine the in-cylinder temperature at a given crank angle based on the estimated result.

The controller outputs the signal to the EGR system so as to reduce the in-cylinder temperature when the in-cylinder temperature determining module determines that the in-cylinder temperature is high, and raise the in-cylinder temperature when the in-cylinder temperature determining module determines that the in-cylinder temperature is low.

DETAILED DESCRIPTION OF THE DISCLOSURE

Hereinafter, one embodiment of a control system for a compression-ignition engine and a method of determining an in-cylinder temperature will be described in detail based on the accompanying drawings. The following description is one example of the engine, the control system for the engine, and the method of determining the in-cylinder temperature of the engine.

Figure 1:
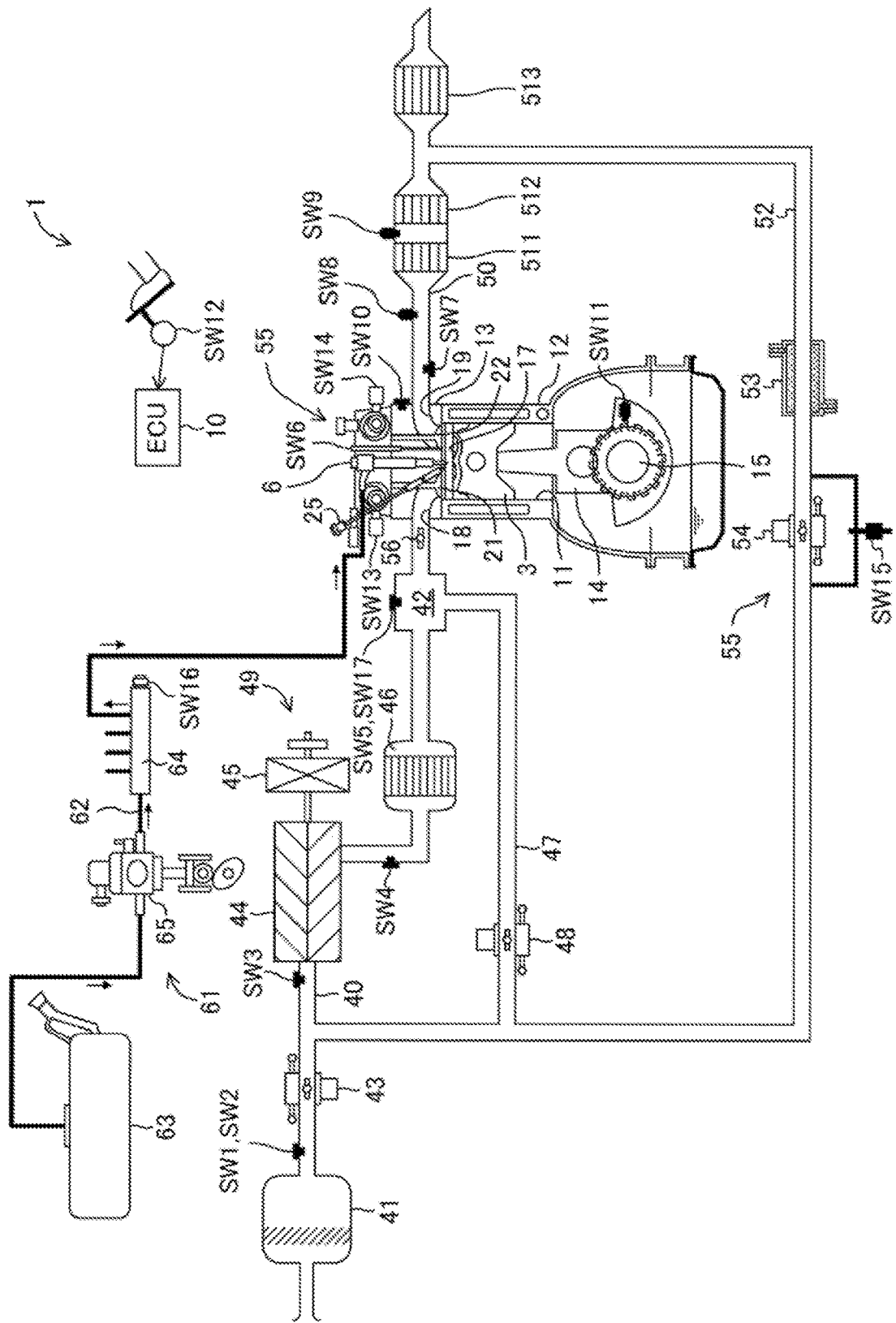
FIG. 1 is a view illustrating a configuration of an engine.
Figure 2:
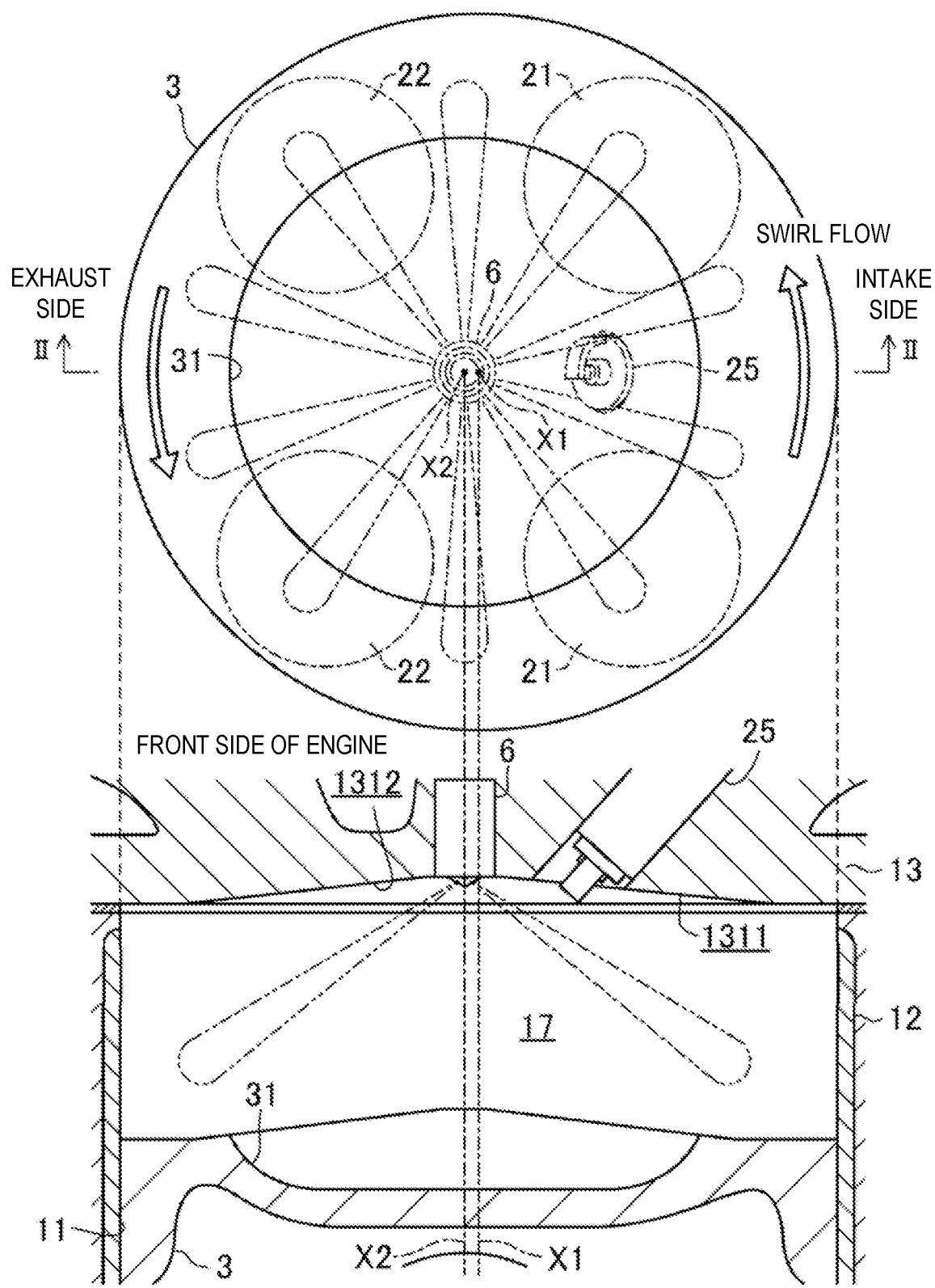
FIG. 2 is a view illustrating a configuration of a combustion chamber, where an upper figure corresponds to a plan view of the combustion chamber, and a lower figure is a cross-sectional view taken along a line II-II.
Figure 3:
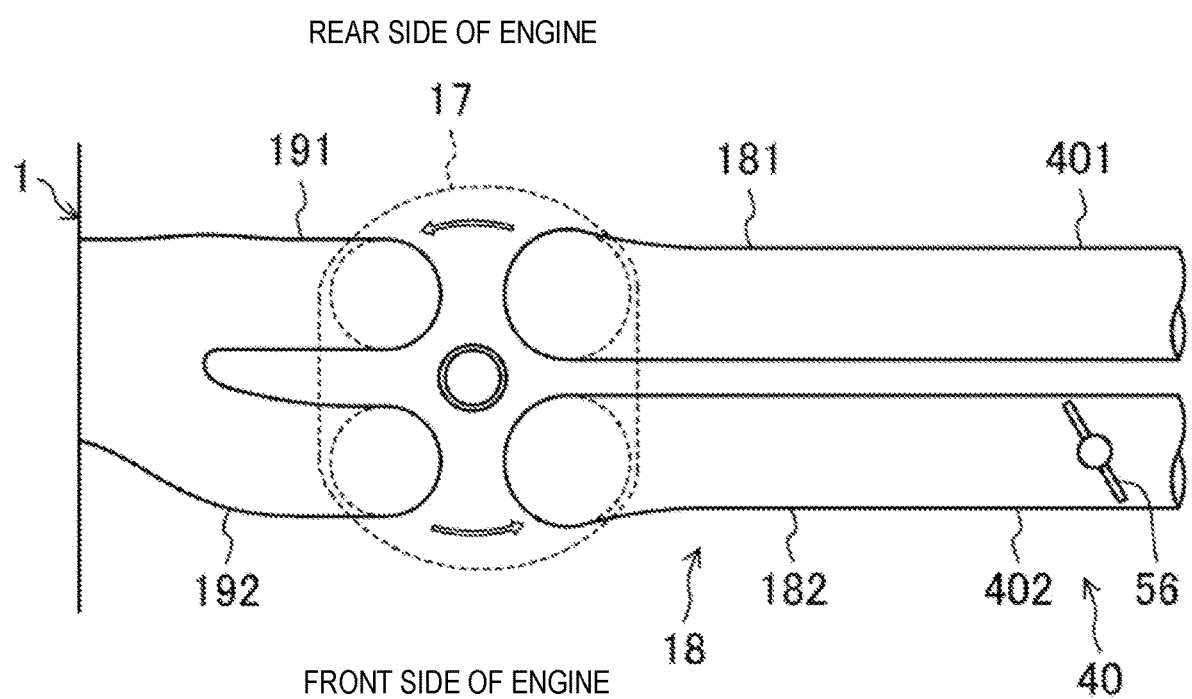
FIG. 3 is a plan view illustrating a configuration of the combustion chamber and an intake system.
Figure 4:
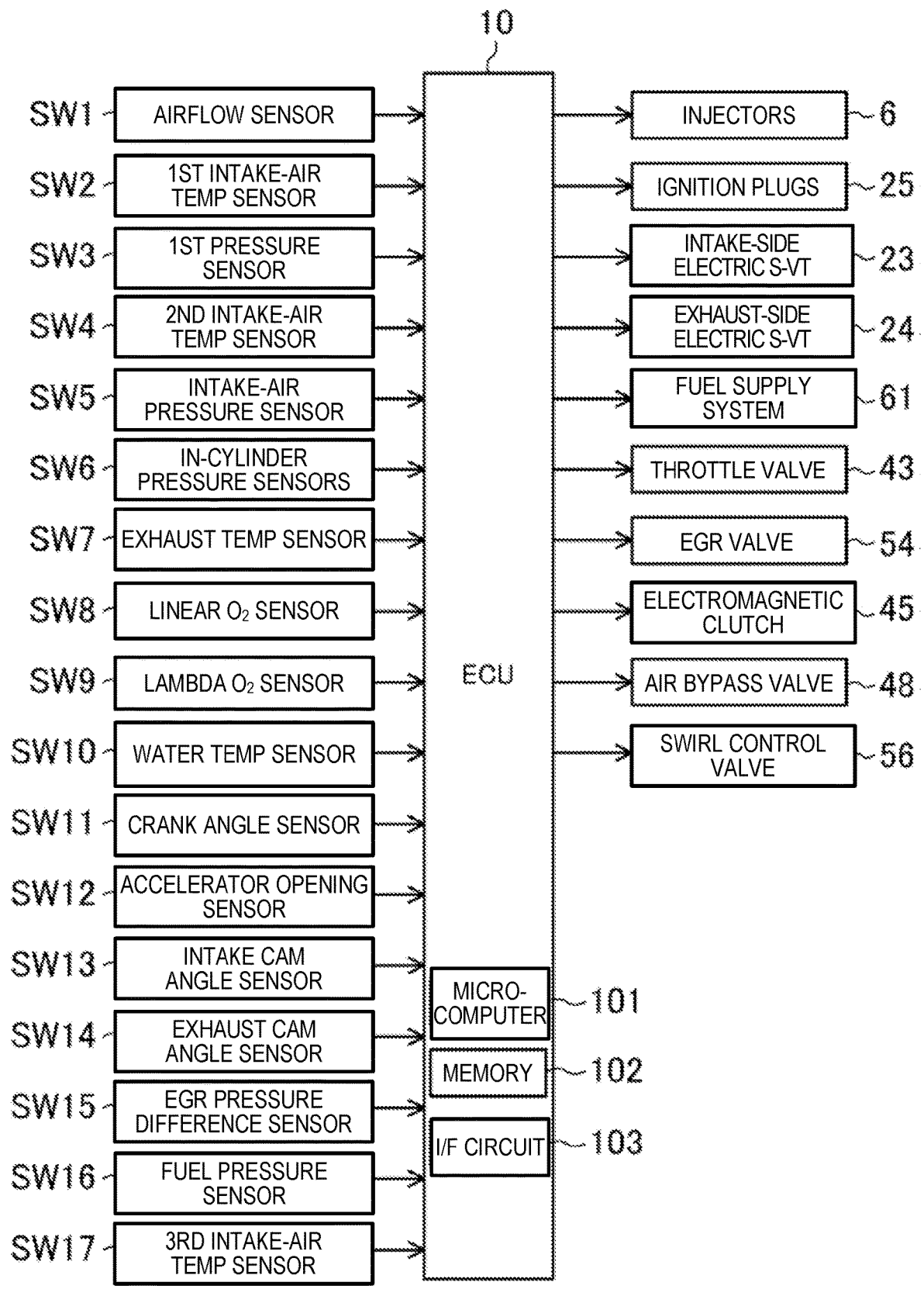
FIG. 4 is a block diagram illustrating a configuration of an engine control system.

FIG. 1 is a view illustrating a configuration of the compression-ignition engine. FIG. 2 is a view illustrating a configuration of a combustion chamber of the engine. FIG. 3 is a view illustrating a configuration of the combustion chamber and an intake system. Note that in FIG. 1, an intake side is the left side in the drawing, and an exhaust side is the right side in the drawing. In FIGS. 2 and 3, the intake side is the right side in the drawings, and the exhaust side is the left side in the drawings. FIG. 4 is a block diagram illustrating a configuration of a control system of the engine.

An engine 1 is a four-stroke engine which operates by combustion chambers 17 repeating an intake stroke, a compression stroke, an expansion stroke, and an exhaust stroke. The engine 1 is mounted on an automobile with four wheels. The automobile travels by operating the engine 1. Fuel of the engine 1 is gasoline in this example. The fuel may be a liquid fuel containing at least gasoline. The fuel may be gasoline containing, for example, bioethanol.

(Engine Configuration)

The engine 1 includes a cylinder block 12 and a cylinder head 13 placed thereon. A plurality of cylinders 11 are formed inside the cylinder block 12. In FIGS. 1 and 2, only one cylinder 11 is illustrated. The engine 1 is a multi-cylinder engine.

A piston 3 is slidably inserted in each cylinder 11. The pistons 3 are connected with a crankshaft 15 through respective connecting rods 14. Each piston 3 defines the combustion chamber 17, together with the cylinder 11 and the cylinder head 13. Note that the term "combustion chamber" may be used in a broad sense. That is, the term "combustion chamber" may refer to a space formed by the piston 3, the cylinder 11, and the cylinder head 13, regardless of the position of the piston 3.

As illustrated in the lower portion of FIG. 2, a lower surface of the cylinder head 13, i.e., a ceiling surface of the combustion chamber 17, is comprised of a slope 1311 and a slope 1312. The slope 1311 is a rising gradient from the intake side toward an injection axial center X2 of an injector 6 which will be described later. The slope 1312 is a rising gradient from the exhaust side toward the injection axial center X2. The ceiling surface of the combustion chamber 17 is a so-called "pent-roof" shape.

An upper surface of the piston 3 is bulged toward the ceiling surface of the combustion chamber 17. A cavity 31 is formed in the upper surface of the piston 3. The cavity 31 is a dent in the upper surface of the piston 3. The cavity 31 has a shallow pan shape in this example. The center of the cavity 31 is offset at the exhaust side with respect to a center axis X1 of the cylinder 11.

A geometric compression ratio of the engine 1 is set 10 or higher and 30 or lower. The engine 1 which will be described later performs SPCCI (SPark Controlled Compression-Ignition) combustion that is a combination of SI (spark ignition) combustion and CI (compression ignition) combustion in a portion of operating ranges. SPCCI combustion controls the CI combustion using a heat generation and a pressure buildup by the SI combustion. The engine 1 is the compression-ignition engine. However, in this engine 1, temperature of the combustion chamber 17, when the piston 3 is at a compression top dead center (i.e., compression end temperature), does not need to be increased. In the engine 1, the geometric compression ratio can be set comparatively low. The low geometric compression ratio becomes advantageous in reduction of cooling loss and mechanical loss. For engines using regular gasoline (low octane fuel of which an octane number is about 91), the geometric compression ratio of the engine 1 is 14:1-17:1, and for those using high octane gasoline (high octane fuel of which the octane number is about 96), the geometric compression ratio is 15:1-18:1.

An intake port 18 is formed in the cylinder head 13 for each cylinder 11. As illustrated in FIG. 3, each intake port 18 has a first intake port 181 and a second intake port 182. The intake port 18 communicates with the corresponding combustion chamber 17. Although detailed illustration of the intake port 18 is omitted, it is a so-called "tumble port." That is, the intake port 18 has such a shape that a tumble flow is formed in the combustion chamber 17.

Each intake valve 21 is disposed in the intake ports 181 and 182. The intake valve 21 opens and closes a channel between the combustion chamber 17 and the intake port 181 or 182. The intake valves 21 are opened and closed at given timings by a valve operating mechanism. The valve operating mechanism may be a variable valve operating mechanism which varies the valve timing and/or valve lift. In this example, as illustrated in FIG. 4, the variable valve operating mechanism has an intake-side electric S-VT (Sequential-Valve Timing) 23. The intake-side electric S-VT 23 continuously varies a rotation phase of an intake cam shaft within a given angle range. The valve open timing and the valve close timing of the intake valve 21 vary continuously. Note that the electric S-VT may be replaced with a hydraulic S-VT, as the intake valve operating mechanism.

An exhaust port 19 is also formed in the cylinder head 13 for each cylinder 11. As illustrated in FIG. 3, each exhaust port 19 also has a first exhaust port 191 and a second exhaust port 192. The exhaust port 19 communicates with the corresponding combustion chamber 17.

Each exhaust valve 22 is disposed in the exhaust ports 191 and 192. The exhaust valve 22 opens and closes a channel between the combustion chamber 17 and the exhaust port 191 or 192. The exhaust valves 22 are opened and closed at a given timing by a valve operating mechanism. The valve operating mechanism may be a variable valve operating mechanism which varies the valve timing and/or valve lift. In this example, as illustrated in FIG. 4, the variable valve operating mechanism has an exhaust-side electric S-VT 24. The exhaust-side electric S-VT 24 continuously varies a rotation phase of an exhaust cam shaft within a given angle range. The valve open timing and the valve close timing of the exhaust valve 22 change continuously. Note that the electric S-VT may be replaced with a hydraulic S-VT, as the exhaust valve operating mechanism.

The intake-side electric S-VT 23 and the exhaust-side electric S-VT 24 adjust length of an overlap period where both the intake valve 21 and the exhaust valve 22 open. If the length of the overlap period is made longer, the residual gas in the combustion chamber 17 can be purged. Moreover, by adjusting the length of the overlap period, internal EGR (Exhaust Gas Recirculation) gas can be introduced into the combustion chamber 17. An internal EGR system is comprised of the intake-side electric S-VT 23 and the exhaust-side electric S-VT 24. Note that the internal EGR system may not be comprised of the S-VT.

The injector 6 is attached to the cylinder head 13 for each cylinder 11. Each injector 6 directly injects fuel into the combustion chamber 17. The injector 6 is one example of a fuel injection part. The injector 6 is disposed in a valley part of the pent roof where the slope 1311 and the slope 1312 meet. As illustrated in FIG. 2, the injection axial center X2 of the injector 6 is located at the exhaust side of the center axis X1 of the cylinder 11. The injection axial center X2 of the injector 6 is parallel to the center axis X1. The injection axial center X2 of the injector 6 and the center of the cavity 31 are in agreement with each other. The injector 6 faces the cavity 31. Note that the injection axial center X2 of the injector 6 may be in agreement with the center axis X1 of the cylinder 11. In such a configuration, the injection axial center X2 of the injector 6 and the center of the cavity 31 may be in agreement with each other.

Although detailed illustration is omitted, the injector 6 is comprised of a multi nozzle-port type fuel injection valve having a plurality of nozzle ports. As illustrated by two-dot chain lines in FIG. 2, the injector 6 injects fuel so that the fuel spreads radially from the center of the combustion chamber 17. The injector 6 has ten nozzle ports in this example, and the nozzle port is disposed so as to be equally spaced in the circumferential direction.

The injectors 6 are connected to a fuel supply system 61. The fuel supply system 61 includes a fuel tank 63 configured to store fuel, and a fuel supply passage 62 which connects the fuel tank 63 to the injector 6. In the fuel supply passage 62, a fuel pump 65 and a common rail 64 are provided. The fuel pump 65 pumps fuel to the common rail 64. The fuel pump 65 is a plunger pump driven by the crankshaft 15 in this example. The common rail 64 stores fuel pumped from the fuel pump 65 at a high fuel pressure. When the injector 6 is opened, the fuel stored in the common rail 64 is injected into the combustion chamber 17 from the nozzle ports of the injector 6. The fuel supply system 61 can supply fuel to the injectors 6 at a high pressure of 30 MPa or higher. The pressure of fuel supplied to the injector 6 may be changed according to the operating state of the engine 1. Note that the configuration of the fuel supply system 61 is not limited to the configuration described above.

An ignition plug 25 is attached to the cylinder head 13 for each cylinder 11. The ignition plug 25 forcibly ignites a mixture gas inside the combustion chamber 17. The ignition plug 25 is disposed at the intake side of the center axis X1 of the cylinder 11 in this example. The ignition plug 25 is located between the two intake ports 181 and 182 of each cylinder. The ignition plug 25 is attached to the cylinder head 13 so as to incline downwardly toward the center of the combustion chamber 17. As illustrated in FIG. 2, the electrode of the ignition plug 25 faces to the inside of the combustion chamber 17 and is located near the ceiling surface of the combustion chamber 17. Note that the ignition plug 25 may be disposed at the exhaust side of the center axis X1 of the cylinder 11. Moreover, the ignition plug 25 may be disposed on the center axis X1 of the cylinder 11.

An intake passage 40 is connected to one side surface of the engine 1. The intake passage 40 communicates with the intake port 18 of each cylinder 11. Gas introduced into the combustion chamber 17 flows through the intake passage 40. An air cleaner 41 is disposed in an upstream end part of the intake passage 40. The air cleaner 41 filters fresh air. A surge tank 42 is disposed near the downstream end of the intake passage 40. A portion of the intake passage 40 downstream of the surge tank 42 constitutes independent passages branched from the intake passage 40 for each cylinder 11. The downstream end of each independent passage is connected to the intake port 18 of each cylinder 11.

A throttle valve 43 is disposed between the air cleaner 41 and the surge tank 42 in the intake passage 40. The throttle valve 43 adjusts an introducing amount of the fresh air into the combustion chamber 17 by adjusting an opening of the throttle valve.

A supercharger 44 is also disposed in the intake passage 40, downstream of the throttle valve 43. The supercharger 44 boosts gas to be introduced into the combustion chamber 17. In this example, the supercharger 44 is a mechanical supercharger driven by the engine 1. The mechanical supercharger 44 may be a Roots, Lysholm, Vane, or a centrifugal type.

An electromagnetic clutch 45 is provided between the supercharger 44 and the engine 1. The electromagnetic clutch 45 transmits a driving force from the engine 1 to the supercharger 44 or disengages the transmission of the driving force between the supercharger 44 and the engine 1. As will be described later, an ECU 10 switches the disengagement and engagement of the electromagnetic clutch 45 to switch the supercharger 44 between ON and OFF.

An intercooler 46 is disposed downstream of the supercharger 44 in the intake passage 40. The intercooler 46 cools gas compressed by the supercharger 44. The intercooler 46 may be of a water cooling type or an oil cooling type, for example.

A bypass passage 47 is connected to the intake passage 40. The bypass passage 47 connects an upstream part of the supercharger 44 to a downstream part of the intercooler 46 in the intake passage 40 so as to bypass the supercharger 44 and the intercooler 46. An air bypass valve 48 is disposed in the bypass passage 47. The air bypass valve 48 adjusts a flow rate of gas flowing in the bypass passage 47.

The ECU 10 fully opens the air bypass valve 48 when the supercharger 44 is turned OFF (i.e., when the electromagnetic clutch 45 is disengaged). The gas flowing through the intake passage 40 bypasses the supercharger 44 and is introduced into the combustion chamber 17 of the engine 1. The engine 1 operates in a non-supercharged state, i.e., a natural aspiration state.

When the supercharger 44 is turned ON, the engine 1 operates in a supercharged state. The ECU 10 adjusts an opening of the air bypass valve 48 when the supercharger 44 is turned ON (i.e., when the electromagnetic clutch 45 is engaged). A portion of the gas which passed through the supercharger 44 flows back upstream of the supercharger 44 through the bypass passage 47. When the ECU 10 adjusts the opening of the air bypass valve 48, a supercharging pressure of gas introduced into the combustion chamber 17 changes. Note that the term "supercharging" as used herein refers to a situation where the pressure inside the surge tank 42 exceeds an atmospheric pressure, and "non-supercharging" refers to a situation where the pressure inside the surge tank 42 becomes below the atmospheric pressure.

In this example, a supercharging system 49 is comprised of the supercharger 44, the bypass passage 47, and the air bypass valve 48.

The engine 1 has a swirl generating part which generates a swirl flow inside the combustion chamber 17. As illustrated in FIG. 3, the swirl generating part has a swirl control valve 56 attached to the intake passage 40. Among a primary passage 401 coupled to the first intake port 181 and a secondary passage 402 coupled to the second intake port 182, the swirl control valve 56 is disposed in the secondary passage 402. The swirl control valve 56 is an opening control valve which is capable of choking a cross section of the secondary passage 402. When the opening of the swirl control valve 56 is small, since an intake flow rate of air flowing into the combustion chamber 17 from the first intake port 181 is relatively large, and an intake flow rate of air flowing into the combustion chamber 17 from the second intake port 182 is relatively small, the swirl flow inside the combustion chamber 17 becomes stronger. On the other hand, when the opening of the swirl control valve 56 is large, since the intake flow rates of air flowing into the combustion chamber 17 from the first intake port 181 and the second intake port 182 become substantially equal, the swirl flow inside the combustion chamber 17 becomes weaker. When the swirl control valve 56 is fully opened, the swirl flow will not occur. Note that the swirl flow circulates counterclockwise in FIG. 3, as illustrated by white arrows (also see white arrows in FIG. 2).

An exhaust passage 50 is connected to the other side surface of the engine 1. The exhaust passage 50 communicates with the exhaust port 19 of each cylinder 11. The exhaust passage 50 is a passage through which exhaust gas discharged from the combustion chambers 17 flows. Although detailed illustration is omitted, an upstream portion of the exhaust passage 50 constitutes independent passages branched from the exhaust passage 50 for each cylinder 11. The upper end of the independent passage is connected to the exhaust port 19 of each cylinder 11.

An exhaust gas purification system having a plurality of catalytic converters is disposed in the exhaust passage 50. Although illustration is omitted, an upstream catalytic converter is disposed inside an engine bay. The upstream catalytic converter has a three-way catalyst 511 and a GPF (Gasoline Particulate Filter) 512. The downstream catalytic converter is disposed outside the engine bay. The downstream catalytic converter has a three-way catalyst 513. Note that the exhaust gas purification system is not limited to the illustrated configuration. For example, the GPF may be omitted. Moreover, the catalytic converter is not limited to those having the three-way catalyst. Further, the order of the three-way catalyst and the GPF may suitably be changed.

Between the intake passage 40 and the exhaust passage 50, an EGR passage 52 which constitutes an external EGR system is connected. The EGR passage 52 is a passage for recirculating a portion of the exhaust gas to the intake passage 40. The upstream end of the EGR passage 52 is connected between the upstream catalytic converter and the downstream catalytic converter in the exhaust passage 50. The downstream end of the EGR passage 52 is connected to an upstream part of the supercharger 44 in the intake passage 40. EGR gas flowing through the EGR passage 52 flows into the upstream part of the supercharger 44 in the intake passage 40, without passing through the air bypass valve 48 of the bypass passage 47.

An EGR cooler 53 of water cooling type is disposed in the EGR passage 52. The EGR cooler 53 cools the exhaust gas. An EGR valve 54 is also disposed in the EGR passage 52. The EGR valve 54 adjusts a flow rate of the exhaust gas flowing through the EGR passage 52. By adjusting the opening of the EGR valve 54, an amount of the cooled exhaust gas, i.e., a recirculating amount of external EGR gas can be adjusted.

In this example, an EGR system 55 is comprised of the external EGR system and the internal EGR system. The external EGR system can supply the lower-temperature exhaust gas to the combustion chamber 17 than the internal EGR system.

The control system of the compression-ignition engine includes the ECU (Engine Control Unit) 10 for operating the engine 1. The ECU 10 is a controller based on a well-known microcomputer, and as illustrated in FIG. 4, includes a microcomputer 101 including a processor such as a central processing unit (CPU) which executes computer programs, a memory 102 which, for example, is comprised of RAM (Random Access Memory) and/or ROM (Read Only Memory), and stores the programs and data, and an interface (I/F) circuit 103 which inputs and outputs an electrical signal.

As illustrated in FIGS. 1 and 4, various kinds of sensors SW1-SW17 are connected to the ECU 10. The sensors SW1-SW17 output signals to the ECU 10. The sensors include the following sensors:

Airflow sensor SW1: Disposed downstream of the air cleaner 41 in the intake passage 40, and measures a flow rate of fresh air flowing through the intake passage 40;

First intake-air temperature sensor SW2: Disposed downstream of the air cleaner 41 in the intake passage 40, and measures the temperature of fresh air flowing through the intake passage 40;

First pressure sensor SW3: Disposed downstream of the connected position of the EGR passage 52 in the intake passage 40 and upstream of the supercharger 44, and measures the pressure of gas flowing into the supercharger 44;

Second intake-air temperature sensor SW4: Disposed downstream of the supercharger 44 in the intake passage 40 and upstream of the connected position of the bypass passage 47, and measures the temperature of gas flowed out of the supercharger 44;

Intake pressure sensor SW5: Attached to the surge tank 42, and measures the pressure of gas downstream of the supercharger 44;

In-cylinder pressure sensors SW6: Attached to the cylinder head 13 corresponding to each cylinder 11, and measures the pressure inside each combustion chamber 17;

Exhaust temperature sensor SW7: Disposed in the exhaust passage 50, and measures the temperature of the exhaust gas discharged from the combustion chamber 17;

Linear $O_2$ sensor SW8: Disposed upstream of the upstream catalytic converter in the exhaust passage 50, and measures the oxygen concentration of the exhaust gas;

Lambda $O_2$ sensor SW9: Disposed downstream of the three-way catalyst 511 in the upstream catalytic converter, and measures the oxygen concentration of the exhaust gas;

Water temperature sensor SW10: Attached to the engine 1 and measures the temperature of coolant;

Crank angle sensor SW11: Attached to the engine 1 and measures the rotation angle of the crankshaft 15;

Accelerator opening sensor SW12: Attached to an accelerator pedal mechanism and measures the accelerator opening corresponding to an operating amount of the accelerator pedal;

Intake cam angle sensor SW13: Attached to the engine 1 and measures the rotation angle of an intake cam shaft;

Exhaust cam angle sensor SW14: Attached to the engine 1 and measures the rotation angle of an exhaust cam shaft;

EGR pressure difference sensor SW15: Disposed in the EGR passage 52 and measures a pressure difference between the upstream and the downstream of the EGR valve 54;

Fuel pressure sensor SW16: Attached to the common rail 64 of the fuel supply system 61, and measures the pressure of fuel supplied to the injector 6; and Third intake-air temperature sensor SW17: Attached to the surge tank 42, and measures the temperature of gas inside the surge tank 42, i.e., the temperature of intake air introduced into the combustion chamber 17.

The ECU 10 determines the operating state of the engine 1 based on the signals of the sensors SW1-SW17, and calculates a control amount of each device according to the control logic defined beforehand. The control logic is stored in the memory 102. The control logic includes calculating a target amount and/or the control amount by using a map stored in the memory 102.

The ECU 10 outputs electrical signals according to the calculated control amounts to the injectors 6, the ignition plugs 25, the intake-side electric S-VT 23, the exhaust-side electric S-VT 24, the fuel supply system 61, the throttle valve 43, the EGR valve 54, the electromagnetic clutch 45 of the supercharger 44, the air bypass valve 48, and the swirl control valve 56.

For example, the ECU 10 sets a target torque of the engine 1 based on the signal of the accelerator opening sensor SW12 and the map, and determines a target supercharging pressure. The ECU 10 then performs a feedback control for adjusting the opening of the air bypass valve 48 based on the target supercharging pressure and the pressure difference before and after the supercharger 44 obtained from the signals of the first pressure sensor SW3 and the intake pressure sensor SW5 so that the supercharging pressure becomes the target supercharging pressure.

Moreover, the ECU 10 sets a target EGR rate (i.e., a ratio of the EGR gas to the entire gas inside the combustion chamber 17) based on the operating state of the engine 1 and the map. The ECU 10 then determines a target EGR gas amount based on the target EGR rate and an inhaled air amount based on the signal of the accelerator opening sensor SW12, and performs feedback control for adjusting the opening of the EGR valve 54 based on the pressure difference before and after the EGR valve 54 obtained from the signal of the EGR pressure difference sensor SW15 so that the external EGR gas amount introduced into the combustion chamber 17 becomes the target EGR gas amount.

Further, the ECU 10 performs an air-fuel ratio feedback control when a given control condition is satisfied. For example, the ECU 10 adjusts the fuel injection amount of the injector 6 based on the oxygen concentration of the exhaust gas which is measured by the linear $O_2$ sensor SW8 and the lambda $O_2$ sensor SW9 so that the air-fuel ratio of the mixture gas becomes a desired value.

Note that the details of other controls of the engine 1 executed by the ECU 10 will be described later.

(Concept of SPCCI Combustion)

The engine 1 performs combustion by compressed self ignition under a given operating state, mainly to improve fuel consumption and emission performance. The combustion by self-ignition varies largely at the timing of the self-ignition, if the temperature inside the combustion chamber 17 before a compression starts is nonuniform. Thus, the engine 1 performs SPCCI combustion which is a combination of SI combustion and CI combustion.

SPCCI combustion is combustion in which the ignition plug 25 forcibly ignites the mixture gas inside the combustion chamber 17 so that the mixture gas carries out SI combustion by flame propagation, and the temperature inside the combustion chamber 17 increases by the heat generation of SI combustion and the pressure inside the combustion chamber 17 increases by the flame propagation so that unburnt mixture gas carries out CI combustion by self-ignition.

By adjusting the heat amount of SI combustion, the variation in the temperature inside the combustion chamber 17 before a compression starts can be absorbed. By the ECU 10 adjusting the ignition timing, the mixture gas can be self-ignited at a target timing.

Figure 5:
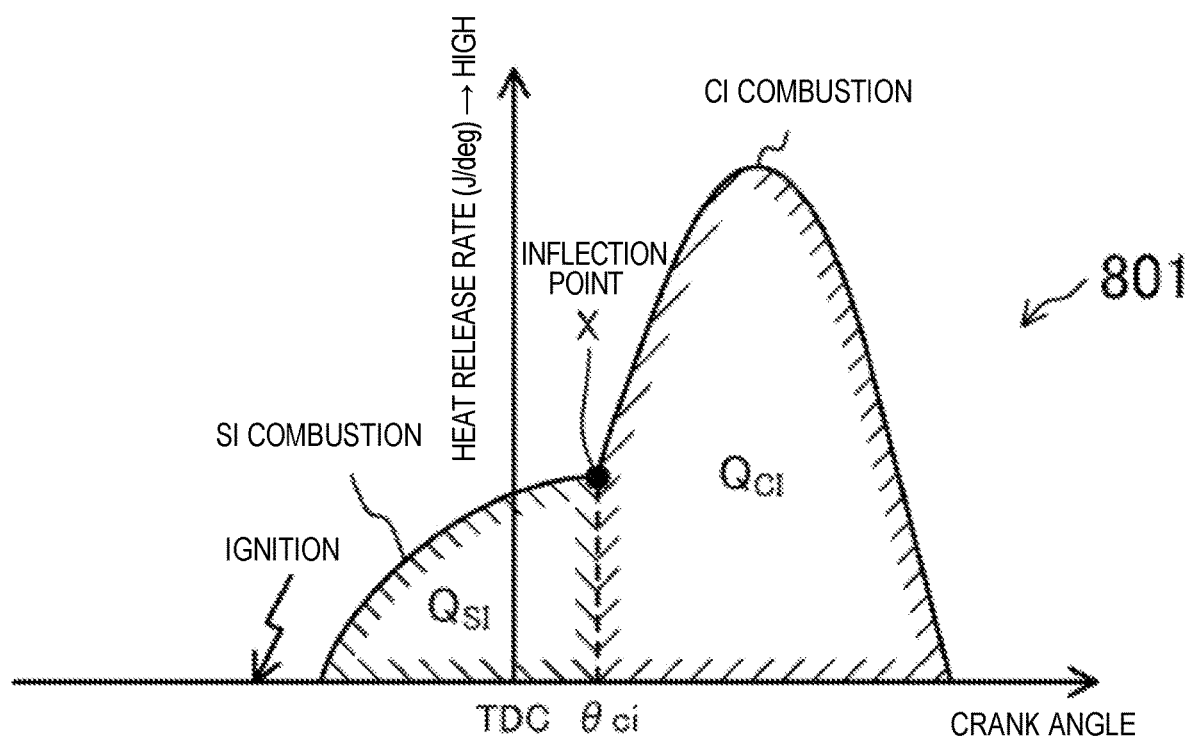
FIG. 5 is a graph illustrating a waveform of SPCCI combustion.

In SPCCI combustion, the heat release of SI combustion is slower than the heat release in CI combustion. As illustrated in FIG. 5, the waveform of the heat release rate $(dQ/d\theta)$ of SI combustion in SPCCI combustion is smaller in the rising slope than the waveform in CI combustion. In addition, SI combustion is slower in the pressure fluctuation $(dp/d\theta)$ inside the combustion chamber 17 than CI combustion.

When the unburnt mixture gas self-ignites after SI combustion is started, the waveform slope of the heat release rate may become steeper. The waveform of the heat release rate may have an inflection point X at a timing of starting CI combustion.

After the start in CI combustion, SI combustion and CI combustion are performed in parallel. Since CI combustion has a larger heat release than SI combustion, the heat release rate becomes relatively large. However, since CI combustion is performed after a compression top dead center, the waveform slope of the heat release rate does not become too steep. The pressure fluctuation in CI combustion $(dp/d\theta)$ also becomes comparatively slow.

The pressure fluctuation $(dp/d\theta)$ can be used as an index representing combustion noise. As described above, since SPCCI combustion can reduce the pressure fluctuation $(dp/d\theta)$, it is possible to avoid excessive combustion noise. Combustion noise of the engine 1 can be kept below a tolerable level.

SPCCI combustion is completed when CI combustion is finished. CI combustion is shorter in the combustion period than SI combustion. The end timing of SPCCI combustion becomes earlier than SI combustion.

The heat release rate waveform of SPCCI combustion is formed so that a first heat release rate waveform $Q_{SI}$ formed by SI combustion and a second heat release waveform $Q_{CI}$ formed by CI combustion continue in this order.

Here, a SI ratio is defined as a parameter indicative of a characteristic of SPCCI combustion. The present applicant defines the SI ratio as an index related to a ratio of an amount of heat generated by SI combustion to the entire amount of heat generated by SPCCI combustion. The SI ratio is a ratio of amount of heat generated by the two combustions of different combustion forms. When the SI ratio is high, the ratio of SI combustion is high, and on the other hand, when the SI ratio is low, the ratio of CI combustion is high. If the ratio of SI combustion in SPCCI combustion is high, it becomes advantageous for the reduction of combustion noise. On the other hand, if the ratio of CI combustion in SPCCI combustion is high, it becomes advantageous for the improvement of fuel efficiency of the engine.

The SI ratio may be defined as a ratio of the amount of heat generated by SI combustion to the amount of heat generated by CI combustion. That is, if the crank angle at which CI combustion starts in SPCCI combustion is a CI combustion start timing θci, the SI ratio may be equal to $Q_{SI}/Q_{CI}$ (SI ratio=$Q_{SI}/Q_{CI}$) based on an area $Q_{SI}$ of SI combustion on advance side of θci and an area $Q_{CI}$ of CI combustion on retard side including θci, in the waveform 801 illustrated in FIG. 5.

The engine 1 may generate a strong swirl flow inside the combustion chamber 17 when performing SPCCI combustion. The term "strong swirl flow" may be defined as a flow having a swirl ratio of four or higher, for example. The swirl ratio can be defined as a value obtained by dividing an integrated value of intake flow lateral angular velocities by an engine angular velocity, where the intake flow lateral angular velocity is measured for every valve lift, and the measured values are integrated to obtain the integrated value. Although illustration is omitted, the intake flow lateral angular velocity can be obtained based on measurement using known rig test equipment.

When the strong swirl flow is generated in the combustion chamber 17, the swirl flow is stronger in an outer circumferential part of the combustion chamber 17 and is relatively weaker in a central part. By the whirlpool resulting from a velocity gradient at the boundary between the central part and the outer circumferential part, turbulence energy becomes higher in the central part. When the ignition plug 25 ignites the mixture gas in the central part, the combustion speed of SI combustion becomes higher by the high turbulence energy.

Flame of SI combustion is carried by the strong swirl flow inside the combustion chamber 17 and propagates in the circumferential direction. CI combustion is performed from the outer circumferential part to the central part in the combustion chamber 17.

When the strong swirl flow is generated in the combustion chamber 17, SI combustion can fully be performed before the start in CI combustion. Thus, the generation of combustion noise can be reduced, and the variation in the torque between cycles can be reduced.

(Engine Operating Range)

Figure 6:
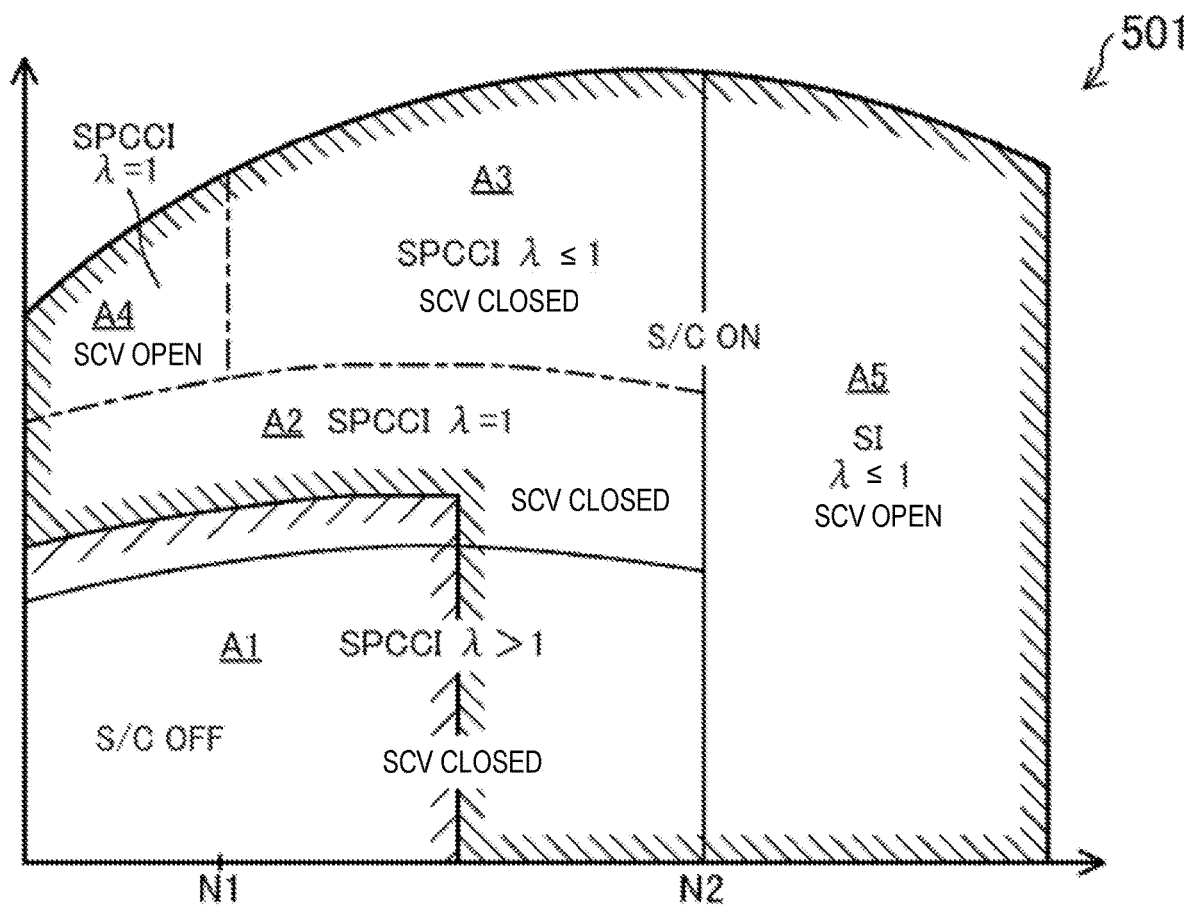
FIG. 6 is a graph illustrating a map when the engine is warm.

FIG. 6 illustrates a map 501 according to the control of the engine 1. The map 501 is stored in the memory 102 of the ECU 10. The map 501 is a map when the engine 1 is warm. The map 501 is defined based on the load and the engine speed of the engine 1. The first map 501 is roughly divided into three areas depending on the load and the engine speed. For example, as illustrated by the solid lines for the boundary, the three areas include a low load area A1, a middle-to-high load area (A2, A3, and A4), and a high speed area A5. The low load area A1 includes idle operation, and covers areas of a low engine speed and a middle engine speed. The middle-to-high load area (A2, A3, and A4) are higher in the load than the low load area A1. The high speed area A5 is higher in the engine speed than the low load area A1 and the middle-to-high load area (A2, A3, and A4).

Here, a low speed area, a middle speed area, and the high speed area may be defined by substantially equally dividing the entire operating range of the engine 1 into three areas in the engine speed direction. In the example of FIG. 6, the engine speed is defined to be a low speed if the engine speed is lower than the engine speed N1, a high speed if the engine speed is higher than or equal to the engine speed N2, and a middle speed if the engine speed is higher than or equal to the engine speed N1 and lower than the engine speed N2. For example, the engine speed N1 may be about 1,200 rpm, and the engine speed N2 may be about 4,000 rpm.

Moreover, the low load area may be an area including an operating state with the light load, the high load area may be an area including an operating state with full load, and the middle load area may be an area between the low load area and the high load area. Moreover, the low load area, the middle load area, and the high load area may be defined by substantially equally dividing the entire operating range of the engine 1 into three areas in the load direction.

The map 501 illustrates the state and combustion mode of the mixture gas in each area of the map, the opening of the swirl control valve 56 in each area, and a driving area and a non-driving area of the supercharger 44. The engine 1 performs SPCCI combustion in the low load area A1, the middle load area A2, the high-load middle-speed area A3, and the high-load low-speed area A4. The engine 1 performs SI combustion in other areas, specifically, in the high speed area A5. Below, the operation of the engine 1 in each area will be described in detail.

(Operation of Engine in Low Load Area)

The engine 1 performs SPCCI combustion when the engine 1 operates in the low load area A1.

In order to improve fuel efficiency of the engine 1, the EGR system 55 introduces the EGR gas into the combustion chamber 17. For example, the intake-side electric S-VT 23 and the exhaust-side electric S-VT 24 are provided with a positive overlap period where both the intake valve 21 and the exhaust valve 22 are opened near an exhaust top dead center. A portion of the exhaust gas discharged from the combustion chamber 17 into the intake port 18 and the exhaust port 19 is re-introduced into the combustion chamber 17. Since the hot exhaust gas is introduced into the combustion chamber 17, the temperature inside the combustion chamber 17 increases. Thus, it becomes advantageous to stabilize SPCCI combustion. Note that the intake-side electric S-VT 23 and the exhaust-side electric S-VT 24 may be provided with a negative overlap period where both the intake valve 21 and the exhaust valve 22 are closed.

Moreover, the swirl generating part forms the strong swirl flow inside the combustion chamber 17. The swirl ratio is four or higher, for example. The swirl control valve 56 is fully closed or at a given opening (closed to some extent). As described above, since the intake port 18 is the tumble port, an inclined swirl flow having a tumble component and a swirl component is formed in the combustion chamber 17.

The injector 6 injects fuel into the combustion chamber 17 a plurality of times during the intake stroke. The mixture gas is stratified by the multiple fuel injections and the swirl flow inside the combustion chamber 17.

The fuel concentration of the mixture gas in the central part of the combustion chamber 17 is denser or richer than the fuel concentration in the outer circumferential part. For example, the air-fuel ratio (A/F) of the mixture gas in the central part is 20:1 or higher and 30:1 or lower, and the A/F of the mixture gas in the outer circumferential part is 35 or higher. Note that the value of the A/F is a value when the mixture gas is ignited, and the same applies to the following description. Since the A/F of the mixture gas near the ignition plug 25 is set 20:1 or higher and 30:1 or lower, generation of raw $NO_x$ during SI combustion can be reduced. Moreover, since the A/F of the mixture gas in the outer circumferential part is set to 35 or higher, CI combustion stabilizes.

The A/F of the mixture gas is leaner than the stoichiometric air fuel ratio throughout the combustion chamber 17 (i.e., excess air ratio λ>1). For example, the A/F of the mixture gas is 30:1 or higher throughout the combustion chamber 17. Thus, the generation of raw $NO_x$ can be reduced to improve the emission performance.

After the fuel injection is finished, the ignition plug 25 ignites the mixture gas in the central part of the combustion chamber 17 at a given timing before a compression top dead center. The ignition timing may be during a final stage of the compression stroke. The compression stroke may be equally divided into three, an initial stage, a middle stage, and a final stage, and this final stage may be used as the final stage of the compression stroke described above.

As described above, since the mixture gas in the central part has the relatively high fuel concentration, the ignitability improves and SI combustion by flame propagation stabilizes. By SI combustion being stabilized, CI combustion begins at a suitable timing. Thus, the controllability in CI combustion improves in SPCCI combustion. Further, the generation of the combustion noise is reduced. Moreover, since the A/F of the mixture gas is made leaner than the stoichiometric air fuel ratio to perform SPCCI combustion, the fuel efficiency of the engine 1 can be significantly improved.

(Operation of Engine in Middle-to-high Load Area)

When the engine 1 operates in the middle-to-high load area (A2, A3, and A4), the engine 1 also performs SPCCI combustion, similar to the low load area A1.

The EGR system 55 introduces the EGR gas into the combustion chamber 17. For example, the intake-side electric S-VT 23 and the exhaust-side electric S-VT 24 are provided with a positive overlap period where both the intake valve 21 and the exhaust valve 22 are opened near an exhaust top dead center. Internal EGR gas is introduced into the combustion chamber 17. Moreover, the EGR system 55 introduces the exhaust gas cooled by the EGR cooler 53 into the combustion chamber 17 through the EGR passage 52. The external EGR gas with a lower temperature than the internal EGR gas is introduced into the combustion chamber 17. The external EGR gas adjusts the temperature inside the combustion chamber 17 to a suitable temperature. The EGR system 55 reduces the amount of the EGR gas as the engine load increases. The EGR system 55 may not recirculate the EGR gas containing the internal EGR gas and the external EGR gas during the full load.

Moreover, in the middle load area A2 and the high-load middle-speed area A3, the swirl control valve 56 is fully closed or at a given opening (closed to some extent). In the combustion chamber 17, the strong swirl flow with the swirl ratio of four or higher is formed. On the other hand, in the high-load low-speed area A4, the swirl control valve 56 is open.

The air-fuel ratio (A/F) of the mixture gas is the stoichiometric air fuel ratio (A/F≈14.7:1) throughout the combustion chamber 17. Since the three-way catalysts 511 and 513 purify the exhaust gas discharged from the combustion chamber 17, the emission performance of the engine 1 is improved. The A/F of the mixture gas may be set within a purification window of the three-way catalyst. The excess air ratio λ of the mixture gas may be 1.0±0.2. Note that when the engine 1 operates in the high-load middle-speed area A3 including the full load (i.e., the maximum load), the A/F of the mixture gas may be set at the stoichiometric air fuel ratio or richer than the stoichiometric air fuel ratio (i.e., the excess air ratio λ of the mixture gas is λ≤1) throughout the combustion chamber 17.

Since the EGR gas is introduced into the combustion chamber 17, a gas-fuel ratio (G/F) which is a weight ratio of the entire gas to the fuel in the combustion chamber 17 becomes leaner than the stoichiometric air fuel ratio. The G/F of the mixture gas may be 18:1 or higher. Thus, a generation of a so-called "knock" is avoided. The G/F may be set 18:1 or higher and 30:1 or lower. Alternatively, the G/F may be set 18:1 or higher and 50:1 or lower.

The injector 6 performs one or more fuel injections during an intake stroke.

The ignition plug 25 ignites the mixture gas at a given timing near a compression top dead center after the fuel is injected. The ignition plug 25 may ignite the mixture gas before the compression top dead center. The ignition plug 25 may ignite the mixture gas after the compression top dead center.

By performing SPCCI combustion of the mixture gas set to the stoichiometric air fuel ratio, the exhaust gas discharged from the combustion chamber 17 can be purified using the three-way catalysts 511 and 513. Moreover, the fuel efficiency of the engine 1 improves by introducing the EGR gas into the combustion chamber 17 and making the mixture gas thinner.

(Operation of Supercharger)

Here, as illustrated in a map 501, the supercharger 44 is OFF (refer to S/C OFF) in a part of the low load area A1 and a part of the middle load area A2. In detail, the supercharger 44 is OFF in a range of the low load area A1 on the low engine speed side. In a partial range of the low load area A1 on the high engine speed side, the supercharger 44 is ON in order to secure an intake filling amount required corresponding to the increase in the engine speed. Moreover, the supercharger 44 is OFF, in a partial range of the middle load area A2 on the low-load low-speed side. In a partial range of the middle load area A2 of the high-load side, the supercharger 44 is ON in order to secure the intake filling amount required corresponding to the increase in the fuel consumption. Moreover, the supercharger 44 is ON also in a partial range of the middle load area A2 on the high engine speed side.

Note that in each of the high-load middle-speed area A3, the high-load low-speed area A4, and the high-speed area A5, the supercharger 44 is ON in the entire range (refer to S/C ON).

(Operation of Engine in High-Speed Area)

As the engine speed increases, a time required for changing the crank angle by 1° becomes shorter. Thus, it becomes difficult to stratify the mixture gas inside the combustion chamber 17. As the engine speed increases, it becomes difficult to perform SPCCI combustion.

Thus, while the engine 1 is operating in the high-speed area A5, the engine 1 performs not SPCCI combustion but SI combustion. Note that the high-speed area A5 stretches entirely in the load direction from low load to high load.

The EGR system 55 introduces EGR gas into the combustion chamber 17. The EGR system 55 reduces an amount of EGR gas as the load increases. The EGR system 55 may make EGR gas zero when the engine is operating with full load.

The swirl control valve 56 is fully open. A swirl flow does not occur inside the combustion chamber 17, but only a tumble flow occurs. By fully opening the swirl control valve 56, it becomes possible to improve the filling efficiency and reduce a pumping loss.

Fundamentally, an air-fuel ratio (A/F) of mixture gas is a stoichiometric air-fuel ratio (A/F≈14.7:1) entirely in the combustion chamber 17. An excess air ratio λ of mixture gas may be set to 1.0±0.2. Note that while the engine 1 is operating with near the full load state, the excess air ratio λ of mixture gas may be less than one.

The injector 6 starts a fuel injection on intake stroke. The injector 6 injects fuel at once. By starting the fuel injection on intake stroke, homogeneous or substantially homogeneous mixture gas is formed inside the combustion chamber 17. Moreover, since a longer vaporizing time of the fuel can be secured, unburnt fuel loss can also be reduced.

The ignition plug 25 ignites the mixture gas at a suitable timing before a compression top dead center after the completion of the fuel injection.

(Control Logic of Engine)

Figure 7A:
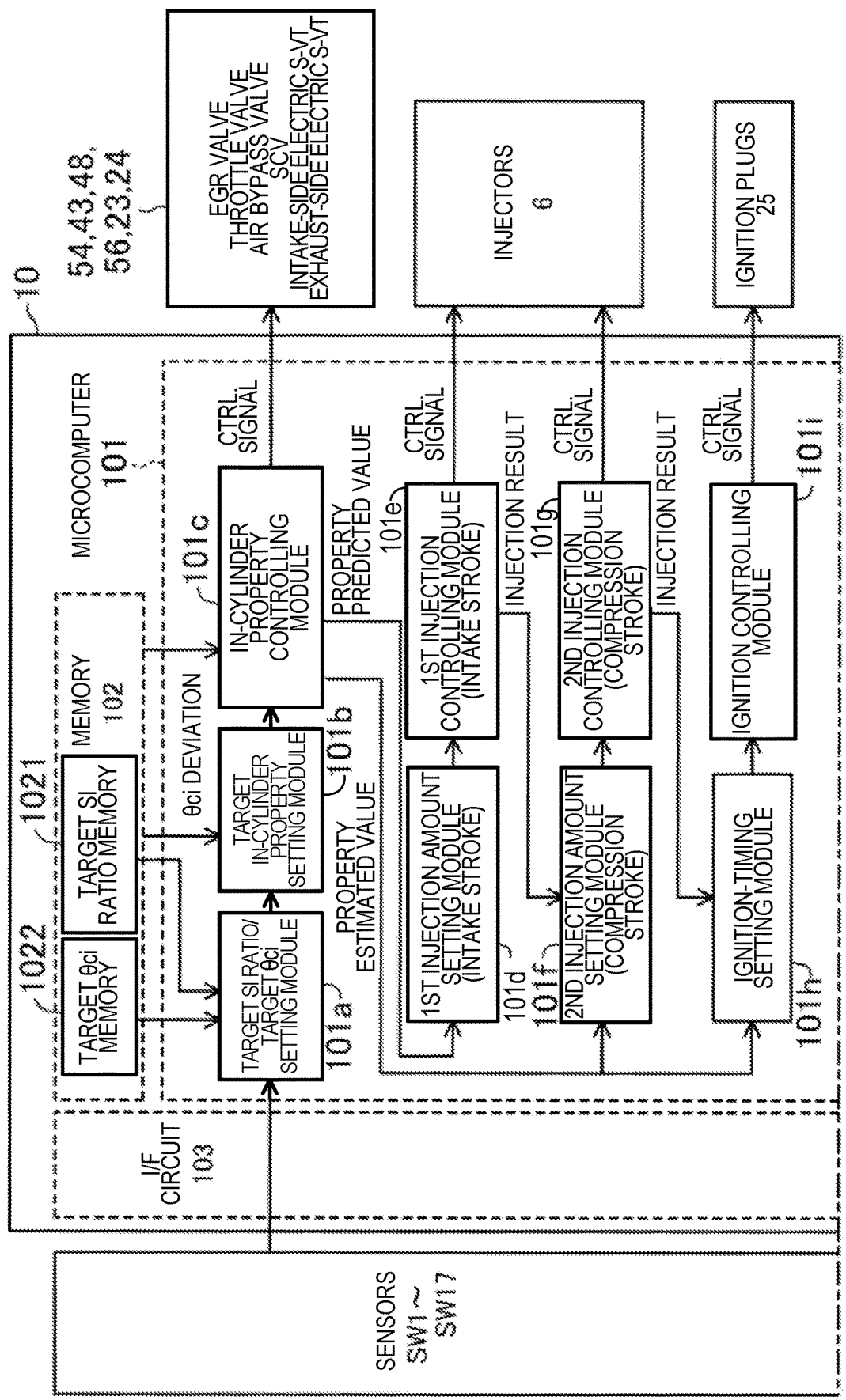
FIG. 7A is a block diagram illustrating a part of a functional configuration of a controller of the engine.
Figure 7B:
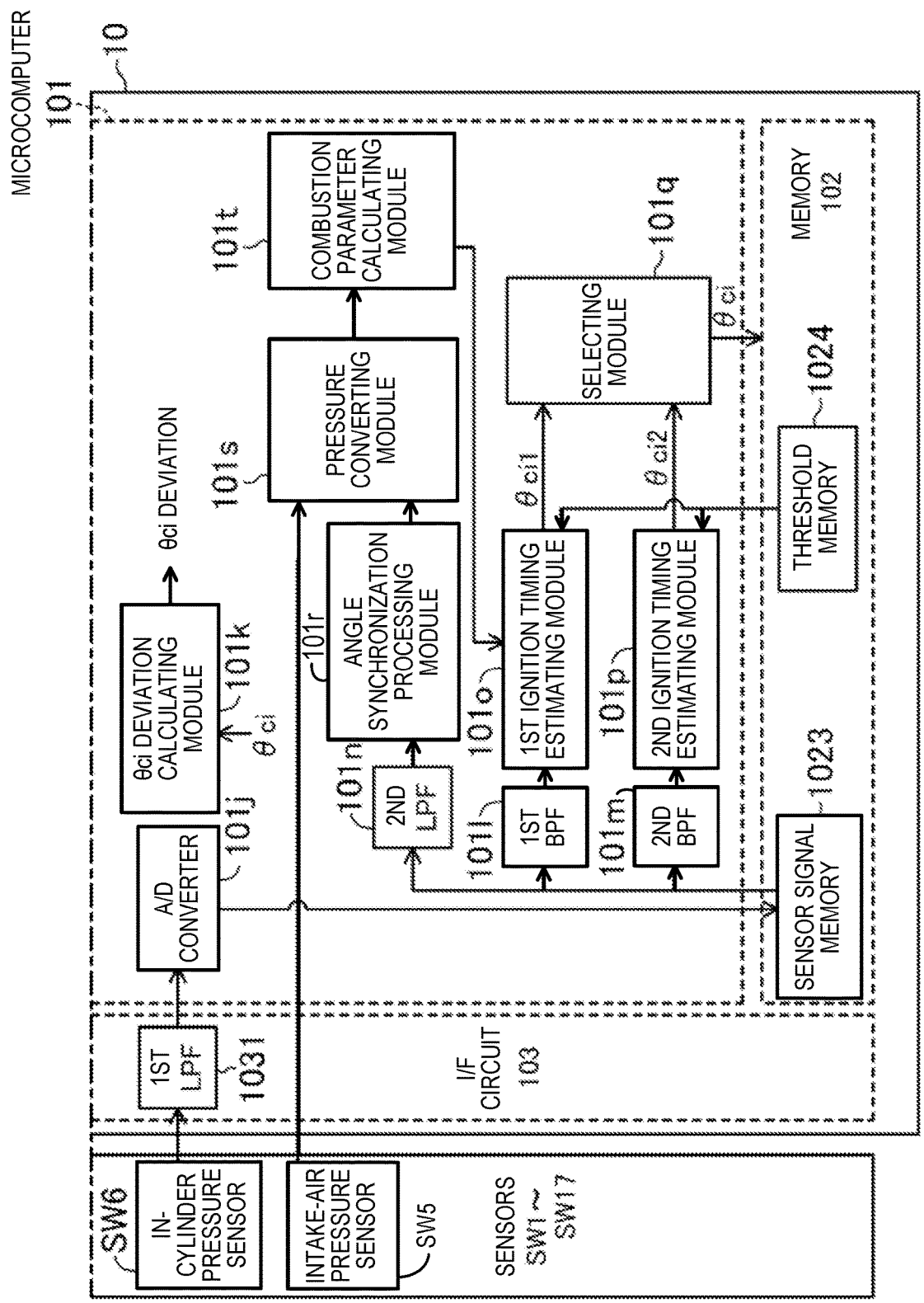
FIG. 7B is a block diagram illustrating a part of the functional configuration of the controller of the engine.

FIGS. 7A and 7B are block diagrams illustrating functional configurations of the ECU 10 which executes control logic of the engine 1. The ECU 10 operates the engine 1 according to the control logic stored in the memory 102. Specifically, the ECU 10 determines the operating state of the engine 1 based on the signals from the sensors SW1-SW17. The ECU 10 performs a calculation for adjusting the properties in the combustion chamber 17, the injection amount, the injection timing, and the ignition timing so that the combustion inside the combustion chamber 17 becomes combustion of the SI ratio according to the operating state, by executing the various software modules stored in the memory 102 and described below.

The ECU 10 controls SPCCI combustion using the two parameters of the SI ratio and θci. Specifically, the ECU 10 defines a target SI ratio and a target θci corresponding to the operating state of the engine 1, and adjusts the temperature inside the combustion chamber 17 and the ignition timing so that an actual SI ratio becomes in agreement with the target SI ratio, and an actual θci becomes in agreement with the target θci. The temperature inside the combustion chamber 17 (in-cylinder temperature Tin) is adjusted by adjusting the temperature and/or the amount of exhaust gas introduced into the combustion chamber 17.

The ECU 10 first reads the signals from the sensors SW1-SW17 through the I/F circuit 103. Subsequently, a target SI ratio/target θci setting module 101a of the microcomputer 101 of the ECU 10 determines the operating state of the engine 1 based on the signals from the sensors SW1-SW17, and sets the target SI ratio (i.e., a target heat amount ratio) and the target CI combustion start timing θci. The target SI ratio is defined according to the operating state of the engine 1. The target SI ratio is stored in a target SI ratio memory 1021 of the memory 102. The target SI ratio/target θci setting module 101a sets a low target SI ratio when the load of the engine 1 is low, and on the other hand, sets a high target SI ratio when the load of the engine 1 is high. By increasing the ratio of CI combustion in SPCCI combustion when the load of the engine 1 is low, the reduction of the combustion noise and the improvement of the fuel efficiency are both achieved. By increasing the ratio of SI combustion in SPCCI combustion when the load of the engine 1 is high, it becomes advantageous for reducing combustion noise.

As described above, θci means the crank angle timing at which CI combustion starts in SPCCI combustion (refer to FIG. 5). The target θci is also defined according to the operating state of the engine 1. The target θci is stored in a target θci memory 1022 of the memory 102. The target θci memory 1022 is one example of a target timing memory. Combustion noise is reduced if θci is on retard side. The fuel efficiency of the engine 1 improves if θci is on advance side. The target θci is set to the advance side as much as possible within a range where the combustion noise can be kept below an allowable limit.

A target in-cylinder property setting module 101b sets target in-cylinder properties for achieving the target SI ratio and target θci set based on a model stored in the memory 102. Specifically, the target in-cylinder property setting module 101b sets a target temperature, a target pressure, and target properties inside the combustion chamber 17.

An in-cylinder property controlling module 101c sets an opening of the EGR valve 54, an opening of the throttle valve 43, an opening of the air by-pass valve 48, an opening of the swirl control valve 56, and phase angles of the intake-side electric S-VT 23 and the exhaust-side electric S-VT 24 (i.e., a valve timing of the intake valve 21 and a valve timing of the exhaust valve 22), which are required for achieving the target in-cylinder properties. The in-cylinder property controlling module 101c sets the properties of these devices based on a map stored in the memory 102. The in-cylinder property controlling module 101c outputs control signals to the EGR valve 54, the throttle valve 43, the air by-pass valve 48, the swirl control valve (SCV) 56, the intake-side electric S-VT 23, and the exhaust-side electric S-VT 24 based on the property settings. By each device operating based on the signal of the ECU 10, the properties in the combustion chamber 17 become the target properties.

The in-cylinder property controlling module 101c further calculates predicted values of the properties in the combustion chamber 17, and estimated values of the properties based on the property settings of the respective devices. The predicted property values are predicted values of the properties in the combustion chamber 17 before the intake valve 21 is closed. The predicted property value is used for setting the fuel injection amount on intake stroke, as will be described later. The estimated property values are estimated values of the properties in the combustion chamber 17 after the intake valve 21 is closed. The estimated property value is used for setting the fuel injection amount on compression stroke and the ignition timing, as will be described later.

A first injection amount setting module 101d sets the fuel injection amount on intake stroke based on the predicted property values. When performing divided injections on intake stroke, an amount of each injection is set. Note that when not injecting fuel on intake stroke, the first injection amount setting module 101d sets the fuel injection amount to zero. A first injection controlling module 101e outputs a control signal to the injector 6 so that the injector 6 injects fuel into the combustion chamber 17 at a given injection timing. The first injection controlling module 101e also outputs a result of the fuel injection on intake stroke.

A second injection amount setting module 101f sets a fuel injection amount on compression stroke based on the estimated property value and the result of the fuel injection on intake stroke. Note that when not injecting fuel on compression stroke, the second injection amount setting module 101f sets the fuel injection amount to zero. A second injection controlling module 101g outputs a control signal to the injector 6 so that the injector 6 injects fuel into the combustion chamber 17 at an injection timing based on a preset map. The second injection controlling module 101g also outputs the result of the fuel injection on compression stroke.

An ignition-timing setting module 101h sets an ignition timing based on the estimated property value and the result of the fuel injection on compression stroke. An ignition controlling module 101i outputs a control signal to the ignition plug 25 so that the ignition plug 25 ignites the mixture gas inside the combustion chamber 17 at the set ignition timing.

Here, if the ignition-timing setting module 101h anticipates that the temperature inside the combustion chamber 17 will become lower than the target temperature based on the estimated property value, it then advances the injection timing on compression stroke more than the injection timing based on the map so that it becomes possible to advance the ignition timing. Moreover, if the ignition-timing setting module 101*h* anticipates that the temperature inside the combustion chamber 17 will become higher than the target temperature based on the estimated property value, it then retards the injection timing on compression stroke more than the injection timing based on the map so that it becomes possible to retard the ignition timing.

That is, if the temperature inside the combustion chamber 17 is low, the timing at which the unburnt mixture gas self-ignites (CI combustion start timing θci) is delayed after SI combustion begins by jump-spark ignition, and thereby the SI ratio deviates from the target SI ratio. In such a case, an increase in unburnt fuel and a fall of the exhaust emission performance are caused.

Therefore, if it is anticipated that the temperature inside the combustion chamber 17 becomes lower than the target temperature, the first injection controlling module 101*e* and/or the second injection controlling module 101*g* advances the injection timing, and the ignition-timing setting module 101*h* advances the ignition timing. Since the sufficient heat release becomes possible by SI combustion by making the start of SI combustion earlier, a delay of the timing θci of the self-ignition of unburnt mixture gas can be prevented, when the temperature inside the combustion chamber 17 is low. As a result, θci approaches the target θci, and the SI ratio approaches the target SI ratio.

Moreover, if the temperature inside the combustion chamber 17 is high, unburnt mixture gas self-ignites shortly after SI combustion begins by jump-spark ignition, and thereby the SI ratio deviates from the target SI ratio. In such a case, combustion noise increases.

Therefore, if it is anticipated that the temperature inside the combustion chamber 17 becomes higher than the target temperature, the first injection controlling module 101*e* and/or the second injection controlling module 101*g* retard the injection timing, and the ignition-timing setting module 101*h* retards the ignition timing. Since the start of SI combustion is delayed, it can prevent that the timing θci of the self-ignition of unburnt mixture gas becomes earlier when the temperature inside the combustion chamber 17 is high. As a result, the θci approaches the target θci, and the SI ratio approaches the target SI ratio.

By the ignition plug 25 igniting mixture gas, SI combustion or SPCCI combustion is performed inside the combustion chamber 17. As illustrated in FIG. 7B, the in-cylinder pressure sensor SW6 measures the change in the pressure inside the combustion chamber 17.

The measurement signal of the in-cylinder pressure sensor SW6 is inputted into a first low pass filter (LPF) 1031 of the I/F circuit 103. The first low pass filter 1031 outputs only a signal below a given frequency. The first low pass filter 1031 removes electric noise at high frequency (so-called "white noise") from the measurement signal of the in-cylinder pressure sensor SW6. An analog/digital (A/D) converter 101*j* of the microcomputer 101 converts the measurement signal of the in-cylinder pressure sensor SW6 which passed the first low pass filter 1031 into a digital signal. The A/D converter 101*j* converts the measurement signal of the in-cylinder pressure sensor SW6 into the digital signal, for example, at a sampling frequency of 50 kHz.

A sensor signal memory 1023 of the memory 102 stores the measurement signal of the in-cylinder pressure sensor SW6 converted into the digital signal.

A θci deviation calculating module 101*k* calculates a deviation of the CI combustion start timing θci estimated based on the measurement signal of the in-cylinder pressure sensor SW6 converted into the digital signal from the target θci. The θci deviation calculating module 101*k* outputs the calculated θci deviation to the target in-cylinder property setting module 101*b*. The target in-cylinder property setting module 101*b* corrects the model based on the θci deviation. The target in-cylinder property setting module 101*b* sets the target in-cylinder properties in the subsequent cycles using the corrected model. The details of the θci estimation will be described later.

The control logic of the engine 1 is configured to adjust the SI ratio and θci by the property setting devices, such as the throttle valve 43, the EGR valve 54, the air by-pass valve 48, the swirl control valve 56, the intake-side electric S-VT 23, and the exhaust-side electric S-VT 24. By adjusting the properties in the combustion chamber 17, a rough adjustment of the SI ratio is possible. The control logic of the engine 1 is also configured to adjust the SI ratio and θci by adjusting the injection timing and ignition timing of fuel. By adjusting the injection timing and ignition timing, for example, a difference between the cylinders can be corrected, and a fine adjustment of the self-ignition timing can be performed. By adjusting the SI ratio at the two steps, the engine 1 can achieve the desired SPCCI combustion accurately according to the operating state.

(Estimation of CI Combustion Start Timing θci)

The ECU 10 controls the operation of the engine 1 according to the control logic of the engine 1 described above. The ECU 10 estimates the CI combustion start timing θci by calculating, during the operation of the engine 1, based on the measurements of the pressure fluctuation inside the combustion chamber 17 measured by the in-cylinder pressure sensor SW6. The ECU 10 corrects the ignition timing, etc. based on the estimated θci. By doing this, since the actual θci approaches the target θci, combustion noise of the engine 1 can be reduced, and fuel efficiency of the engine 1 can be improved.

The ECU 10 performs the estimation of θci using two kinds of techniques of a first estimation technique and a second estimation technique, in order to improve the estimation accuracy of θci. A suitable θci is selected from θci1 estimated by the first estimation technique and θci2 estimated by the second estimation technique.

Below, signal processing of the in-cylinder pressure sensor SW6 is described, and the first estimation technique and the second estimation technique which estimate θci are described in this order. If θci is able to be estimated by either one of these estimating methods, the ECU 10 considers that CI combustion occurred appropriately after SI combustion, i.e., SPCCI combustion occurred. On the other hand, if θci is not able to be estimated by these estimating methods, the ECU 10 considers that CI combustion did not occur appropriately after SI combustion (only SI combustion was performed), i.e., SPCCI combustion did not occur. This determination is used when calculating a CI probability Pci which will be described later.

(Signal Processing for in-Cylinder Pressure Sensor)

Referring to FIG. 7B, signal processing for the in-cylinder pressure sensor SW6 by the ECU 10 is described. As described above, the I/F circuit 103 of the ECU 10 is provided with the first low pass filter (LPF) 1031. Moreover, the microcomputer 101 of the ECU 10 is provided with the A/D converter 101*j*, a band-pass filter (BPF) 101*l*, and a second low pass filter (LPF) 101*n*, and is also provided with functional blocks, such as a first ignition timing estimating module 101*o*, a second ignition timing estimating module 101*p*, a selecting module 101*q*, an angle synchronization processing module 101*r*, a pressure converting module 101*s*, and a combustion parameter calculating module 101*t*. Here, the first ignition timing estimating module 101*o* is one example of an "ignition timing estimating module," and the second ignition timing estimating module 101p is one example of a "second ignition timing estimating module."

As described above, the sensor signal memory 1023 stores the signal of the in-cylinder pressure sensor SW6 converted into the digital signal. The signal of the in-cylinder pressure sensor SW6 stored in the sensor signal memory 1023 is inputted into the first ignition timing estimating module 101o through the band-pass filter 101l. Moreover, the signal of the in-cylinder pressure sensor SW6 is inputted into the second ignition timing estimating module 101p through a second band-pass filter 101m.

Although the details will be described later, the CI combustion start timing θci1 which the first ignition timing estimating module 101o estimated by the first estimation technique, and the CI combustion start timing θci2 which the second ignition timing estimating module 101p estimated by the second estimation technique are sent to the selecting module 101q. The selecting module 101q sets the CI combustion start timing θci based on θci1 and/or θci2. The memory 102 stores θci.

Moreover, the signal of the in-cylinder pressure sensor SW6 stored in the sensor signal memory 1023 is inputted into the angle synchronization processing module 101r through the second low pass filter 101n. Then, it is sent to the combustion parameter calculating module 101t through the pressure converting module 101s. The combustion parameter calculating module 101t calculates a parameter indicative of a combustion state based on the inputted information. In this configuration, the combustion parameter calculating module 101t calculates at least the heat release rate dQ/dθ, and a crank angle θmfb10 at which the combustion mass ratio becomes 10%.

(First Technique for Estimating θci)

Figure 8:
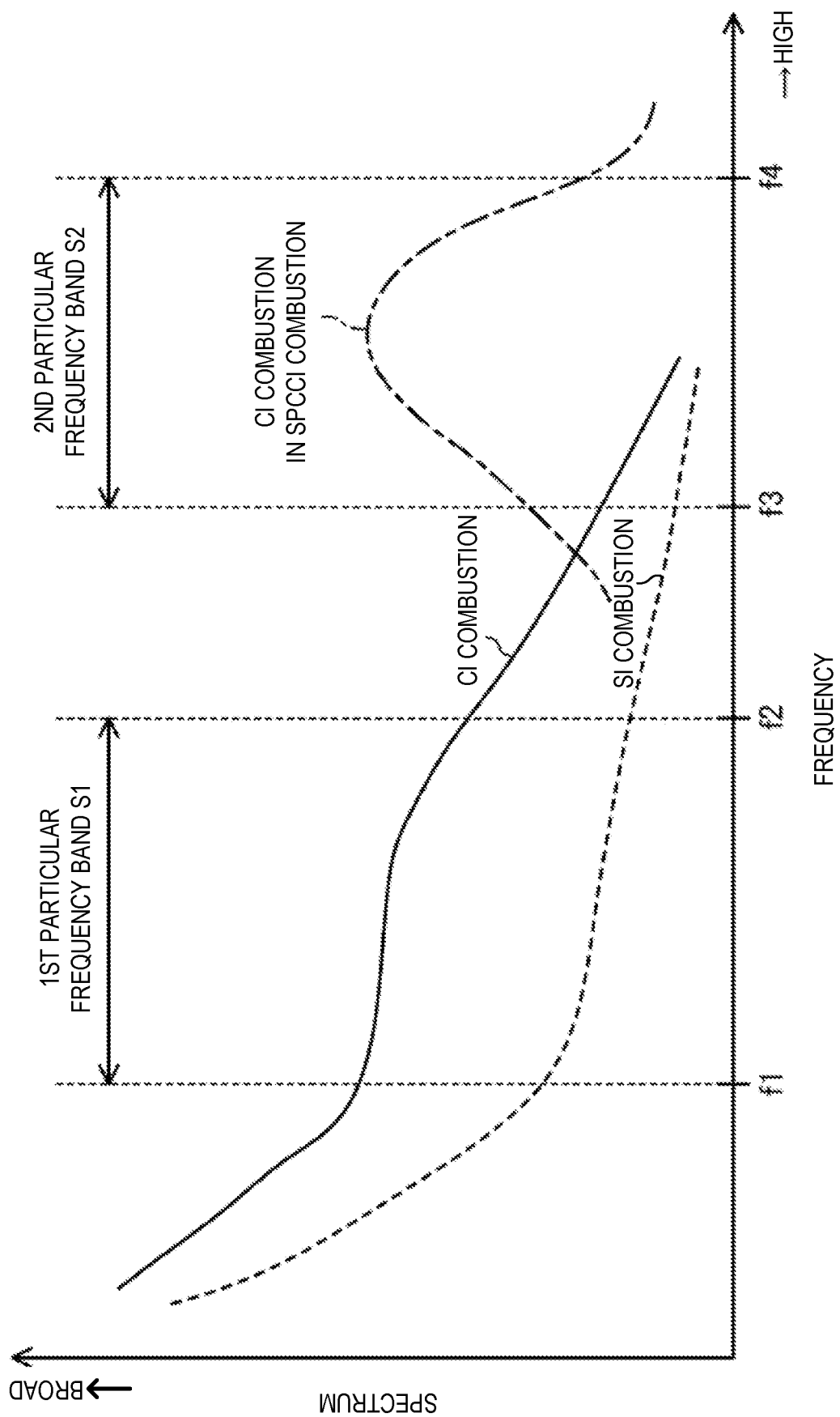
FIG. 8 is a graph illustrating results of a frequency analysis of measurements of an in-cylinder pressure sensor.

The present inventors acquired the following knowledge as a result of diligent examinations of the estimation of θci. FIG. 8 is a view illustrating a result of a frequency analysis of the in-cylinder pressure measured by the in-cylinder pressure sensor SW6. FIG. 8 illustrates a comparison of the result when only SI combustion is performed (a broken line) and the result when only CI combustion is performed (a solid line), when the engine 1 operates at a given engine speed and a given load. The present inventors determined that, in a first particular frequency band S1 of higher than a first frequency f1 and lower than a second frequency f2, a spectrum of the in-cylinder pressure was clearly different between SI combustion and CI combustion.

Then, the present inventors determined that a timing at which a value of the component of the first particular frequency band S1 included in the temporal waveform of the in-cylinder pressure, i.e., a value of the in-cylinder pressure within the first particular frequency band S1 becomes the minimum was approximately in agreement with the CI timing θci.

Figure 9:
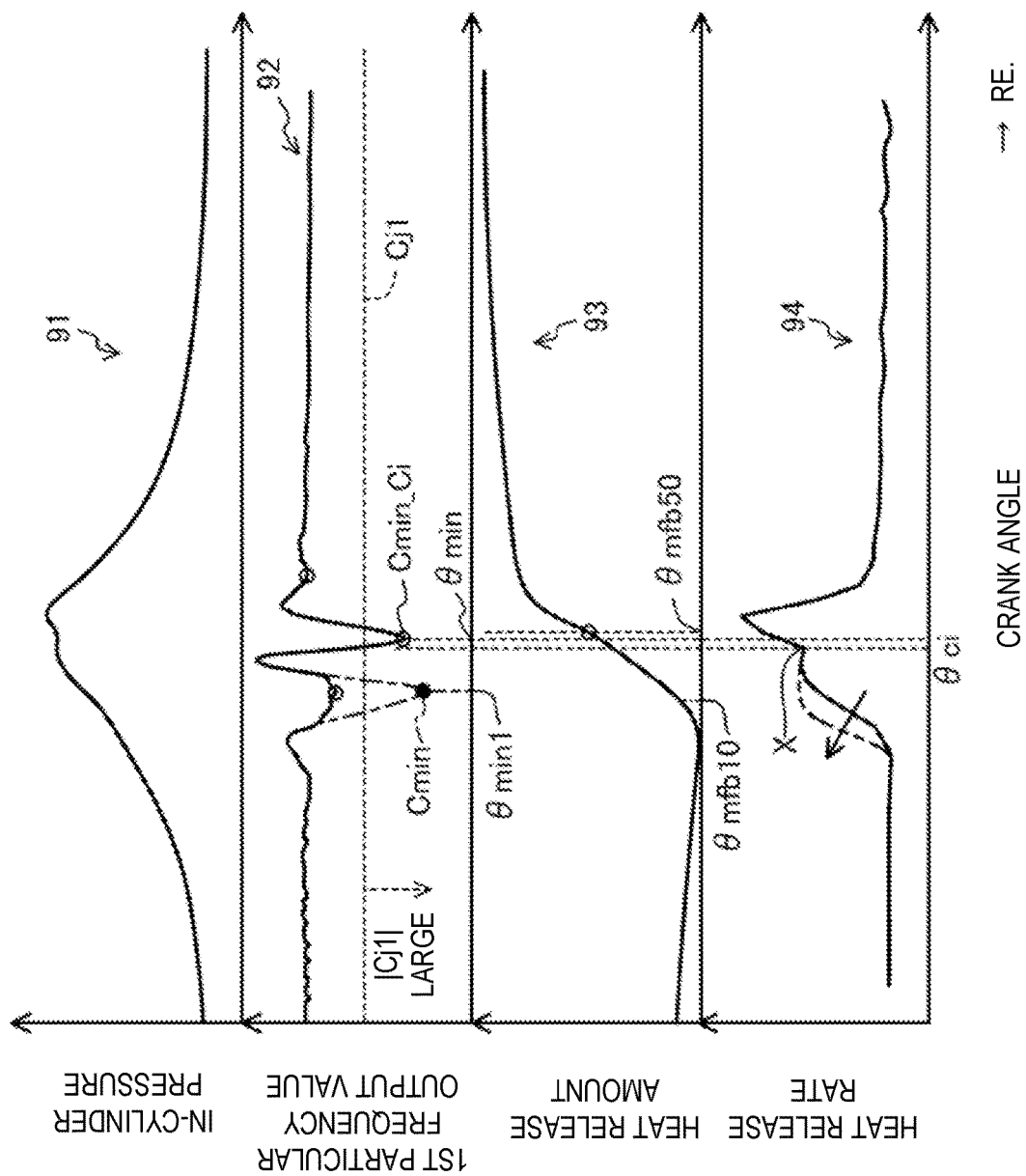
FIG. 9 is a graph illustrating a waveform of each parameter when CI combustion occurs appropriately after SI combustion.

FIG. 9 is a view illustrating the phenomenon described above, and illustrates waveforms (temporal change) of the parameters when CI combustion occurs appropriately after SI combustion when the engine 1 operates at the given engine speed and the given load. In FIG. 9, from top, a waveform 91 of the in-cylinder pressure, a waveform 92 of the first particular frequency band S1 included in the waveform of the in-cylinder pressure (only the waveform of the first particular frequency band S1 is extracted from the waveform of the in-cylinder pressure), a waveform 93 of the amount of heat release, and a waveform 94 of the heat release rate, are illustrated.

When CI combustion occurs after SI combustion, an inflection point X occurs in the waveform of the heat release rate, as described above. In detail, when CI combustion occurs after SI combustion, the heat release rate rises abruptly in response to the start of CI combustion in the middle of combustion (after the heat release rate rises from approximately zero), and this timing at which the heat release rate rises abruptly (timing of the inflection point X) becomes θci. The value of the component of the first particular frequency band S1 of the in-cylinder pressure (hereinafter, referred to as a "first particular frequency output value") becomes the minimum near θci.

Moreover, the present inventors determined that the minimum value of the first particular frequency output value differs between when CI combustion occurred appropriately after SI combustion and when CI combustion did not occur appropriately. In detail, the present inventors determined that the minimum value of the first particular frequency output value becomes smaller when CI combustion occurs appropriately after SI combustion than when CI combustion did not occur appropriately after SI combustion.

Figure 10:
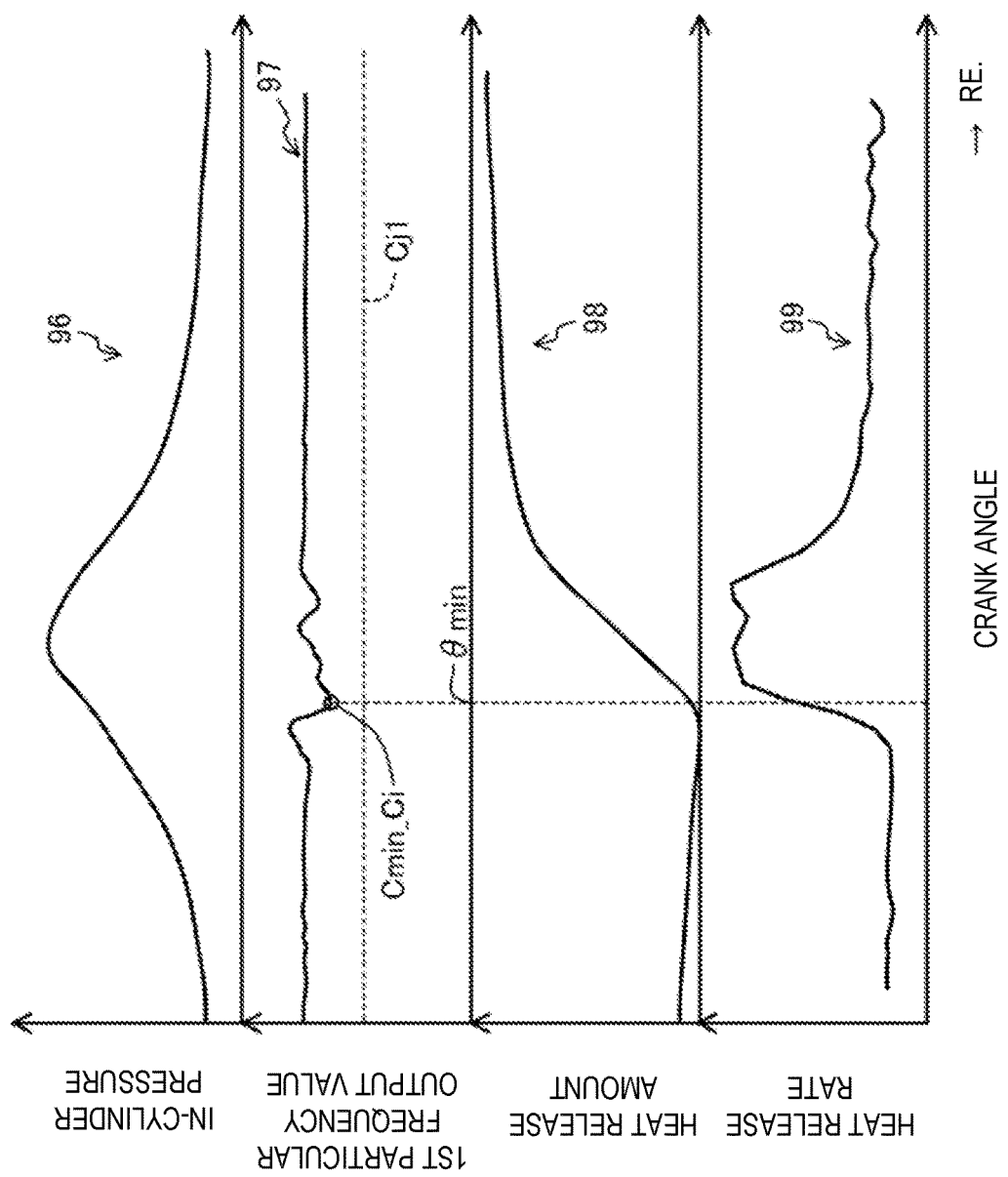
FIG. 10 is a graph illustrating a waveform of each parameter when CI combustion does not occur after SI combustion.

FIG. 10 illustrates a waveform 96 of the in-cylinder pressure, a waveform 97 of the first particular frequency output value, a waveform 98 of the amount of heat release, and a waveform 99 of the heat release rate, when CI combustion does not occur after SI combustion, i.e., when only SI combustion is performed in the combustion chamber 17, at the same engine speed and the same engine load as those of FIG. 9. As is apparent from the comparison between FIG. 9 and FIG. 10, a minimum value Cmin_ci of the first particular frequency output value becomes smaller when CI combustion occurs appropriately after SI combustion than when CI combustion does not occur appropriately after SI combustion. That is, when CI combustion occurs appropriately after SI combustion, the minimum value Cmin_ci of the first particular frequency output value becomes smaller than a given first threshold Cj1, and when CI combustion does not occur appropriately after SI combustion, the minimum value Cmin_ci of the first particular frequency output value becomes larger than the first threshold Cj1.

The first ignition timing estimating module 101o estimates θci by using the first technique. Specifically, the first technique passes the measurement of the in-cylinder pressure sensor SW6 through the first band-pass filter 101l (refer to FIG. 7B) where the first particular frequency band S1 is set as the pass band, and when the minimum value Cmin_ci of the first particular frequency output value which is an output value of the first band-pass filter 101l is smaller than the first threshold Cj1, the crank angle θmin becoming Cmin_ci is estimated as the CI combustion start timing θci.

Figure 11:
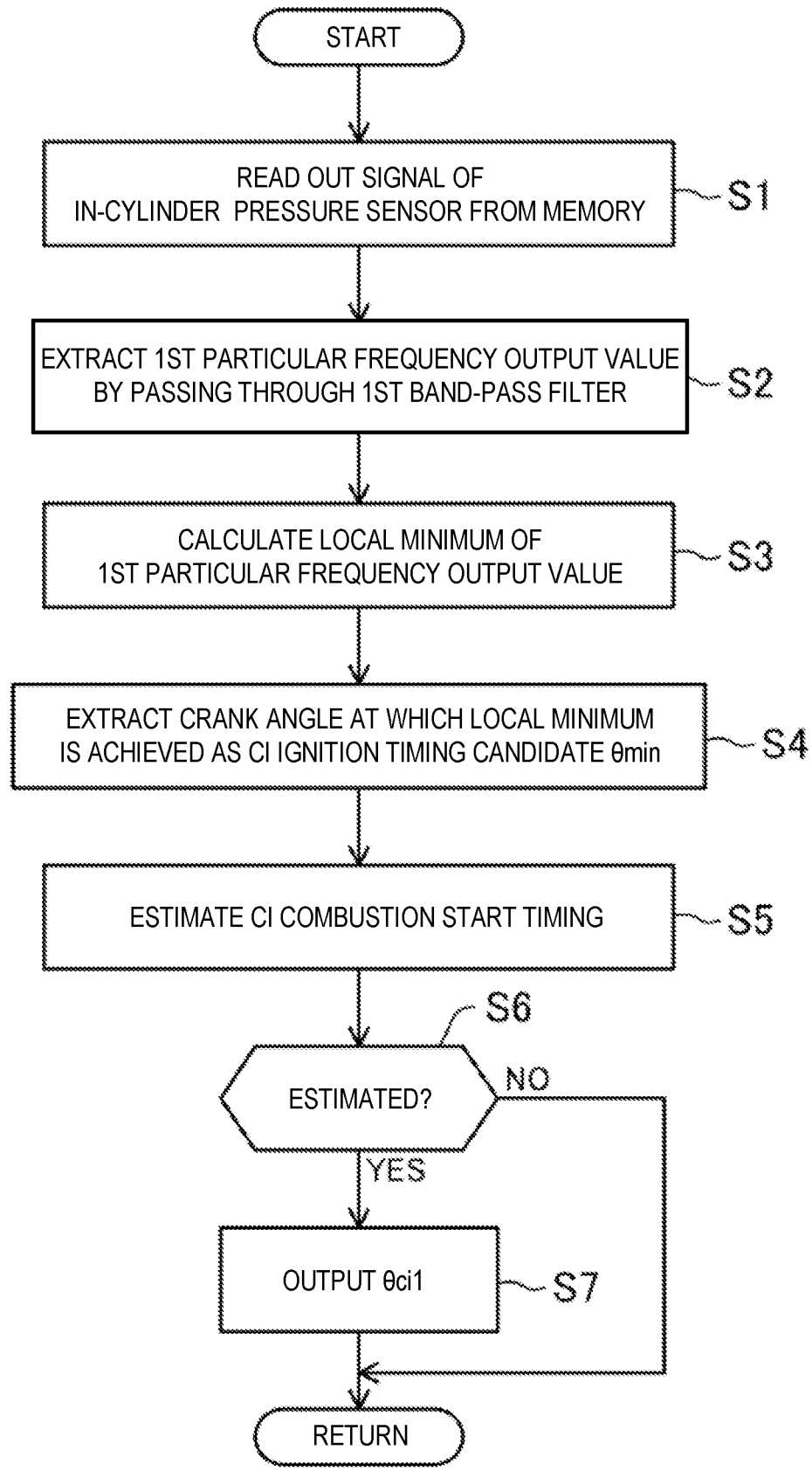
FIG. 11 is a flowchart illustrating an estimating procedure of a CI combustion start timing by a first ignition timing estimating module.

FIG. 11 is a flowchart illustrating a procedure in which the ECU 10 estimates θci by using the first technique. At Step S1, the ECU 10 reads out the signal of the in-cylinder pressure sensor SW6 stored in the sensor signal memory 1023 (i.e., the voltage signal of the in-cylinder pressure sensor SW6 after being converted into the digital signal).

Next, at Step S2, the ECU 10 passes the signal component of the in-cylinder pressure sensor SW6 read at Step S1 through the first band-pass filter 101l. The first band-pass filter 101l is a filter which passes only the signal component within the first particular frequency band S1. At Step S2, the first particular frequency output value is extracted from the measurement signal of the in-cylinder pressure sensor SW6. The first particular frequency output value outputted from the first band-pass filter 101l is sent to the first ignition timing estimating module 101o.

Figure 12:
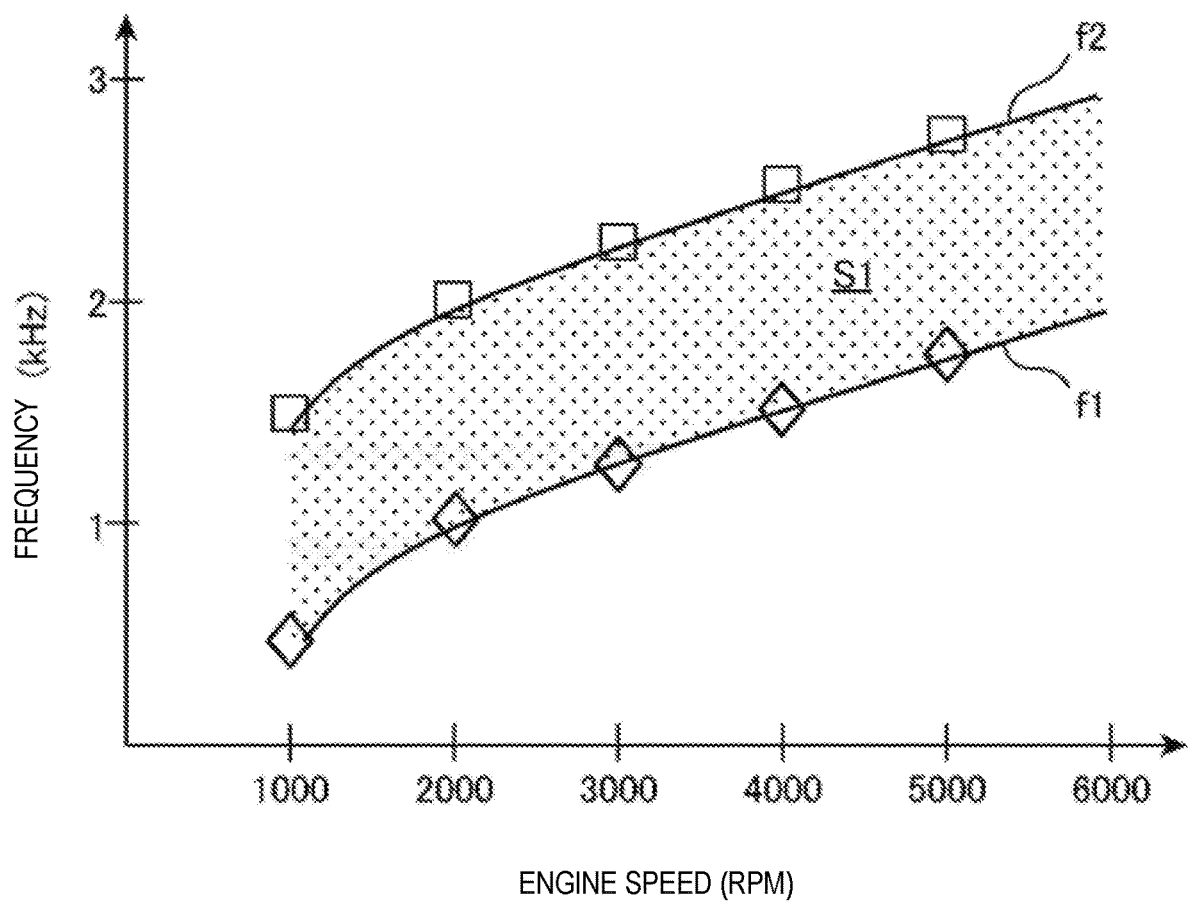
FIG. 12 is a graph illustrating a relation between an engine speed and a pass band of a first band-pass filter.

Moreover, the ECU 10 changes the first particular frequency band S1 according to the engine speed. Specifically, as illustrated in FIG. 12, the first particular frequency band S1 is set so as to become on the high frequency side as the engine speed increases. In the example illustrated in FIG. 12, when the engine speed is 1,000 rpm, the first frequency f1 is set to 0.5 kHz, and the second frequency f2 is set to 1.5 kHz. When the engine speed is 2,000 rpm, the first frequency f1 is set to 1 kHz, and the second frequency f2 is set to 2 kHz. When the engine speed is 3,000 rpm, the first frequency f1 is set to 1.25 kHz, and the second frequency f2 is set to 2.25 kHz. When the engine speed is 4,000 rpm, the first frequency f1 is set to 1.5 kHz, and the second frequency f2 is set to 2.5 kHz. When the engine speed is 5,000 rpm, the first frequency f1 is set to 1.75 kHz, and the second frequency f2 is set to 2.75 kHz. The first particular frequency band S1 may be included in a band higher than 0.5 kHz and less than 4 kHz. The ECU 10 extracts the first particular frequency band S1 corresponding to the current engine speed from a map of FIG. 12, and then applies it to the first band-pass filter 101*l*.

Next, at Step S3, the ECU 10 (first ignition timing estimating module 101*o*) calculates a local minimum of the extracted first particular frequency output value. The local minimum of the first particular frequency output value also includes the minimum value Cmin_ci (hereinafter, referred to as a "minimum particular frequency output value"). Specifically, when the output value of the in-cylinder pressure sensor SW6 passes through the band-pass filter 101*l*, a waveform 92 illustrated as the second waveform from above in FIG. 9 can be obtained. This waveform 92 is a waveform obtained by synthesizing waveforms of respective frequencies within the first particular frequency band included in the waveform of the in-cylinder pressure. As illustrated by white circles in FIG. 9, a value (pressure and voltage) of the waveform which becomes a minimum is a local minimum. The ECU 10 extracts a plurality of local minimums at Step S3. The ECU 10 may extract, for example, up to three local minimums.

Next, at Step S4, the ECU 10 (first ignition timing estimating module 101*o*) calculates a crank angle at each of the local minimums extracted at Step S3 as a CI ignition timing candidate θmin.

Specifically, the sensor signal memory 1023 stores the signal of the crank angle sensor SW11 so as to be associated with the signal of the in-cylinder pressure sensor SW6 sampled at 50 kHz, and the ECU 10 (first ignition timing estimating module 101*o*) calculates the crank angle when the first particular frequency output value becomes the minimum based on the signal.

Next, at Step S5, the ECU 10 (first ignition timing estimating module 101*o*) estimates the CI combustion start timing. Specifically, the ECU 10 defines the minimum first particular frequency output value Cmin_ci among the local minimums of the first particular frequency output value calculated at Step S3. Then, the ECU 10 determines whether the minimum particular frequency output value Cmin_ci is less than the first threshold Cj1. The first threshold Cj1 is stored in a threshold memory 1024 of the memory 102 (refer to FIG. 7B). If the minimum particular frequency output value Cmin_ci is less than the first threshold Cj1, the ECU 10 defines the crank angle θmin when becoming the minimum particular frequency output value Cmin_ci as the CI combustion start timing θci. On the other hand, if the minimum particular frequency output value Cmin_ci is above the first threshold Cj1, the ECU 10 concludes that θci is not able to be estimated.

At the subsequent Step S6, the ECU 10 determines whether it was able to estimate θci at Step S5. If the determination at Step S6 is YES, the process shifts to Step S7 where the ECU 10 (first ignition timing estimating module 101*o*) outputs θci defined at Step S5 to the selecting module 101*q*, as θci1.

On the other hand, if the determination at Step S6 is NO, the process ends without shifting to Step S7. The first ignition timing estimating module 101*o* does not output θci1.

(Calculation of Combustion Mass Ratio)

Next, a calculating procedure of the combustion mass ratio performed by the combustion parameter calculating module 101*t* of the ECU 10 will be described with reference to a flowchart of FIG. 13. At Step S31, the ECU 10 first reads the signal of the in-cylinder pressure sensor SW6 stored in the sensor signal memory 1023.

Next, at Step S32, the ECU 10 passes the signal of the in-cylinder pressure sensor SW6 read at Step S31 through the second low pass filter 101*n*. The second low pass filter 101*n* is a filter which is removable of a signal at a given frequency. The second low pass filter 101*n* is configured to remove the signal at a frequency of a waveform of the in-cylinder pressure when a knock occurs, and is a comparatively high frequency set beforehand. The second low pass filter 101*n* removes the knock signal from the signal of the in-cylinder pressure sensor SW6. The signal of the in-cylinder pressure sensor SW6 outputted from the second low pass filter 101*n* is sent to the angle synchronization processing module 101*r*.

Next, at Step S33, the ECU 10 (angle synchronization processing module 101*r*) converts the measurement signal of the in-cylinder pressure sensor SW6 outputted from the second low pass filter 101*n*, which is the signal sampled at 50 kHz, into a signal for every given crank angle by using the signal of the crank angle sensor SW11 stored so as to be associated with the measurement signal. In this configuration, at Step S33, the ECU 10 (angle synchronization processing module 101*r*) converts the signal of the in-cylinder pressure sensor SW6 into the signal for every 3° CA. The signal of this in-cylinder pressure sensor SW6 is sent to the pressure converting module 101*s*.

Next, at Step S34, the ECU 10 (pressure converting module 101*s*) converts the signal of the in-cylinder pressure sensor SW6 inputted from the angle synchronization processing module 10*r* into an absolute pressure of the in-cylinder pressure. That is, the signal outputted from the angle synchronization processing module 101*r* is still a voltage value, and this signal of the pressure converting module 101*s* is converted into the absolute pressure of the in-cylinder pressure for the first time.

In this configuration, an absolute pressure Pcps of the in-cylinder pressure can be calculated by Pcps=K×Vcps+OFFSET, where the voltage of the in-cylinder pressure sensor SW6 is Vcps. The ECU 10 (pressure converting module 101*s*) converts the output value (voltage value) of the in-cylinder pressure sensor SW6 into the absolute pressure by using the above formula.

A coefficient K is a value defined beforehand for every in-cylinder pressure sensor SW6, and is stored in the memory 102 of the ECU 10. On the other hand, a coefficient OFFSET (hereinafter, this coefficient is suitably referred to as an "offset amount") is not set beforehand, but the ECU 10 (pressure converting module 101*s*) calculates it using the value of the intake pressure sensor SW5 in this configuration. A calculating procedure of the offset amount OFFSET will be described later.

The output value of the in-cylinder pressure sensor SW6 converted into the absolute pressure of the in-cylinder pressure is inputted into the combustion parameter calculating module 101t.

Next, at Step S35, the ECU 10 (combustion parameter calculating module 101t) calculates the heat release rate dQ for every given crank angle using the output value (absolute pressure) P of the in-cylinder pressure sensor SW6, and calculates the amount of heat release Q(θ) for each crank angle by integrating the calculated dQ.

Next, at Step S36, the ECU 10 (combustion parameter calculating module 101t) calculates the minimum value Qmin and the crank angle Qmf0 corresponding to the minimum value Qmin in the amount of heat release Q(θ) calculated at Step S35. Then, at the subsequent Step S37, the ECU 10 (combustion parameter calculating module 101t) corrects the amount of heat release Q(θ) so that the minimum value Qmin calculated at Step S36 becomes zero [J]. By doing this, when calculating the combustion mass ratio which will be described later, an error is prevented from occurring.

At Step S38, the ECU 10 (combustion parameter calculating module 101t) calculates the maximum amount of heat release Qmax of the amount of heat release Q(θ), and at the subsequent Step S39, then calculates an amount of heat release Q10 which is 10% of the maximum amount of heat release Qmax.

Then, at Step S310, the ECU 10 (combustion parameter calculating module 101t) determines the crank angle at which the amount heat release Q10 which is 10% of the maximum amount of heat release Qmax to be θmfb10.

Thus, the combustion parameter calculating module 101t calculates at least dQ/dθ and θmfb10.

(Calculation of Offset Amount)

Figure 14:
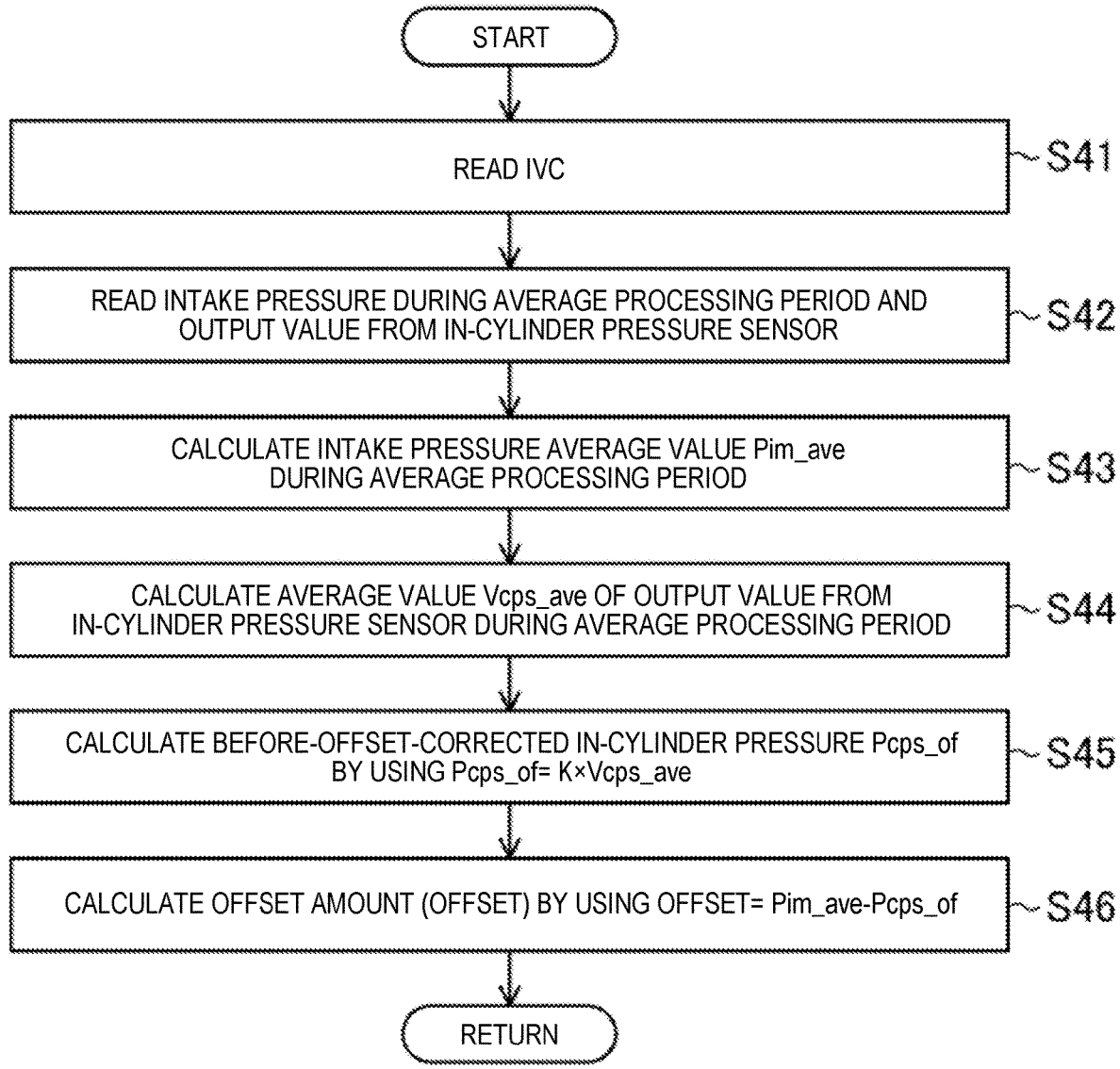
FIG. 14 is a flowchart illustrating a calculating procedure of an offset amount.

Next, a calculating procedure of the offset amount OFFSET which is required for converting the voltage outputted from the in-cylinder pressure sensor SW6 into the absolute pressure is described with reference to a flowchart of FIG. 14.

First, at Step S41, the pressure converting module 101s (refer to FIG. 7B) reads the intake valve close timing IVC which is a timing at which the intake valve 21 is closed. In detail, the pressure converting module 101s reads the intake valve close timing IVC of the cylinder 11 to which the in-cylinder pressure sensor SW6 which is a target of a conversion process is provided, and the intake valve close timing IVC in a combustion cycle which is a target of the conversion process.

Next, at Step S42, the pressure converting module 101s reads a plurality of intake pressures detected by the intake pressure sensor SW5 during a period from a timing before the intake valve close timing IVC by a given crank angle to the intake valve close timing IVC (hereinafter, the given period is suitably referred to as an "average processing period"), and reads a plurality of voltage values outputted from the in-cylinder pressure sensor SW6 during the average processing period from the memory 102. The average processing period is set, for example, as 12° CA (crank angle).

Next, at Step S43, the pressure converting module 101s calculates an average value Pim_ave of the plurality of intake pressures read at Step S42, i.e., the average value Pim_ave of the intake pressure during the average processing period.

Moreover, at Step S44, the pressure converting module 101s calculates an average value Vcps_ave of the plurality of output values (voltage values) of the in-cylinder pressure sensor SW6 read at Step S42, i.e., the average value Vcps_ave of the output value (voltage value) of the in-cylinder pressure sensor SW6 during the average processing period.

Next, at Step S45, the pressure converting module 101s calculates a before-offset-corrected in-cylinder pressure by multiplying the average value Vcps_ave of the output value (voltage value) of the in-cylinder pressure sensor SW6 calculated at Step S44 by the coefficient K. That is, at Step S45, the pressure converting module 101s calculates the before-offset-corrected in-cylinder pressure as Pcps_of by using Pcps_of=K×Vcps_ave.

Next, at Step S46, the pressure converting module 101s calculates an offset amount by subtracting the before-offset-corrected in-cylinder pressure Pcps_of calculated at Step S45 from the average value Pim_ave of the intake pressure calculated at Step S43. That is, the offset amount OFFSET is calculated by using OFFSET=Pim_ave−Pcps0.

(Second Technique for Estimating θci)

The present inventors determined that the frequency of a pressure wave caused during CI combustion of SPCCI combustion is close to the frequency of a pressure wave (standing wave) caused during a knock of SI combustion. If the occurrence of the pressure wave can be detected, the timing at which CI combustion of SPCCI combustion starts can be estimated. The second technique for estimating θci is to estimate the CI combustion start timing θci by detecting the occurrence of the pressure wave caused during CI combustion.

As illustrated by a one-dot chain line in FIG. 8, the frequency of the pressure wave caused during CI combustion of SPCCI combustion corresponds to the second particular frequency band S2 which is higher than the first particular frequency band S1. The second particular frequency band S2 is a frequency band higher than a third frequency f3 and lower than a fourth frequency f4. The third frequency f3 and the fourth frequency f4 are set within a range of 5.5 kHz to 8.0 kHz.

The second ignition timing estimating module 101p estimates θci by using the second technique. Specifically, the second technique is to pass the measurements of the in-cylinder pressure sensor SW6 through the second band-pass filter 101m where the second particular frequency band S2 is set as the pass band, and estimates a crank angle at which the second particular frequency output value which is an output value of the second band-pass filter 101m exceeds a second threshold Cj2 for the first time, as the CI combustion start timing θci.

Figure 15:
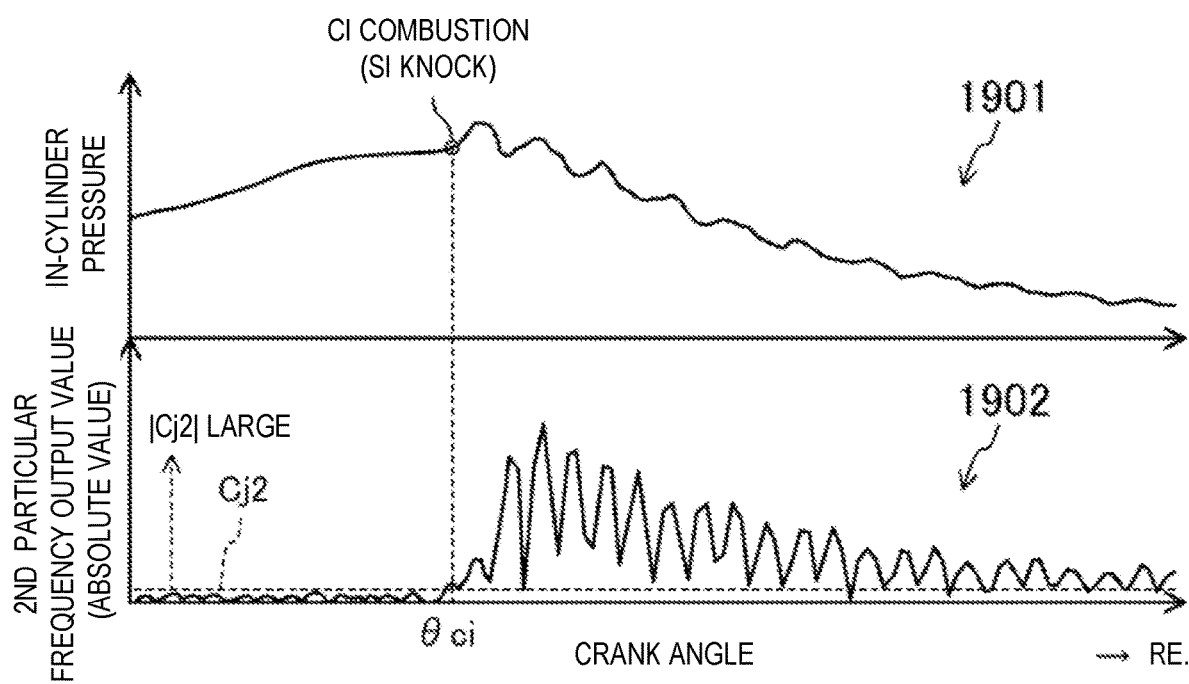
FIG. 15 is a graph illustrating a waveform of each parameter when the CI combustion start timing is estimated.

Here, FIG. 15 illustrates a waveform 1901 of the in-cylinder pressure when the engine speed is comparatively high, and a waveform 1902 of the absolute value of the second particular frequency output value when the signal component of the in-cylinder pressure sensor SW6 passes through the second band-pass filter 101m. A broken line in this figure indicates the second threshold Cj2. The absolute value of the second particular frequency output value exceeds the second threshold Cj2 at the timing θci where CI combustion starts. Although the details are omitted, the second threshold Cj2 is changed according to the operating state of the engine 1 in order to reduce the incorrect estimation of θci.

Figure 16:
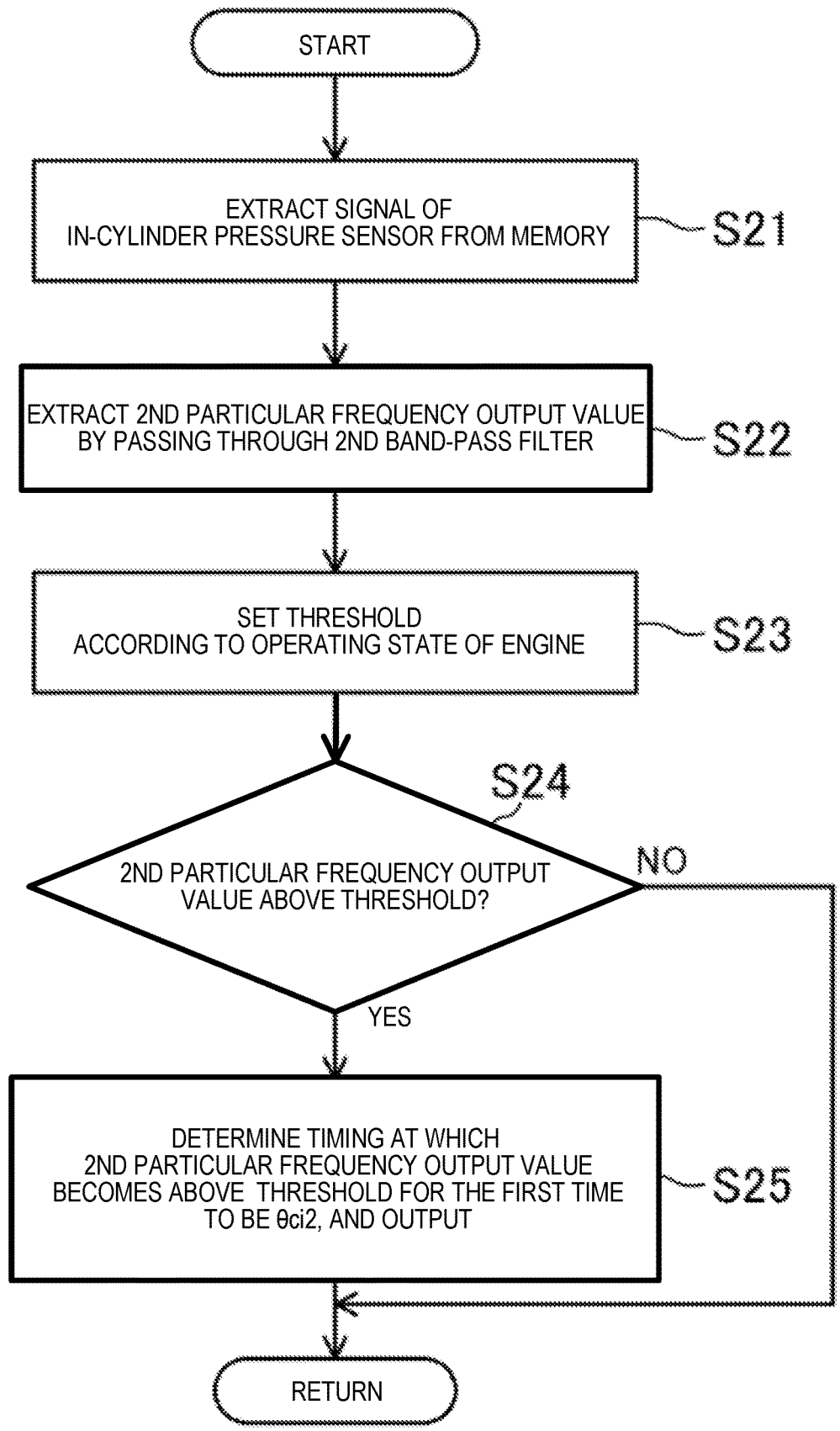
FIG. 16 is a flowchart illustrating an estimating procedure of the CI combustion start timing by a second ignition timing estimating module.

FIG. 16 is a flowchart illustrating a procedure in which the ECU 10 estimates θci by using the second technique. At Step S21, the ECU 10 reads the signal of the in-cylinder pressure sensor SW6 stored in the sensor signal memory 1023.

Next, at Step S22, the ECU 10 passes the signal component of the in-cylinder pressure sensor SW6 read at Step S21 through the second band-pass filter 101m. The second band-pass filter 101m passes only the signal component of the second particular frequency band S2. Thus, at Step S22, the second particular frequency output value is extracted from the measurement signal of the in-cylinder pressure sensor SW6. The second particular frequency output value outputted from the second band-pass filter 101m is sent to the second ignition timing estimating module 101p.

Next, at Step S23, the ECU 10 changes the second threshold Cj2 according to the operating state of the engine 1, such as the engine speed.

Next, at Step S24, the ECU 10 (second ignition timing estimating module 101p) determines whether the extracted second particular frequency output value is above the set second threshold Cj2. If the determination at Step S24 is YES, the process shifts to Step S25 where the ECU 10 (second ignition timing estimating module 101p) determines that a timing at which the second particular frequency output value becomes above the second threshold Cj2 for the first time to be the CI combustion start timing θci2, and then outputs θci2 to the selecting module 101q.

On the other hand, if the determination at Step S24 is NO, the process ends without shifting to Step S25. The second ignition timing estimating module 101p concludes that it is not able to estimate θci2.

Note that the second estimation technique can also be used for detecting the occurrence of a knock in SI combustion, other than estimating the CI combustion start timing θci in SPCCI combustion.

(Configuration of Selecting Module)

As described above, θci1 estimated by the first ignition timing estimating module 101o and θci2 estimated by the second ignition timing estimating module 101p are inputted into the selecting module 101q. The selecting module 101q selects θci according to the following conditions.

1) When only one of θci1 and θci2 is estimated, select the CI combustion start timing as θci.
2) When both θci1 and θci2 are estimated, select the CI combustion start timing on the advance side as θci.

θci selected by the selecting module 101q is stored in the memory 102. As described above, θci is used for the reduction of combustion noise, and if θci is on advance side of the target θci, the target in-cylinder property setting module 101b corrects the model so that the ignition timing is retarded. If both θci1 and θci2 are estimated, since θci tends to be shifted to the advance side of the target θci by selecting the timing on the advance side, it becomes possible to more effectively reduce the generation of the combustion noise.

<Control Mode Based on in-Cylinder Temperature>

For example, the ECU 10 controls each actuator based on the in-cylinder properties as illustrated by the in-cylinder property controlling module 101c in FIG. 7A. As the in-cylinder properties used at this time, although various parameters could be considered, the present inventors determined as a result of diligent examinations that the in-cylinder temperature Tin (actual Tin) which the in-cylinder temperature probably actually reached in each combustion cycle was used as the in-cylinder property.

By performing the control based on the actual Tin, it becomes advantageous upon controlling SPCCI combustion in various situations, such as the actualization of the control mode corresponding to the octane number, ensurance of the response, and avoidance of preignition.

In order to improve the estimation accuracy of the actual Tin, the present inventors introduced the technique of the Bayes estimation and reached the idea of the present disclosure. That is, the ECU 10 estimates the actual Tin ex post facto which was probably achieved in the combustion cycle based on the parameter detected in each combustion cycle. Then, the ECU 10 corrects the properties of the injector 6, the EGR valve 54, the intake-side electric S-VT 23, the exhaust-side electric S-VT 24, etc. based on a deviation of the actual Tin estimated afterward from the target Tin set in advance as the target in-cylinder property.

Moreover, in order to estimate the actual Tin more certainly, the ECU 10 selectively uses two kinds of techniques of the first estimation technique based on the actual θci, and the second estimation technique based on the CI probability Pci, for the estimation of the actual Tin. Thus, the suitable actual Tin is estimated by using either one of the first estimation technique and the second estimation technique.

Figure 17:
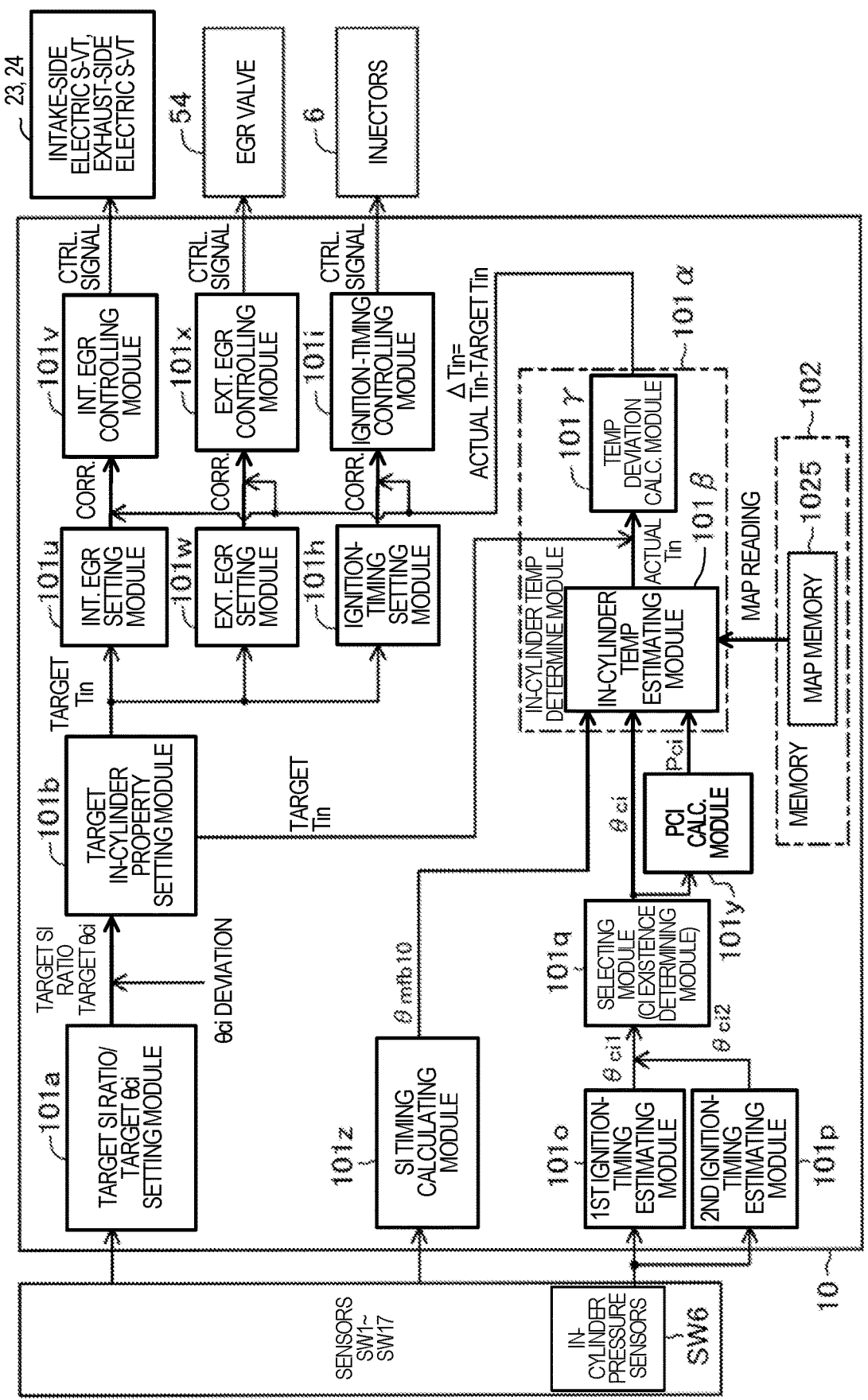
FIG. 17 is a block diagram illustrating a portion relevant to an in-cylinder temperature among the functional configuration of the controller of the engine.

FIG. 17 is a block diagram illustrating a part of the functional configuration of the ECU 10, relevant to the actual Tin. As illustrated in FIG. 17, the ECU 10 includes, as the functional configuration relevant to the first estimation technique, a SI timing calculating module 101z which calculates the crank angle θmfb10 at which the combustion mass ratio becomes a given value (in this configuration, 10%), the first ignition timing estimating module 101o, the second ignition timing estimating module 101p, and the selecting module 101q which estimate a timing (actual θci) at which unburnt mixture gas actually self-ignites in each combustion cycle, and an in-cylinder temperature determining module 101α which determines the actual Tin at a given crank angle (in this configuration, a compression top dead center) based on θmfb10 and the actual θci.

The ECU 10 also includes, as the functional configuration peculiar to the second estimation technique, a CI probability calculating module 101y which calculates the CI probability Pci based on the determination of the selecting module 101q as a CI existence determining module.

In this second estimation technique, the selecting module 101q determines whether unburnt mixture gas actually self-ignites in each combustion cycle based on whether or not θci has been estimated. Moreover, the in-cylinder temperature determining module 101α determines the actual Tin at the given crank angle based on θmfb10 and Pci. That is, the SI timing calculating module 101z for calculating θmfb10, and the first ignition timing estimating module 101o, the second ignition timing estimating module 101p, and the selecting module 101q for estimating the actual θci are commonly used for the first estimation technique and the second estimation technique.

In addition, as the other commonly-used functional configurations, the ECU 10 includes the target SI ratio/target θci setting module 101a, the target in-cylinder property setting module 101b, and a map memory 102S which stores the map for determining the actual Tin.

Below, concrete examples of the functional configurations are described in turn.

(Target SI Ratio/Target θci Setting Module)

As described above, the target SI ratio/target θci setting module 101a calculates the target value of the SI ratio (target SI ratio) and the target value of the CI timing (target θci) as the properties defined corresponding to the operating state of the engine 1. The ECU 10 outputs the control signal to at least the ignition plug 25 through the in-cylinder property controlling module 101c etc. illustrated in FIG. 7A so that the SI ratio becomes the target SI ratio and θci becomes the target θci. Note that as will be described below, the control signal outputted to each actuator is generated based on the target in-cylinder temperature (target Tin). The ECU 10 can control the combustion waveform of SPCCI combustion through the control signal generated in this way.

(Target in-Cylinder Property Setting Module and Functional Configuration Relevant to Target in-Cylinder Property Setting Module)

The target in-cylinder property setting module 101$b$ determines the target in-cylinder temperature (target Tin) based on the target SI ratio and the target θci. Here, the target Tin determined by the target in-cylinder property setting module 101$b$ is the in-cylinder temperature corresponding to the target SI ratio and the target θci. In detail, the target Tin is the in-cylinder temperature when both SI ratio and θci achieve the target values.

Although illustration is omitted in FIG. 7A, the ECU 10 controls the internal EGR, the external EGR, and the ignition timing based on the target Tin.

Specifically, the ECU 10 includes an internal EGR setting module 101$u$ which sets property of the intake-side electric S-VT 23 and the exhaust-side electric S-VT 24 (a valve timing of the intake valve, a valve timing of the exhaust valve, a positive/negative overlap period, etc.) based on the target Tin, and an internal EGR controlling module 101$v$ which outputs a control signal to the intake-side electric S-VT 23 and the exhaust-side electric S-VT 24 so that the settings by the internal EGR setting module 101$u$ are achieved.

By controlling the intake-side electric S-VT 23 and the exhaust-side electric S-VT 24, the internal EGR controlling module 101$v$ can adjust an amount of burnt gas introduced into the combustion chamber 17, thereby adjusting the in-cylinder temperature.

The ECU 10 also includes an external EGR setting module 101$w$ which sets a property of the EGR valve 54 (a valve opening of the EGR valve 54) based on the target Tin, and an external EGR controlling module 101$x$ which outputs a control signal to the EGR valve 54 so that the setting by the external EGR setting module 101$w$ is achieved.

By controlling the EGR valve 54, the external EGR controlling module 101$x$ can adjust the amount of burnt gas recirculated to the combustion chamber 17, thereby adjusting the in-cylinder temperature.

Thus, the EGR system 55 controlled by the internal EGR controlling module 101$v$ and the external EGR controlling module 101$x$ is one example of an "in-cylinder temperature adjuster" which can adjust the in-cylinder temperature in response to the signal from the ECU 10.

The ECU 10 also includes the ignition-timing setting module 101$h$ described above which sets the property of the ignition plug 25 (ignition timing) based on the target Tin, and an ignition controlling module 101$i$ which outputs a control signal to the ignition plug 25 so that the setting by the ignition-timing setting module 101$h$ is achieved.

Thus, the ECU 10 sets the property corresponding to the target Tin, generates the control signal so that the setting is achieved, and outputs the control signal to each actuator. The properties set here correspond to a base set (basic values) when executing the control based on the target Tin.

(SI Timing Calculating Module)

Figure 13:
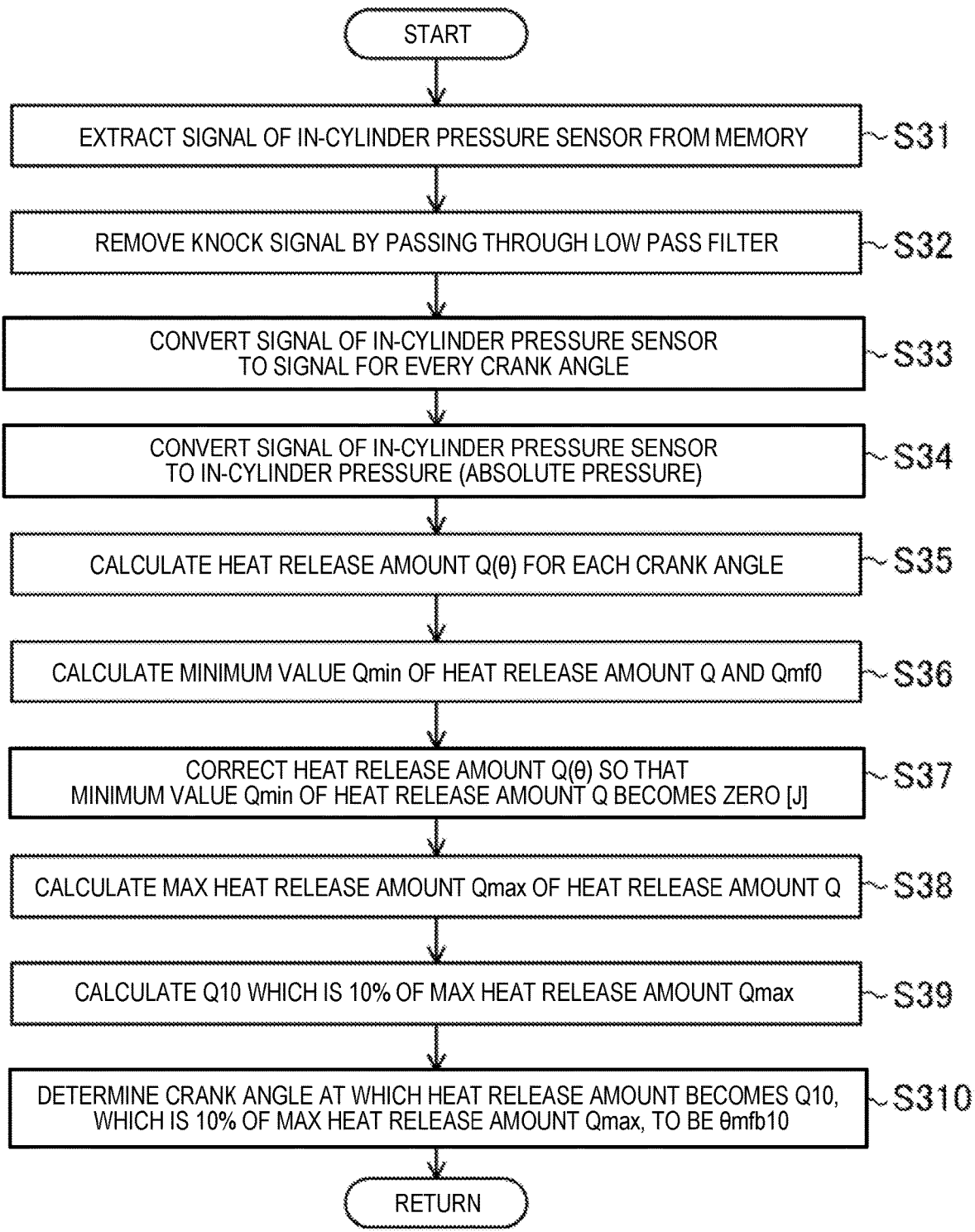
FIG. 13 is a flowchart illustrating a calculating procedure of a combustion mass ratio.

The SI timing calculating module 101$z$ is configured to execute the control process illustrated in FIG. 13. That is, the SI timing calculating module 101$z$ estimates ex post facto the value of θmfb10 which was probably achieved in each combustion cycle, based on the detection signal of the in-cylinder pressure sensor SW6.

(First Ignition Timing Estimating Module and Second Ignition Timing Estimating Module)

The first ignition timing estimating module 101$o$, the second ignition timing estimating module 101$p$, and the selecting module 101$q$ are as described above. That is, the first ignition timing estimating module 101$o$ estimates θci1 by executing the control process illustrated in FIG. 11 based on the detection signal of the in-cylinder pressure sensor SW6. On the other hand, the second ignition timing estimating module 101$p$ estimates θci2 by executing the control process illustrated in FIG. 16 based on the detection signal of the in-cylinder pressure sensor SW6.

(Selecting Module)

As described above, the selecting module 101$q$ selects the actual θci according to the following conditions.

1) When only one of θci1 and θci2 is estimated, select the CI timing as the actual θci.
2) When both θci1 and ci2 are estimated, select the CI timing on the advance side as the actual θci.

The selecting module 101$q$ as the CI existence determining module determines that CI combustion occurred appropriately, when the actual θci is selected according to the condition 1 or 2. In such a case, the ECU 10 estimates the actual Tin by performing the first estimation technique based on the actual θci selected in this way.

On the other hand, when both the conditions 1 and 2 are not satisfied (i.e., when both θci1 and ci2 are not estimated), the selecting module 101$q$ determines that CI combustion did not occur appropriately after SI combustion in the first place (only SI combustion occurred). In such a case, the ECU 10 estimates the actual Tin by performing the second estimation technique based on the CI probability Pci.

Then, if the selecting module 101$q$ determines that CI combustion occurred appropriately, it sets, for example, a flag indicating that CI combustion occurred from 0 to 1, and stores it in the memory 102. On the other hand, if the selecting module 101$q$ determines that CI combustion did not occur appropriately, it maintains the flag indicating that CI combustion occurred at 0.

Note that the actual θci is calculated each time for every combustion cycle according to the control process illustrated in FIGS. 11 and 16. On the other hand, Pci is repeatedly updated by repeatedly performing the combustion cycle.

(CI Probability Calculating Module)

Figure 19:
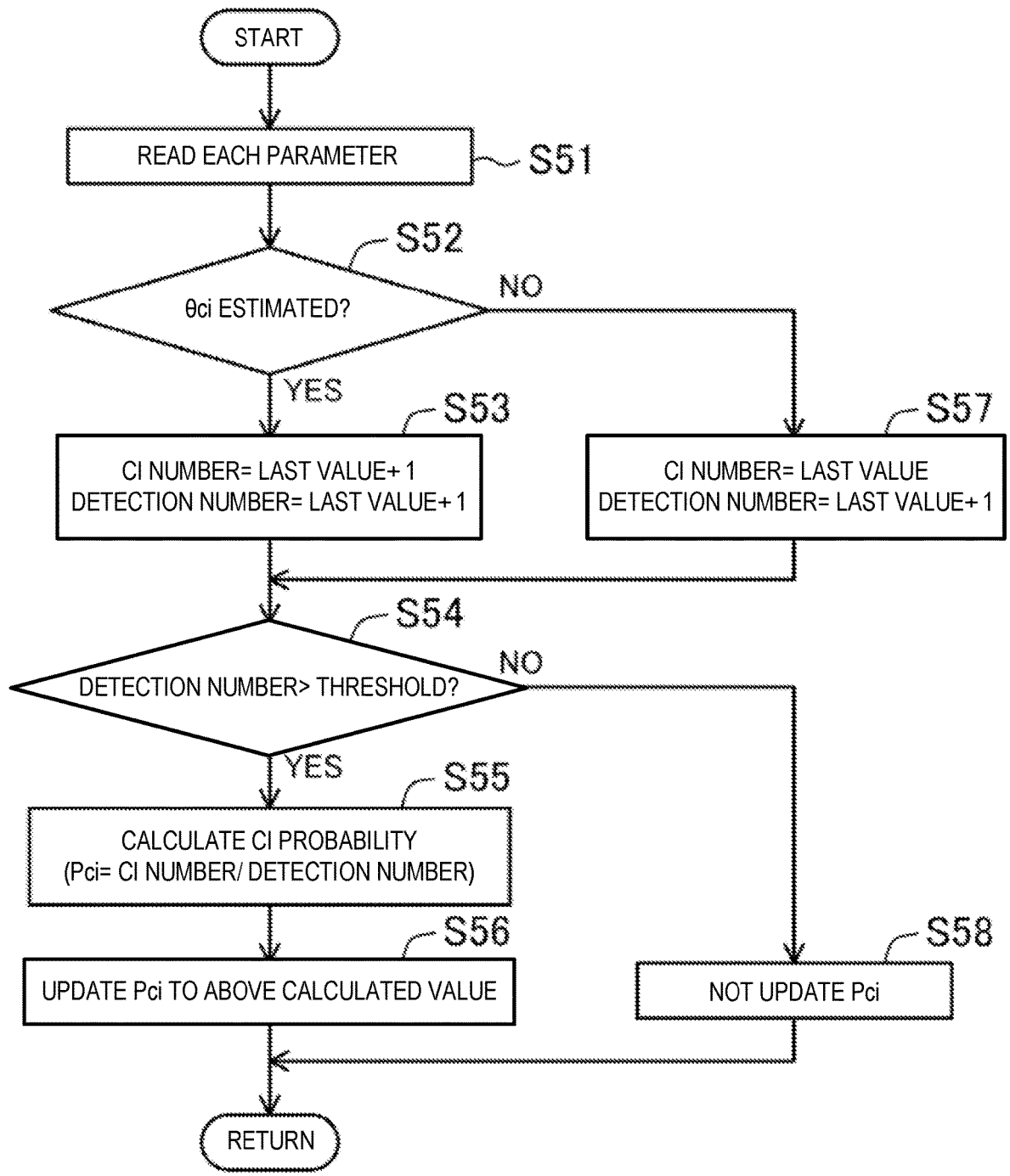
FIG. 19 is a flowchart illustrating an updating procedure of a CI probability.

The CI probability calculating module 101$y$ repeatedly updates the CI probability Pci based on the determination by the selecting module 101$q$. An updating procedure of Pci performed by the CI probability calculating module 101$y$ is described with reference to a flowchart of FIG. 19. First, at Step S51, the CI probability calculating module 101$y$ reads various parameters. The parameter read in this Step S51 includes the flag indicating whether CI combustion occurred in each combustion cycle.

Then, at Step S52, the CI probability calculating module 101$y$ determines whether θci was able to be estimated based on the flag read at Step S51. If this determination is YES, the CI probability calculating module 101$y$ increments a CI number (the total number of times θci was able to be estimated) and a detection number (the total number of times θci was tried to be estimated) by one from the values acquired in the last combustion cycle (Step S53). On the other hand, if the determination at Step S52 is NO, the CI probability calculating module 101$y$ increments only the detection number by one, while leaving the CI number unchanged from the last value (Step S57).

Note that the values of the CI number and the detection number are stored in the memory 102, and are suitably read from the memory 102. The values of the CI number and the detection number stored in the memory 102 are updated each time the processings at Steps S53 and S57 are executed.

Then, at Step S54, the CI probability calculating module 101$y$ determines whether the CI number exceeds a given threshold. If the determination is NO, the CI probability calculating module 101*y* does not update the CI probability Pci, but it holds Pci acquired in the last combustion cycle as it is (Step 58), and the process returns. The given threshold is determined beforehand based on the design of the engine 1 etc. and stored in the memory 102.

On the other hand, if the determination at Step S54 is YES, the CI probability calculating module 101*y* calculates Pci based on an expression Pci=[CI number]/[detection number] (Step S55).

Then, at Step S56 followed after Step S55, the CI probability calculating module 101*y* updates the value of Pci stored in the memory 102 to the value calculated at Step S55.

(In-Cylinder Temperature Determining Module)

The in-cylinder temperature determining module 101α selectively uses and performs the first technique for estimating the actual Tin and the second technique for estimating the same parameter. Specifically, when the actual θci is selected by the selecting module 101*q*, the first technique is performed, and on the other hand, when the actual θci is not selected, the second technique is performed. Below, processings performed by the in-cylinder temperature determining module 101 in the respective techniques are described in turn.

—First Technique for Estimating Actual Tin—

First, when performing the first technique, the in-cylinder temperature determining module 101α reads the actual θci selected by the selecting module 101*q*, and θmfb10 calculated by the SI timing calculating module 101*z*. The in-cylinder temperature determining module 101α estimates the actual Tin based on the actual θci and θmfb10 read in this way, and determines the estimated value. Upon the determination, the in-cylinder temperature determining module 101 is configured to read the target Tin determined by the target in-cylinder property setting module 101*b*, and perform the determination based on the actual Tin and the target Tin.

Therefore, the in-cylinder temperature determining module 101α includes an in-cylinder temperature estimating module 101β which estimates the actual Tin based on the actual θci and θmfb10, and a temperature deviation calculating module 101γ which calculates a difference ΔTin in order to determine the actual Tin based on the actual Tin and the target Tin.

Specifically, in addition to the actual θci and θmfb10, the in-cylinder temperature estimating module 101β further reads a first map stored in the map memory 1025. Then, the in-cylinder temperature estimating module 101β estimates the actual Tin by comparing the actual θci and θmfb10 with the first map.

Figure 20:
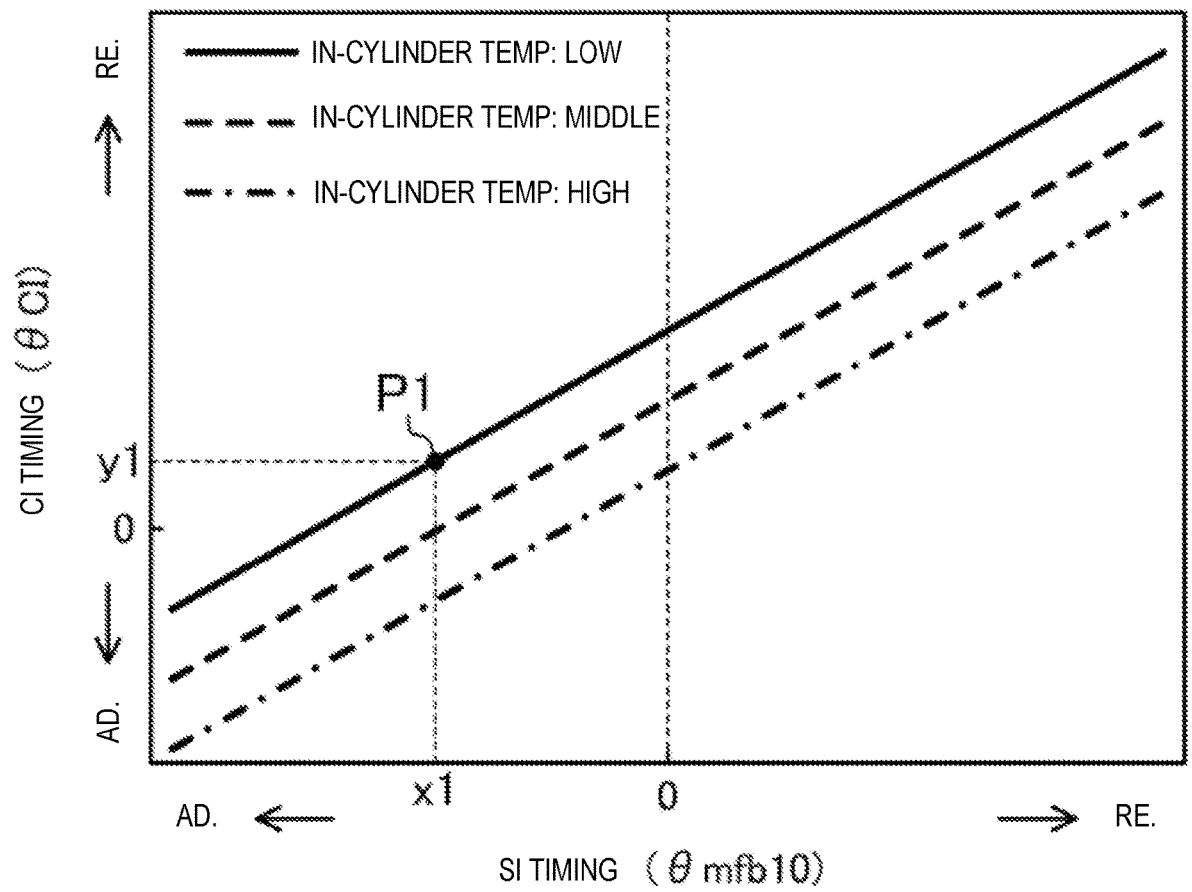
FIG. 20 is a graph illustrating a map in which the combustion mass ratio (SI timing) is associated with the CI combustion start timing (CI timing), for every in-cylinder temperature.

Here, the in-cylinder temperature estimating module 101β estimates the actual Tin higher as the timing of the actual θci becomes earlier. The first map is comprised of a plurality of straight lines having a positive inclination, as illustrated in FIG. 20. The x-axis of each straight line corresponds to θmfb10, and the y-axis corresponds to the actual θci. The straight lines have the same inclination, and the y-intercept decreases as the in-cylinder temperature increases. As illustrated in FIG. 20, if the in-cylinder temperature remains the same, the actual θci is retarded as θmfb10 is retarded.

As illustrated by a point P1 in FIG. 20, when (θmfb10, actual θci)=(x1, y1), the in-cylinder temperature estimating module 101β searches for the straight line on the first map that passes through the coordinates. Then, the in-cylinder temperature can be determined based on the y-intercept of the searched straight line. For example, as illustrated in FIG. 20, the actual Tin decreases as the y-intercept of the straight line passing through the point P1 increases. The present inventors determined the value of the in-cylinder temperature corresponding to each y-intercept beforehand, and the values are stored in the memory 102. Therefore, by referring the first map for the values of the actual θci and θmfb1, the estimated value (actual Tin) of the in-cylinder temperature can be determined.

Figure 21:
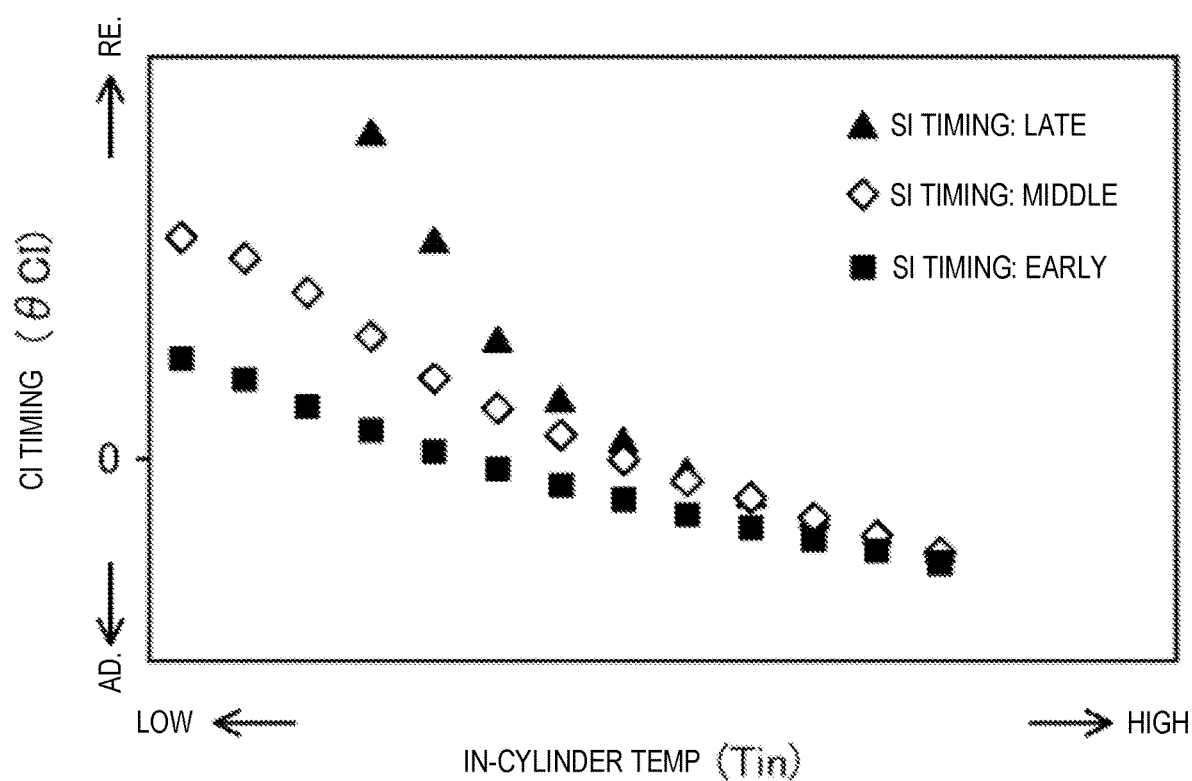
FIG. 21 is a graph illustrating a map in which the in-cylinder temperature is associated with the CI combustion start timing (CI timing), for every combustion mass ratio (SI timing).

FIG. 21 illustrates a plot in which the horizontal axis of the first map is replaced by the in-cylinder temperature. As illustrated by the plot in FIG. 21, the first map is comprised of a plurality of curves having a negative correlation. Each curve indicates that the actual θci decreases as the SI timing (θmfb10) becomes earlier. Moreover, if θmfb10 is the same, the in-cylinder temperature increases as the actual θci is advanced.

Moreover, the temperature deviation calculating module 101γ calculates the difference ΔTin (=[actual Tin]−[target Tin]) by subtracting the target Tin from the actual Tin. The in-cylinder temperature determining module 101α determines that the actual Tin is high when the actual Tin is higher than the target Tin (ΔTin>0), determines that the actual Tin is a suitable temperature when the actual Tin is the same as the target Tin (ΔTin=0), and determines that the actual Tin is low when the actual Tin is lower than the target Tin (ΔTin<0).

The ECU 10 then corrects the basic values set by the internal EGR setting module 101*u*, the external EGR setting module 101*w*, and the ignition-timing setting module 101*h* based on the difference ΔTin. By this correction, when the actual Tin is high, the actual Tin is lowered, and when the actual Tin is low, the actual Tin is raised.

Specifically, the memory 102 stores a map in which the difference ΔTin is associated with correction values. For example, when the difference ΔTin is positive and the absolute value thereof is large, the ECU 10 corrects the negative overlap period to be shortened, in order to reduce the introducing amount of the internal EGR gas. Moreover, in addition to or instead of the correction of the negative overlap period, the ECU 10 may correct the valve opening of the EGR valve 54 to the opening side in order to increase the recirculating amount of the external EGR gas.

Moreover, when the difference ΔTin is negative and the absolute value thereof is large, the ECU 10 corrects the negative overlap period to be extended, in order to increase the introducing amount of internal EGR gas. Moreover, in addition to or instead of the correction of the negative overlap period, the ECU 10 corrects the valve opening of the EGR valve 54 to the closing side in order to reduce the recirculating amount of the external EGR gas.

Based on the correction values set as described above, the ECU 10 carries out a feedback control of the intake-side electric S-VT 23, the exhaust-side electric S-VT 24, and the EGR valve 54. Thus, each actuator can be controlled so that the actual Tin becomes the target Tin.

In this way, it becomes possible to control each actuator based on the deviation of the estimated value of the in-cylinder temperature from the target value. Therefore, SPCCI combustion can be controlled appropriately, and fuel efficiency of the engine 1 can be improved while reducing combustion noise in SPCCI combustion.

—Second Technique for Estimating Actual Tin—

First, when performing the second technique, the in-cylinder temperature determining module 101α reads Pci calculated by the CI probability calculating module 101*y* and θmfb10 calculated by the SI timing calculating module 101*z*. The in-cylinder temperature determining module 101α estimates the actual Tin based on Pci and θmfb10 read in this way, and determines the estimated value. Upon this determination, the in-cylinder temperature determining module 101α is configured to read the target Tin determined by the target in-cylinder property setting module 101b, and perform the determination based on the actual Tin and the target Tin.

Therefore, the in-cylinder temperature estimating module 101β can estimate the actual Tin based on Pci and θmfb10, as well as estimate based on the actual θci and θmfb10. The temperature deviation calculating module 101γ calculates the difference ΔTin based on the estimated actual Tin and the target Tin.

Specifically, in addition to Pci and θmfb10, the in-cylinder temperature estimating module 101β further reads a second map stored in the map memory 102S. Then, the in-cylinder temperature estimating module 101β estimates the actual Tin by comparing Pci and θmfb10 with the second map.

Figure 22:
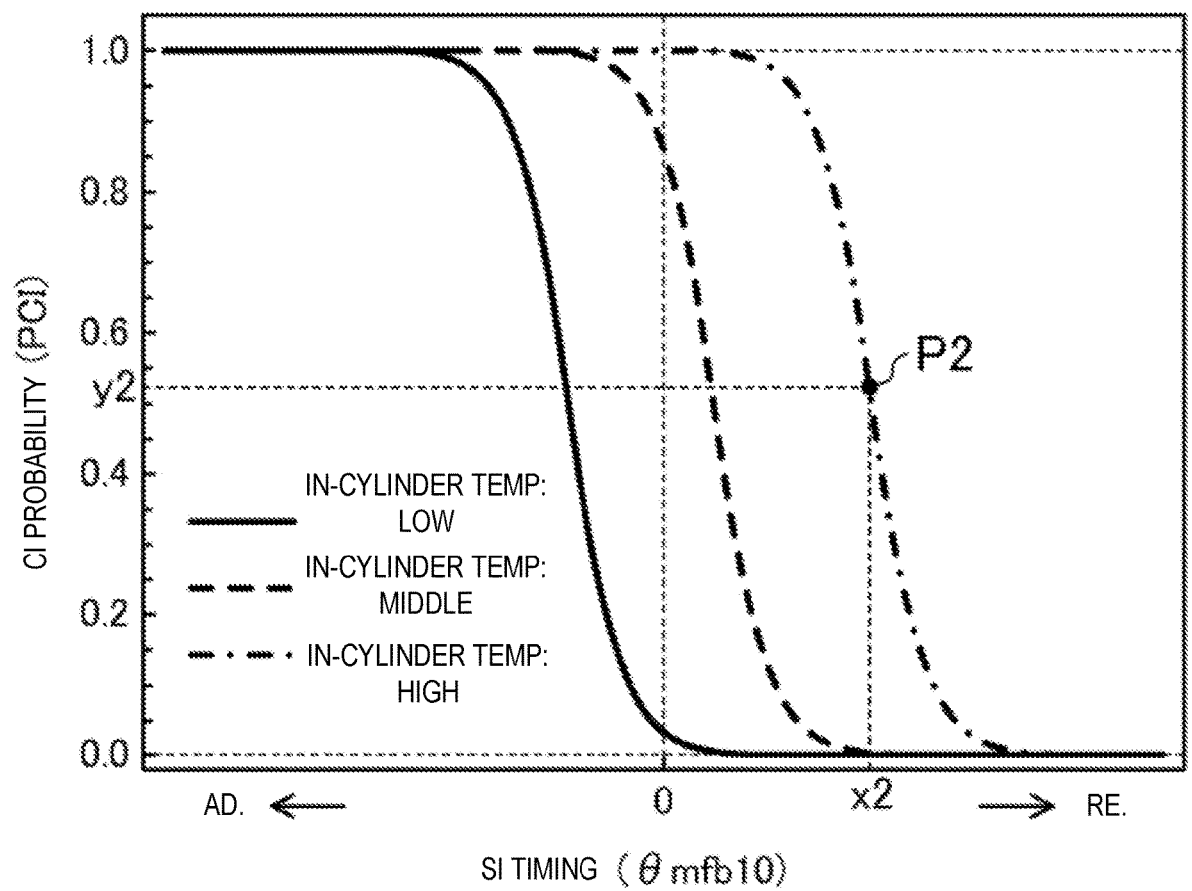
FIG. 22 is a graph illustrating a map in which the combustion mass ratio (SI timing) is associated with the CI probability, for every in-cylinder temperature.

Here, the in-cylinder temperature estimating module 101β estimates the actual Tin higher as Pci increases. As illustrated in FIG. 22, the second map is comprised of a plurality of curves which are each described as a logistic function, and which are lined up in the horizontal axis direction. The x-axis of each curve corresponds to θmfb10, and the y-axis corresponds to Pci. That is, in each curve illustrated in the second map, Pci decreases in a substantially stepped manner as θmfb10 increases. Each curve is greatly shifted to +x-direction as the in-cylinder temperature increases (an inflection point when the curve is regarded as the logistic function shifts to the +x side).

Note that if θmfb110 does not change (if θmfb10 is the given value), the shift amount in the +x-direction, i.e., the in-cylinder temperature increases as Pci increases. Moreover, if Pci does not change (if Pci is the given value), the in-cylinder temperature increases as θmfb110 is on the retard side.

As illustrated by a point P2 in FIG. 22, when (θmfb10, Pci)=(x2, y2), the in-cylinder temperature estimating module 101β searches for a curve which passes through the coordinates. Thus, the in-cylinder temperature can be estimated based on the shift amount in the +x-direction in the searched curve. For example, as illustrated in FIG. 22, the in-cylinder temperature increases as the shift amount of the curve passing through the point P2 increases. The present inventors determined beforehand the value of the in-cylinder temperature corresponding to each shift amount, and the values are stored in the memory 102. Therefore, the estimated value (actual Tin) of the in-cylinder temperature can be determined by referring the second map for Pci and θmfb1.

Moreover, as apparent from the curve becoming the logistic function, when θmfb10 is larger than the given value, Pci is converged to zero regardless of the in-cylinder temperature, and on the other hand, when θmfb10 is smaller than the given value, Pci is converged to 100% (Pci=1.0) regardless of the in-cylinder temperature. Thus, when Pci is calculated as 0% or 100%, the in-cylinder temperature estimating module 101β regulates the determination of the in-cylinder temperature. In such a case, the ECU 10 considers that the actual Tin was not able to be estimated, and it skips the processings, such as the calculation of ΔTin by the temperature deviation calculating module 101γ, and the correction of the basic values based on ΔTin.

Figure 23:
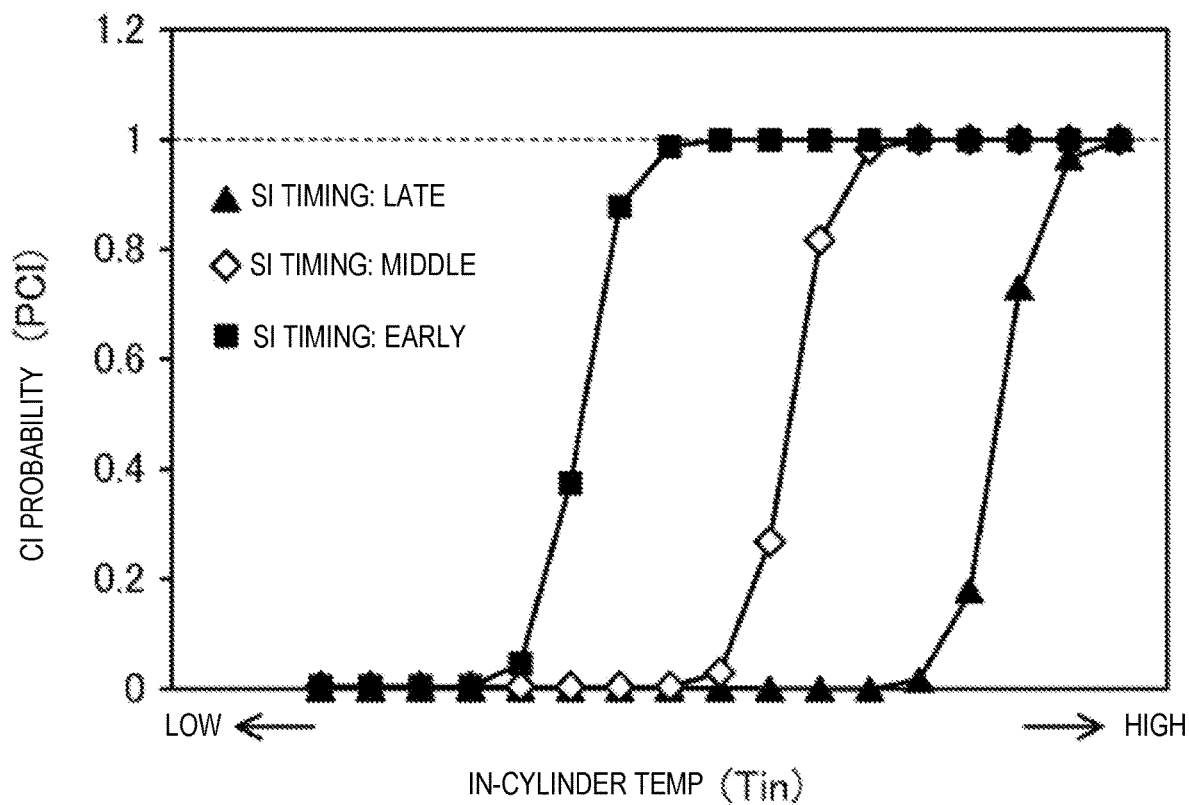
FIG. 23 is a graph illustrating a map in which the in-cylinder temperature is associated with the CI probability, for every combustion mass ratio (SI timing).

FIG. 23 illustrates a plot in which the horizontal axis of the second map is replaced by the in-cylinder temperature. As seen in the plot illustrated in FIG. 23, the second map is comprised of a plurality of curves which are each described as a logistic function, and which are lined up in the horizontal axis direction. In each curve, Pci increases as the SI timing (θmfb10) becomes earlier. If θmfb10 does not change, the in-cylinder temperature increases as Pci increases.

Moreover, the temperature deviation calculating module 101γ calculates the difference ΔTin (=[actual Tin]−[target Tin]) by subtracting the target Tin from the actual Tin as described above. Then, the ECU 10 corrects the basic values set by the internal EGR setting module 101u, the external EGR setting module 101w, and the ignition-timing setting module 101h based on the difference ΔTin. By this correction, when the actual Tin is high, the actual Tin is reduced, and on the other hand, when the actual Tin is low, the actual Tin is raised.

(Concrete Example of Control Based on Actual Tin)

Figure 18:
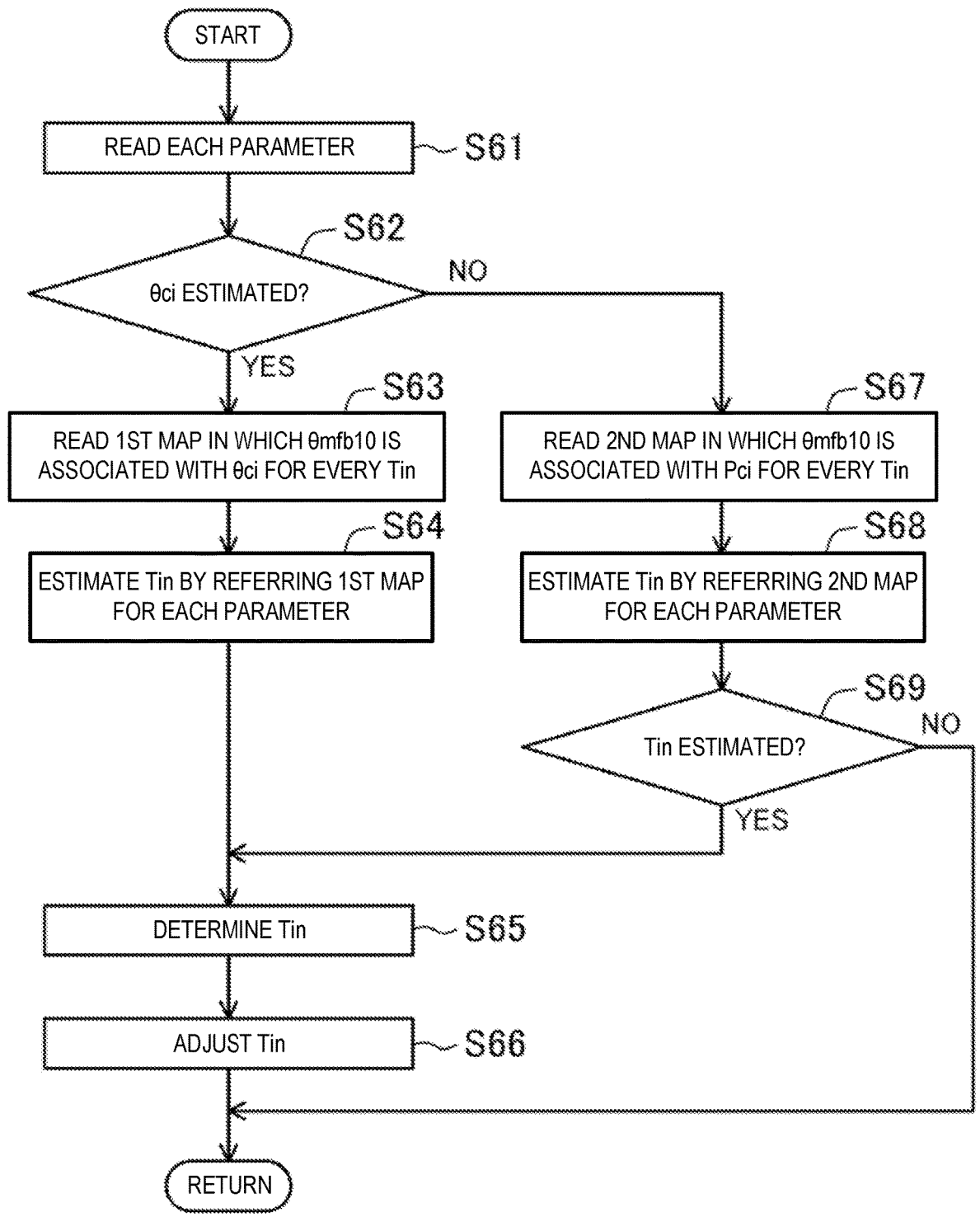
FIG. 18 is a flowchart illustrating a determination procedure of the in-cylinder temperature, and a control based on the determination result.

Below, the selective use of the first estimation technique and the second estimation technique, and a concrete example of the control based on the actual Tin are described using a flowchart illustrated in FIG. 18. The in-cylinder temperature determining module 101α first reads parameters, such as θmfb10, the actual θci, Pci, and the target Tin, which are calculated or selected beforehand (Step S61).

Then, the in-cylinder temperature determining module 101 determines whether the actual θci is included in the parameters read at Step S61, i.e., whether θci is able to be estimated (Step S62).

Here, if the determination at Step S62 is YES, the in-cylinder temperature estimating module 101β which constitutes the in-cylinder temperature determining module 101α performs the first estimation technique based on the actual θci. Specifically, the in-cylinder temperature estimating module 101β reads the first map defined so that θmfb10 is associated with the actual θci for every actual Tin (Step S63). Then, the in-cylinder temperature estimating module 101β estimates the actual Tin by referring the first map for θmfb10 and the actual θci (Step S64), and shifts to Step S65.

On the other hand, if the determination at Step S62 is NO, the in-cylinder temperature estimating module 101β performs the second estimation technique based on Pci. Specifically, the in-cylinder temperature estimating module 101β reads the second map defined so that θmfb10 is associated with Pci for every actual Tin (Step S67). Then, the in-cylinder temperature estimating module 101β estimates the actual Tin by referring the second map for θmfb10 and Pci (Step S68). However, when Pci is 0% or 100%, the actual Tin cannot be estimated in the first place by the second estimation technique. Thus, if the actual Tin is not able to be estimated (Step S69: NO), the in-cylinder temperature estimating module 101β skips the following steps and returns the process. On the other hand, if the actual Tin is able to be estimated based on Pci (Step S69: YES), the in-cylinder temperature estimating module 101β shifts to Step S65.

At Step S65, the temperature deviation calculating module 101γ calculates the difference ΔTin (=[actual Tin]−[target Tin]) of the in-cylinder temperature, and the in-cylinder temperature determining module 101α then determines the actual Tin based on the sign and the absolute value of the difference ΔTin calculated in this way.

At Step S66, the ECU 10 corrects the basic values of the properties of the EGR system 55 based on the sign and absolute value of the difference ΔTin. Based on the correction values set at this time, the ECU 10 carries out a feedback control of the intake-side electric S-VT 23, the exhaust-side electric S-VT 24, and the EGR valve 54. Thus, each actuator becomes possible to be controlled so that the actual Tin becomes the target Tin.

<Method of Determining First and Second Maps>

As a scheme for improving the estimation accuracy of the actual Tin, it is possible to elaborate the method of determining the first and second maps. The present inventors adopted the technique of Bayes estimation in the determination of the first and second maps, as a result of diligent examinations.

Below, the method of determining the first and second maps is described.

(1) Basic Model

Express a property in a discrete time t as "x." As illustrated in Formula (1), x is the real number.

$$x[t] \in R \tag{1}$$

Generally, there are a plurality of properties. Therefore, although x is supposed to be a multi-dimension variable, variables other than the in-cylinder temperature which influence the self-ignition shall be fixed in order to simplify the description. Therefore, x illustrated in Formula (1) corresponds to the in-cylinder temperature Tin.

Meanwhile, the CI timing θci becomes a real number, when the self-ignition is occurred (when θci is able to be estimated), and on the other hand, the CI timing θci becomes "None," when the self-ignition is not occurred (when θci is not able to be estimated). Therefore, if the variable indicating θci is expressed as "y," this y can be defined as illustrated in the following Formula (2).

$$y[t] \in R \cup \{None\} \tag{2}$$

Note that, in the following description, arguments of x[t] and y[t] are suitably omitted.

Here, when the given in-cylinder temperature x is used as the condition, a conditional probability P where the CI timing y becomes a given value can be given by the following Formula (3), if the CI probability Pci is expressed as r(x).

$$P(y=None|x)=1-r(x)$$

$$P(y \in R|x)=N_y(y-f(x),\sigma_y^2)r(x) \tag{3}$$

As already described, Pci is determined according to the in-cylinder temperature x. Therefore, r(x) becomes a function of x, as illustrated in Formula (3). Similarly, the CI timing y is also determined according to the in-cylinder temperature x. Therefore, in the above Formula (3), a function f(x) which associates the in-cylinder temperature x with the CI timing y is introduced.

Based on these definitions, it will be understood that the first line of Formula (3) is obvious. On the other hand, $N_y$ in the second line of Formula (3) illustrates that the CI timing y is in accordance with a normal distribution in which the average value is y-f(x) and the variance is $\sigma_y^2$. That is, when CI combustion occurs by self-ignition, the CI timing y is observed with noise according to the normal distribution.

Further, it is thought that the in-cylinder temperature x increases and decreases depending on the in-cylinder temperature x[t-1] in the last combustion cycle. Such a tendency can be described as the following Formula (4) by using a random walk in which x[t-1] is used as a starting point.

$$P(x|x[t-1])=N_x(x-x[t-1],\sigma_x^2) \tag{4}$$

$N_x$ in Formula (4) illustrates a normal distribution in which the average value is x-x[t-1] and the variance $\sigma_x^2$. The above Formula (4) indicates exactly a function of the in-cylinder temperature x. Here, although the CI timing y and the CI probability r(x) are determined according to the in-cylinder temperature x, the present inventors have conceived of applying the Bayes' theorem to the above Formula (4) in order to follow the causal relationship conversely. Specifically, when the Bayes' theorem is applied to Formula (4), Formula (5) can be obtained using the conditional probability relevant to the CI timing y.

$$P(x|y=None,x[t-1]) \propto P(x|y=None)P(x|x[t-1]) \tag{5}$$

Formula (5) illustrates that the in-cylinder temperature in the last combustion cycle is x[t-1], and illustrates the probability that the in-cylinder temperature in the current combustion cycle becomes x under a condition that self-ignition does not occur in the current combustion cycle.

When the probability illustrated in Formula (5) becomes a maximum a posteriori (MAP), the probability becomes a maximum at this in-cylinder temperature x. That is, the in-cylinder temperature x corresponding to the maximum a posteriori is x which satisfies the following Formula (6).

$$\frac{dP(x \mid y = None, x[t-1])}{dx} = 0 \Leftrightarrow -\frac{(1-r(x))(x-x[t-1])}{\sigma_x^2} - r'(x) = 0 \tag{6}$$

Generally, a time interval between the combustion cycles is considered to be very short. Thus, by assuming that a difference between x and x[t-1] is small, the Taylor series with two variables can be applied to Formula (6).

Then, by transforming and rearranging Formula (6), a MAP (MAximum Posterior) estimated value $x_{MAP}$ of x can be approximated as the following Formula (7). This MAP estimated value $x_{MAP}$ can be defined as the actual in-cylinder temperature (actual Tin) described above.

$$x_{MAP} - x_{t-1} = -\frac{\sigma_x^2 \frac{\partial r}{\partial x}(x_{t-1})}{1 - r(x_{t-1}) + \sigma_x^2 \frac{\partial^2 r}{\partial x^2}(x_{t-1})} \quad \text{if } y = None$$

$$x_{MAP} - x_{t-1} = \tag{7}$$

$$-\frac{\sigma_x^2\left((y - f(x_{t-1}))r(x_{t-1})\frac{\partial f}{\partial x}(x_{t-1}) + \sigma_y^2\frac{\partial r}{\partial x}(x_{t-1})\right)}{-r(x_{t-1})\left(\sigma_y^2 + \sigma_x^2\frac{\partial f}{\partial x}(x_{t-1})^2 - \sigma_x^2(y - f(x_{t-1}))\frac{\partial^2 f}{\partial x^2}(x_{t-1})\right) +}$$

$$\sigma_x^2\left((y - f(x_{t-1}))\frac{\partial f}{\partial x}(x_{t-1}) + \sigma_y^2\frac{\partial r}{\partial x}(x_{t-1}) + \sigma_y^2\frac{\partial^2 r}{\partial x^2}(x_{t-1})\right)$$

If $y \in R$

That is, the actual Tin defined as the MAP estimated value $x_{MAP}$ of the in-cylinder temperature x can be calculated by giving the forms of the functions r(x) and f(x).

(2) Map Creation

When the present inventors determined the first and second maps, they decided to use a linear function not only depending on the in-cylinder temperature x but also θmfb10 as the function f in order to create a more accurate map. They also decided to use the logistic function determined from the in-cylinder temperature x and θmfb, similarly for the probability r. Using these functions, the present inventors repeatedly performed a simulation to create the first and second maps.

Note that the probability r(x) can be updated for every combustion cycle by taking a so-called oblivion coefficient into consideration. A model of the probability r(x) at each time t can be expressed parameters of a model of Beta distribution, and these parameters may be updated by the oblivion coefficient.

Other Embodiments

Note that the technology disclosed herein is not limited to be applied to the engine 1 having the above configuration. The engine 1 may adopt various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Further, if used herein, a phrase of the form "at least one of A and B" means at least one A or at least one B, without being mutually exclusive of each other, and does not require at least one A and at least one B. If used herein, the phrase "and/or" means either or both of two stated possibilities.

DESCRIPTION OF REFERENCE CHARACTERS

1 Engine
10 ECU (Controller)
11 Cylinder
13 Cylinder Head
17 Combustion Chamber
55 EGR System
101*a* Target SI Ratio/Target θci Setting Module
101*b* Target In-cylinder Property Controlling Module
101*i* Ignition Controlling Module
101*l* First Band-pass Filter
101*m* Second Band-pass Filter
101*o* First Ignition Timing Estimating Module (Ignition Timing Estimating Module)
101*p* Second Ignition Timing Estimating Module (Second Ignition Timing Estimating Module)
101*q* Selecting Module (CI Existence Determining Module)
101*y* CI Probability Calculating Module
101α In-cylinder Temperature Determining Module
1022 Target θci Memory (Target Timing Memory)
1024 Threshold Memory
1025 Map Memory
25 Ignition Plug (Ignition Part)
3 Piston
6 Injector (Fuel Injection Part)
SW1 Airflow Sensor (Sensor Device)
SW2 First Intake Temperature Sensor (Sensor Device)
SW3 First Pressure Sensor (Sensor Device)
SW4 Second Intake Temperature Sensor (Sensor Device)
SW5 Intake Pressure Sensor (Sensor Device)
SW6 In-cylinder Pressure Sensor (Sensor Device)
SW7 Exhaust Temperature Sensor (Sensor Device)
SW8 Linear $O_2$ Sensor (Sensor Device)
SW9 Lambda $O_2$ Sensor (Sensor Device)
Sw10 Water Temperature Sensor (Sensor Device)
SW11 Crank Angle Sensor (Sensor device)
SW12 Accelerator Opening Sensor (Sensor device)
SW13 Intake Cam Angle Sensor (Sensor device)
SW14 Exhaust Cam Angle Sensor (Sensor device)
SW15 EGR Pressure Difference Sensor (Sensor device)
SW16 Combustion Pressure Sensor (Sensor device)
SW17 Third Intake Temperature Sensor (Sensor device)

What is claimed is:

1. A control system for a compression-ignition engine, comprising:
   a combustion chamber of the engine defined by a cylinder, a piston configured to reciprocate in the cylinder, and a cylinder head closing one end of the cylinder;
   an injector attached to the cylinder head and configured to inject fuel to be supplied into the combustion chamber;
   an ignition plug disposed so as to be oriented in the combustion chamber and configured to ignite a mixture gas inside the combustion chamber;
   a sensor device configured to measure a parameter related to operation of the engine and send a measurement signal; and
   a controller having circuitry connected with the ignition plug, the injector, and the sensor device, and configured to perform a calculation in response to the measurement signal from the sensor device and output a signal to the ignition plug and the injector,
   wherein the ignition plug forcibly ignites the mixture gas to start combustion accompanied by flame propagation of a portion of the mixture gas, and again ignites a remaining portion of unburnt mixture gas at a timing at which the unburnt mixture gas combusts by self-ignition,
   wherein the controller is configured to execute:
      an ignition controlling module to output an ignition signal to the ignition plug before a target timing so that the unburnt mixture gas self-ignites at the target timing;
      an ignition timing estimating module to estimate an actual compression ignition (CI) timing indicative of a timing at which the unburnt mixture gas actually self-ignites based on an in-cylinder pressure parameter related to a pressure inside the combustion chamber measured by the sensor device; and
      an in-cylinder temperature determining module to determine the in-cylinder temperature at a given crank angle based on the estimated result by the ignition timing estimating module,
   wherein the controller calculates a crank angle at which a combustion mass ratio becomes a given value based on the parameter measured by the sensor device, and
   wherein the in-cylinder temperature determining module determines the in-cylinder temperature based on the actual CI timing and the crank angle.

2. The control system of claim 1, further comprising an exhaust gas recirculation (EGR) system connected with the controller and configured to adjust the in-cylinder temperature in response to a signal from the controller,
   wherein the controller outputs the signal to the EGR system so as to reduce the in-cylinder temperature when the in-cylinder temperature determining module determines that the in-cylinder temperature is high, and raise the in-cylinder temperature when the in-cylinder temperature determining module determines that the in-cylinder temperature is low.

3. The control system of claim 2,
   wherein the controller calculates a target value of a property corresponding to an operating state of the engine, and determines a target in-cylinder temperature corresponding to the target value, and
   wherein the in-cylinder temperature determining module estimates the in-cylinder temperature based on the actual CI timing, and the in-cylinder temperature determining module determines the in-cylinder temperature is high when the estimated result is higher than the target in-cylinder temperature, and determines that the in-cylinder temperature is low when the estimated result is lower than the target in-cylinder temperature.

4. The control system of claim 3, wherein the controller controls the signal outputted to the EGR system based on a difference between the estimated value of the in-cylinder temperature and the target in-cylinder temperature.

5. The control system of claim 3, wherein the in-cylinder temperature determining module estimates the in-cylinder temperature higher as the actual CI timing becomes earlier.

6. The control system of claim 1,
wherein the controller determines a target value of a heat amount ratio as an index related to a ratio of an amount of heat generated when the mixture gas combusts by flame propagation to the entire amount of heat generated when the mixture gas inside the combustion chamber combusts, and determines a target value of the timing at which the unburnt mixture gas self-ignites,
wherein the controller determines the target in-cylinder temperature based on the target value, and
wherein the controller outputs the signal to the ignition plug so that the target in-cylinder temperature is achieved.

7. The control system of claim 2,
wherein the EGR system is provided to the engine and configured to change an amount of EGR gas included in the mixture gas inside the combustion chamber, and
wherein the EGR system comprises at least one of:
an internal EGR system configured to adjust a length of an overlap period where both an intake valve and an exhaust valve open; and
an external EGR system configured to adjust a flow rate of exhaust gas through an EGR passage connected between an air intake passage and an exhaust passage.

8. The control system of claim 1, wherein the ignition timing estimating module estimates a timing at which the in-cylinder pressure parameter measured by the sensor device exceeds a threshold after the forced ignition by the ignition plug, as the actual CI timing.

9. The control system of claim 8,
wherein the sensor device includes an in-cylinder pressure sensor disposed so as to be oriented in the combustion chamber and configured to measure the pressure inside the combustion chamber, and
wherein the ignition timing estimating module uses a measurement signal of the in-cylinder pressure sensor as the signal indicative of the in-cylinder pressure parameter.

10. The control system of claim 9,
wherein the controller has a first band-pass filter configured to pass a signal component of the measurement signal of the in-cylinder pressure sensor, at a frequency higher than a first frequency and lower than a second frequency, and
wherein the ignition timing estimating module estimates a timing at which the measurement signal passed the first band-pass filter exceeds a first threshold, as the actual CI timing, and the first frequency and the second frequency are set within a range of 0.5 kHz to 4.0 kHz.

11. The control system of claim 9,
wherein the controller has a second band-pass filter configured to pass a signal component of the measurement signal of the in-cylinder pressure sensor, at a frequency higher than a third frequency and lower than a fourth frequency, and
wherein the controller has a second ignition timing estimating module configured to estimate a timing at which the measurement signal passed the second band-pass filter exceeds a second threshold, as the actual CI timing, and the third frequency and the fourth frequency are set within a range of 5.5 kHz to 8.0 kHz.

12. The control system of claim 1,
wherein the controller is further configured to execute:
a CI existence determining module to determine whether the unburnt mixture gas actually self-ignited based on the in-cylinder pressure parameter related to the pressure inside the combustion chamber measured by the sensor device, and
a CI probability calculating module to calculate a CI probability indicative of a probability that the self-ignition actually occurred when operating the engine, based on the determination result by the CI existence determining module, and
wherein the in-cylinder temperature determining module determines the in-cylinder temperature based on the CI probability when the actual CI timing is not able to be estimated.

13. A method of determining an in-cylinder temperature of a compression-ignition engine, the engine comprising a combustion chamber of the engine defined by a cylinder, a piston configured to reciprocate in the cylinder, and a cylinder head closing one end of the cylinder; an injector attached to the cylinder head and configured to inject fuel to be supplied into the combustion chamber; an ignition plug disposed so as to be oriented in the combustion chamber and configured to ignite mixture gas inside the combustion chamber; a sensor device configured to measure a parameter related to operation of the engine and send a measurement signal; and a controller having circuitry connected with the ignition plug, the injector, and the sensor device, and configured to perform a calculation in response to the measurement signal from the sensor device and output a signal to the ignition plug and the injector, wherein the ignition plug forcibly ignites the mixture gas to start combustion accompanied by flame propagation of a part of the mixture gas, and again ignites remaining unburnt mixture gas at a timing at which the unburnt mixture gas combusts by self-ignition, the method comprising:
outputting an ignition signal to the ignition plug before a target timing so that the unburnt mixture gas self-ignites at the target timing;
estimating an actual CI timing indicative of a timing at which the unburnt mixture gas actually self-ignited based on an in-cylinder pressure parameter related to a pressure inside the combustion chamber measured by the sensor device; and
determining the in-cylinder temperature at a given crank angle based on the estimated result,
wherein a crank angle is calculated at which a combustion mass ratio becomes a given value based on the parameter measured by the sensor device, and
wherein the in-cylinder temperature is determined based on the actual CI timing and the crank angle.

14. A control system for a compression-ignition engine, comprising:
a combustion chamber of the engine defined by a cylinder, a piston configured to reciprocate in the cylinder, and a cylinder head closing one end of the cylinder;
an injector attached to the cylinder head and configured to inject fuel to be supplied into the combustion chamber;
an ignition plug disposed so as to be oriented in the combustion chamber and configured to ignite a mixture gas inside the combustion chamber;

an exhaust gas recirculation (EGR) system provided to the engine and configured to adjust an in-cylinder temperature of the cylinder by changing an EGR rate that is a rate of an amount of EGR gas included in the mixture gas inside the combustion chamber;

a sensor device disposed so as to be oriented in the combustion chamber, including at least an in-cylinder pressure sensor configured to measure a pressure inside the combustion chamber, and configured to measure a parameter related to operation of the engine; and a controller having circuitry connected with the ignition plug, the injector, the EGR system, and the sensor device, and configured to perform a calculation in response to a measurement signal from the sensor device, and output a signal to the ignition plug, the injector, and the EGR system, wherein the ignition plug forcibly ignites the mixture gas to start combustion accompanied by flame propagation of a part of the mixture gas, and again ignites remaining unburnt mixture gas at a timing at which the unburnt mixture gas combusts by self-ignition, wherein the controller includes:
- a target timing memory configured to store a target timing at which the unburnt mixture gas self-ignites, and the controller is configured to execute an ignition controlling module configured to output an ignition signal to the ignition plug before the target timing so that the unburnt mixture gas self-ignites at the target timing, based on the target timing stored in the target timing memory;
- a band-pass filter configured to pass a signal component of the measurement signal of the in-cylinder pressure sensor, in a particular frequency band;
- a threshold memory configured to store a threshold, and the controller is configured to execute an ignition timing estimating module configured to estimate a timing at which a value of the measurement signal passed the band-pass filter exceeds the threshold, as an actual CI timing indicative of a timing at which the unburnt mixture gas actually self-ignited; and
- a CI timing memory configured to store the actual CI timing estimated by the ignition timing estimating module, and the controller is configured to execute an in-cylinder temperature determining module configured to estimate the in-cylinder temperature based on the actual CI timing stored in the CI timing memory, and determine the in-cylinder temperature at a given crank angle based on the estimated result, wherein the controller outputs the signal to the EGR system so as to reduce the in-cylinder temperature when the in-cylinder temperature determining module determines that the in-cylinder temperature is high, and raise the in-cylinder temperature when the in-cylinder temperature determining module determines that the in-cylinder temperature is low, wherein the controller calculates a crank angle at which a combustion mass ratio becomes a given value based on the parameter measured by the sensor device, and wherein the in-cylinder temperature determining module determines the in-cylinder temperature based on the actual CI timing and the crank angle.

15. The control system of claim 1,
wherein the combustion mass ratio corresponds to a spark ignition combustion timing.

16. The control system of claim 1,
wherein the controller determines the combustion mass ratio to be the crank angle at which an amount of heat release of combustion reaches a predetermined amount relative to a maximum amount of heat release.

17. The control system of claim 1,
wherein the in-cylinder temperature is determined based on a map defining a relationship between the CI timing, the combustion mass ratio, and the in-cylinder temperature.

* * * * *